(12) United States Patent
Ogawa

(10) Patent No.: US 10,798,090 B2
(45) Date of Patent: Oct. 6, 2020

(54) USER AUTHENTICATION METHOD, SYSTEM FOR IMPLEMENTING THE SAME, AND INFORMATION COMMUNICATION TERMINAL USED IN THE SAME

(71) Applicant: Passlogy Co., Ltd., Tokyo (JP)

(72) Inventor: Hideharu Ogawa, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 423 days.

(21) Appl. No.: 14/404,759

(22) PCT Filed: May 23, 2013

(86) PCT No.: PCT/JP2013/064333
§ 371 (c)(1),
(2) Date: Dec. 1, 2014

(87) PCT Pub. No.: WO2014/188554
PCT Pub. Date: Nov. 27, 2014

(65) Prior Publication Data
US 2015/0312242 A1    Oct. 29, 2015

(51) Int. Cl.
*H04L 29/06*    (2006.01)
*G06F 16/955*    (2019.01)
(Continued)

(52) U.S. Cl.
CPC .......... *H04L 63/083* (2013.01); *G06F 16/955* (2019.01); *G06F 21/34* (2013.01);
(Continued)

(58) Field of Classification Search
CPC ......... H04L 63/083; G06F 21/34; G06F 21/36
See application file for complete search history.

(56) References Cited

U.S. PATENT DOCUMENTS 8,140,854 B2    3/2012    Ogawa
8,312,538 B2    11/2012   Ogawa
(Continued)

FOREIGN PATENT DOCUMENTS

CN    1633650 B    12/2010
CN    102804201 A   11/2012
(Continued)

OTHER PUBLICATIONS

International Search Report; PCT/JP2013/064333; dated Oct. 8, 2013.
(Continued)

*Primary Examiner* — Farid Homayounmehr
*Assistant Examiner* — Suman Debnath
(74) *Attorney, Agent, or Firm* — Studebaker & Brackett PC

(57) ABSTRACT

[Problem] To provide a user authentication technology whereby hacking of a system by a third party is effectively prevented. [Solution] The present invention is a user authentication method and system, wherein: an information communication terminal allocates numerals, etc., which configure a token code which is generated by time synchronizing with an authentication system side to each cell which configures a user's password derivation pattern, and displays upon a user interface a personal identification table whereupon numerals, etc., are allocated which have been randomly generated with other cells; the user, with reference to the personal identification table, selects the numerals, etc., which are allocated to each cell which configures the user's password derivation pattern, and inputs same as a password; and the authentication system carries out an authentication determination upon the inputted password on the basis of the generated time synchronized token code.

16 Claims, 41 Drawing Sheets

(51) Int. Cl.
  *G06F 21/34*   (2013.01)
  *G06F 21/36*   (2013.01)
  *H04L 9/32*    (2006.01)
  *H04L 29/08*   (2006.01)

(52) U.S. Cl.
  CPC ............ *G06F 21/36* (2013.01); *H04L 9/3228* (2013.01); *H04L 63/0838* (2013.01); *H04L 67/1095* (2013.01)

(56) References Cited

U.S. PATENT DOCUMENTS

| | | | |
|---|---|---|---|
| 8,875,264 B2 | 10/2014 | Tamai et al. | |
| 2007/0226784 A1 | 9/2007 | Ueda et al. | |
| 2008/0141362 A1 | 6/2008 | Torres et al. | |
| 2009/0063345 A1* | 3/2009 | Erikson | G06Q 20/10 705/44 |
| 2009/0271854 A1* | 10/2009 | Hazlehurst | G06F 21/41 726/7 |
| 2011/0202981 A1 | 8/2011 | Tamai et al. | |
| 2012/0066773 A1* | 3/2012 | Weisberger | G06F 21/10 726/29 |
| 2014/0165186 A1* | 6/2014 | Ramu | G06F 21/36 726/19 |

FOREIGN PATENT DOCUMENTS

| | | |
|---|---|---|
| GB | 2 488 310 A | 8/2012 |
| JP | 2001-061012 A | 3/2001 |
| JP | 2011-164837 A | 8/2011 |
| JP | 2012-079284 A | 4/2012 |
| WO | 03/069490 A1 | 8/2003 |
| WO | 2007/026486 A1 | 3/2007 |

OTHER PUBLICATIONS

The extended European search report issued by the European Patent Office dated Feb. 4, 2016, which corresponds to European Patent Application No. 13885308.0-1870 and is related to U.S. Appl. No. 14/404,759.

An Office Action dated Jul. 31, 2017 by the Taiwanese Patent Office, which corresponds to Taiwanese Patent Application No. 102139609.

\* cited by examiner (a)

(b)

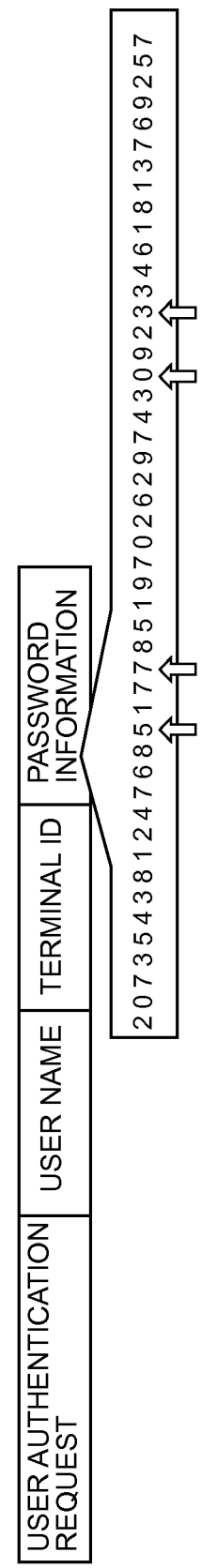

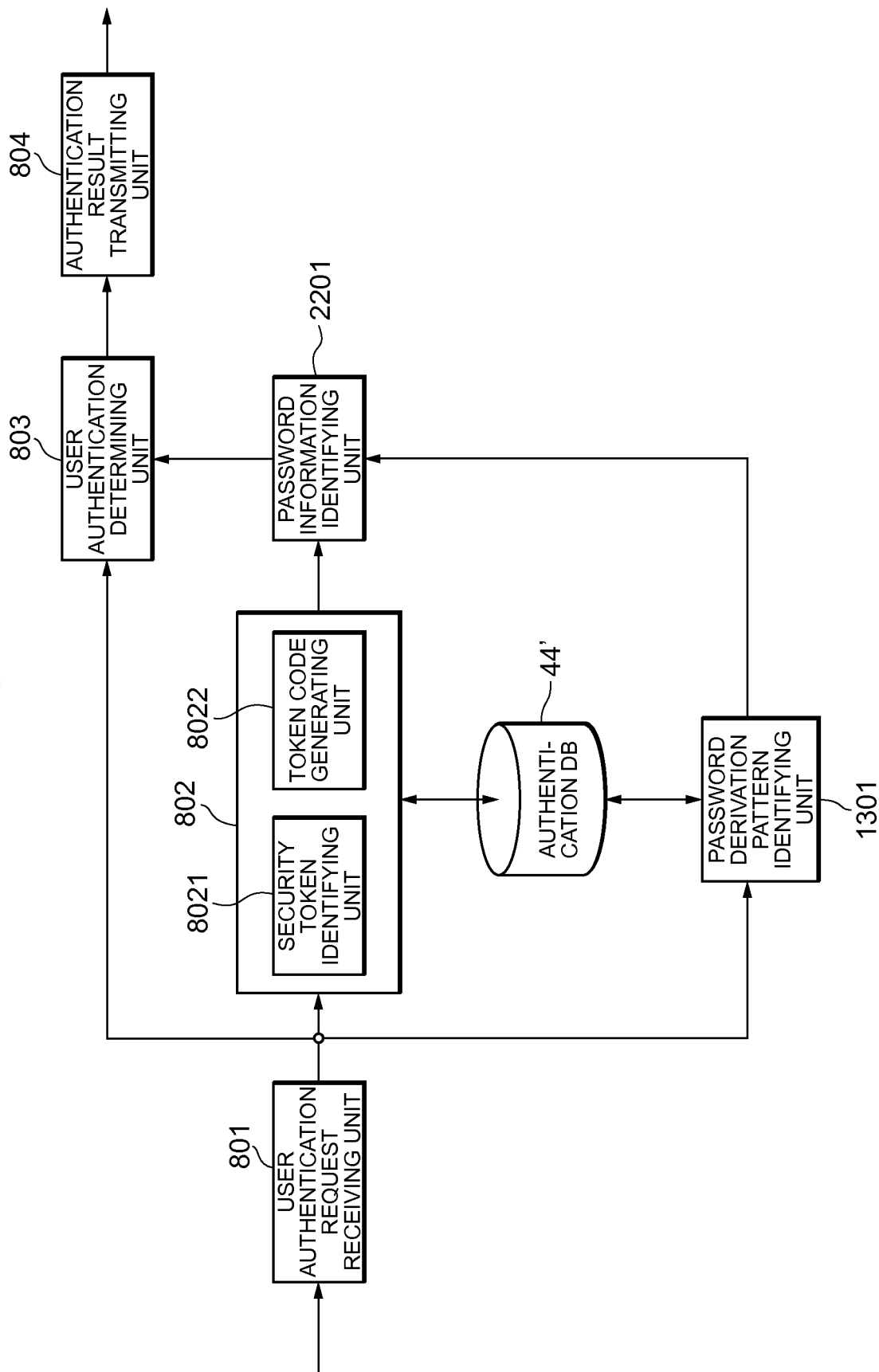

USER AUTHENTICATION METHOD, SYSTEM FOR IMPLEMENTING THE SAME, AND INFORMATION COMMUNICATION TERMINAL USED IN THE SAME

TECHNICAL FIELD

The present invention relates to computer security and, in particular, to a method of user authentication with respect to a computer system, a system for implementing the user authentication method, and an information communication terminal used in the user authentication method.

BACKGROUND ART

Computer security is technology that is critically important to protect a computer system from unauthorized use by a malicious third party. A simple example of user authentication for preventing unauthorized access to a computer system is a method using a user ID and a password that are registered in an authentication server in advance. Various methods of user authentication are proposed in accordance with required security levels and usage environment.

Challenge-response authentication is a technique aimed to prevent sensitive information such as a password from being stolen during communication by executing special processing to a character string used in user authentication. Typically, such authentication technique may be used in an environment where there is no choice but to perform user authentication using communication paths for which security cannot be guaranteed such as the Internet.

In challenge-response authentication, a client that wishes to be authenticated sends a request for authentication to a server first, and then the server sends back a random numerical string or the like (referred to as a "challenge") in response to the request. The client creates a numerical string referred to as a "response" by computing a password entered by a user and the challenge in accordance with, for example, a table of random numbers, and transmits the response to the server. The server creates a response in a similar manner based on the transmitted challenge and the password of the user which has been registered and compares this response with the response sent from the client. Match of the responses signifies that a password is correct, thereby resulting in successful authentication.

Patent Document 1 set forth below discloses a user authentication scheme, which further develops such challenge-response authentication, using a geometrical pattern for deriving a password (referred to as a "password derivation pattern" or "password extraction pattern") instead of a conventional password itself. Specifically, Patent Document 1 discloses a user authentication method and a user authentication system in which: a password derivation pattern is registered in advance in an authentication server for each user; every time a user uses the system, the authentication server generates a presentation pattern, presents the presentation pattern to the user, and causes the user to enter a password corresponding to the user's own password derivation pattern with respect to the presentation pattern; and the authentication server performs authentication with respect to the entered password based on the presented presentation pattern and the user's own registered password derivation pattern and transmits a result of the authentication to a usage target system.

Further, a security token is a device to assist user authentication with respect to a computer system, and, for example, internally generates a token code and displays the token code on a display. Typically, such a security token is capable of generating the same token code as a token code generated by an authenticating system in time synchronous.

Patent Document 2 described below discloses a site validation method for readily validating whether or not a server (i.e., site) accessed by a user is legitimate. Specifically, Patent Document 2 discloses a site validation method comprising: a first display step in which, when a user accesses a first server that manages the site from a first information terminal device, the first server causes the first information terminal device to display predetermined validation information; and a second display step in which, when the user accesses a second server from a second information terminal device, the second server causes the second information terminal device to display the predetermined validation information. Patent Document 2 further discloses a validation method using a security token (i.e., hardware token) in place of the second server and the second information terminal device.

Patent Document 1 WO2003/069490
Patent Document 2 WO2007/026486

In user authentication, leakage (or stealing) of a password used for user authentication causes an extremely serious security issue. Therefore, management of a password by a user is vital and thus requiring individual users to take "responsibility" for their own behavior is one basis for considering a system's security issues.

A password used in user authentication is generally required for each system. In addition, passwords may come in various formats (e.g., available characters and the length of the character string). Therefore, a user using many systems must manage a correspondingly large number of passwords, and therefore the management of passwords imposes a certain kind of burden on the user. While users are supposed to commit their own passwords to memory, when a large number of passwords must be managed, users often write down the passwords in a notebook or the like. In addition, it is a fact that users who feel managing passwords is a hassle tend to use a unified password in a manner of, for example, setting passwords to a memorable numeral such as his/her birthday or setting the passwords for respective systems to a common numeral.

However, such behaviors taken by users with respect to password management mean subjecting the systems to a security risk. As long as users take such behaviors, conventional user authentication that simply uses a password entails a substantial security issue.

Further, even if a user manages passwords with extreme care, there would still be security issues such as a third party stealing a glance at a password being entered on a terminal apparatus installed at a store or a "stealing" mechanism being built into the terminal apparatus itself and causing the password to be leaked to a third party.

Furthermore, even with user authentication using a random number table, in a case where a user loses the random number table or the random number table is stolen and ends up in the possession of a third party, a security level decreases and becomes comparable to that of conventional user authentication. Therefore, with this type of user authentication, it is difficult to effectively prevent unauthorized access to the system. This also applies to user authentication using a security token.

Thus, in order to solve the problem described above, an object of the present invention is to provide a novel user authentication method which prevents unauthorized access by a third party to a system in an effective manner and a system that implements the user authentication method.

Further, an object of the present invention is to provide an effective user authentication method and a system which avoids imposing an extra cost burden by fully utilizing existing system infrastructure.

Furthermore, an object of the present invention is to provide a user authentication method and a system which simplifies password management by a user while effectively preventing unauthorized access to a system and which is highly usable for all users and, by extension, to eliminate substantial security issues that are attributable to actions taken by a user.

Specifically, an object of the present invention is to provide a user authentication method which applies a concept of a user authentication method using a password derivation pattern and which yields a higher security effect, and a system that implements such user authentication method that is so provided.

Further, an object of the present invention is to provide a user authentication method which is based on a user authentication method using a security token and which yields a higher security effect, and a system that implements the user authentication method provided.

Furthermore, an object of the present invention is to provide a method and a system which enable switching to a suitable user authentication method depending on a network communication situation in which a user is in.

Moreover, an object of the present invention is to provide a method of registering user account information that is used in the user authentication method and the system as described above, and a user interface for implementing the registration method.

DISCLOSURE OF THE INVENTION

The present invention according to a first aspect for solving the problem described above may be a user authentication method and a system for implementing the user authentication method. Specifically, an information communication terminal may display on a user interface a code table in which each symbol in a numeric and/or alphabetic string (hereinafter, such symbols are collectively referred to as "characters.") constituting a token code generated in time synchronization with the authentication system may be assigned to each of elements (cells) constituting a user's password derivation pattern registered in advance and each symbol in a randomly-generated numeral may be assigned to each of the remaining elements. The user may extract, by referring to the code table, the character assigned to each of the elements constituting the user's own password derivation pattern, and enter the extracted sequence of characters as a password (passcode). The authentication system may perform authentication determination with respect to the entered password based on the generated time-synchronous token code. The invention according to the first aspect will be explained in a first embodiment.

Specifically, the present invention may be an authentication system which may perform authentication for a user, by way of using an information communication terminal, who may use a usage target system. The authentication system may include: an authentication database which may manage, for each user, user account information including a token ID for identifying a security token of the user; and a synchronization server which may generate a token code based on the token ID included in the user account information. The information communication terminal may include: means for storing a password derivation pattern constituted by specific elements selected from among elements constituting a geometrical pattern; means for acquiring a token code in time synchronization with the token code generated by the synchronization server from the security token of the user; means for generating a code table by assigning the acquired token code to the specific elements constituting the password derivation pattern in the geometrical pattern and assigning an arbitrary code to the remaining elements of the geometrical pattern; means for displaying a to-be-authenticated information entry screen including the generated code table on a user interface; and means for transmitting to the authentication system a user authentication request including a password entered to the to-be-authenticated information entry screen. The authentication system may: receive the request for user authentication transmitted by the information communication terminal; identify a token ID corresponding to the request for user authentication by referring to the authentication database; perform authentication determination based on the token code generated by the synchronization server in accordance with the identified token ID and a password included in the received request for user authentication; and transmit a result of the authentication determination to the usage target system.

The present invention according to a second aspect for solving the problem described above may be a user authentication method and a system for implementing the user authentication method. An information communication terminal may display on a user interface a code table configured by assigning a token code generated in time synchronization with an authentication system to elements of a geometrical pattern. A user may extract, by referring to the displayed code table, the character assigned to each of elements corresponding to the user's own password derivation pattern, and enter the extracted sequence of characters as a password. The authentication system may perform authentication determination with respect to the entered password based on the same code table (i.e., token code) generated in time synchronization with the information communication terminal and the user's password derivation pattern registered in advance. The invention according to the second aspect will be explained in a second embodiment.

Specifically, the present invention may be an authentication system which may perform authentication for a user, by way of using an information communication terminal, who may use a usage target system. The authentication system may include: an authentication database which may manage, for each user, user account information including a password derivation pattern constituted by specific elements selected from among elements constituting a geometrical pattern and a token ID for identifying a security token of the user; and a synchronization server which may generate a token code based on the token ID included in the user account information. The information communication terminal may include: means for acquiring a token code in time synchronization with the token code generated by the synchronization server from the security token of the user; means for generating a code table by assigning the acquired token code to elements constituting the geometrical pattern; means for displaying on a user interface a to-be-authenticated information entry screen including the generated code table; and means for transmitting to the authentication system a user authentication request including a password entered to the to-be-authenticated information entry screen. The authentication system may: receive the request for user authentication transmitted by the information communication terminal; identify a token ID corresponding to the user authentication request by referring to the authentication database; identify a password of the user from the token code generated by the synchronization server in accordance with the identified token ID and from a password derivation pattern of the user corresponding to the user authentication request; perform authentication determination based on the identified password and a password included in the received user authentication request; and transmit a result of the authentication determination to the usage target system.

The present invention according to a third aspect for solving the problem described above may be a user authentication method and a system for implementing the user authentication method. A user may enter password information by sequentially assigning each character constituting a token code generated in time synchronization with the authentication system with respect to a geometrical pattern displayed on a user interface of an information communication terminal to each of the elements corresponding to the user's own password derivation pattern. The authentication system may perform authentication determination with respect to the entered password information based on a token code generated in time synchronization with the information communication terminal. The invention according to the third aspect will be explained in a third embodiment.

Specifically, the present invention may be an authentication system which may perform authentication for a user that may use a usage target system. The authentication system may include: an authentication server which may receive a user authentication request, and which may perform authentication determination based on the received user authentication request, and which may transmit a result of the authentication determination to the usage target system; an authentication database which may store user account information that may associate a password derivation pattern of the user constituted by specific elements in elements forming a predetermined geometrical pattern and a token ID for identifying a security token of the user with each other; and a synchronization server which may generate a token code that is the same as a security token identified by the token ID in time synchronization with the security token. Further, the authentication server may include: means for providing a to-be-authenticated information entry screen on a user interface of an information communication terminal of the user to cause the user to enter to-be-authenticated information including a token code generated by the security token and password information formed in accordance with the registered password derivation pattern based on an authentication start request from the information communication terminal of the user to the usage target system; means for referring to corresponding user account information in the authentication database based on the to-be-authenticated information transmitted from the information communication terminal and acquiring a token code corresponding to the security token of the user from the synchronization server; means for referring to the corresponding user account information in the authentication database and performing authentication determination of the to-be-authenticated information based on the acquired token code and the password derivation pattern of the user; and means for transmitting a result of the authentication determination to the usage target system.

The present invention according to a fourth aspect for solving the problem described above may be a user authentication method and a system for implementing the user authentication method which may enable switching of the user authentication method depending on any of the aspects described above in accordance with a predetermined environment or condition of a user. The invention according to the fourth aspect will be explained in a fourth embodiment.

Specifically, the present invention may be an authentication system which performs authentication for a user, by way of using an information communication terminal, who may use a usage target system The authentication system may include: an authentication server which may receive a user authentication request, and which performs authentication determination based on the received user authentication request, and which may transmit a result of the authentication determination to the usage target system; an authentication database which may manage, for each user, user account information including a password derivation pattern constituted by specific elements selected from among elements constituting a geometrical pattern and a token ID for identifying a security token of the user; and a synchronization server which may generate a token code on the basis of the token ID included in the user account information. The authentication system may be configured to select one from among a plurality of processes of authentication determination depending on whether or not an advance notice regarding a start of use of the usage target system sent by the information communication terminal has been received prior to receiving the user authentication request.

The invention directed to a device (or system) described above can be grasped as an invention directed to a method. In addition, the invention can also be grasped as a software program which cooperates with predetermined hardware to enable a computer to achieve predetermined functions when executed under control of a processor of the computer, and also as a recording medium on which the program is recorded.

A specific feature (technical matter) according to any aspect described above can be modified, as appropriate, to be added to another aspect or replaced with a specific feature of the other aspect.

Moreover, in the present disclosure, the term "means" not only signifies physical means but also includes cases where a function of the means is implemented by software. Further, a function of one means may be implemented by two or more physical means, and functions of two or more means may be implemented by one physical means.

According to the present invention, unauthorized access by a third party to a computer system can be effectively prevented. In particular, according to the present invention, a user authentication method and a system which simplify password management by a user and which are highly usable for all users can be provided and, by extension, substantial security issues that are attributable to actions taken by a user can be eliminated.

Further, according to the present invention, as existing system infrastructure is fully utilized, such a user authentication method and a system can be readily introduced without imposing an extra cost burden.

Other technical features, objects, working effects, and advantages of the present invention will become apparent from the following description taken in connection with the accompanying drawings.

BRIEF DESCRIPTION OF THE DRAWINGS

FIG. 21B is an illustration showing another example of a user authentication request in a user authentication method according to an embodiment of the present invention;

FIG. 22A is a block diagram showing an example of a functional configuration of an authentication system according to an embodiment of the present invention;

DETAILED DESCRIPTION

Embodiments of the present invention will be described below with reference to the drawings.

First Embodiment (Summary)

The present embodiment discloses a user authentication method and a system for implementing the user authentication method, wherein: an information communication terminal displays on a user interface a code table in which each symbol in a numeric and/or alphabetic string (hereinafter, such symbols are collectively referred to as "characters") constituting a token code generated in time synchronization with the authentication system may be assigned to elements (cells) constituting a user's password derivation pattern registered in advance and randomly-generated characters may be assigned to the remaining elements; the user extracts, by referring to the code table, the character assigned to each of elements constituting the user's own password derivation pattern, and enters the extracted characters as a password (passcode); and the authentication system performs authentication determination with respect to the entered password based on the generated time-synchronous token code.

Figure 1:
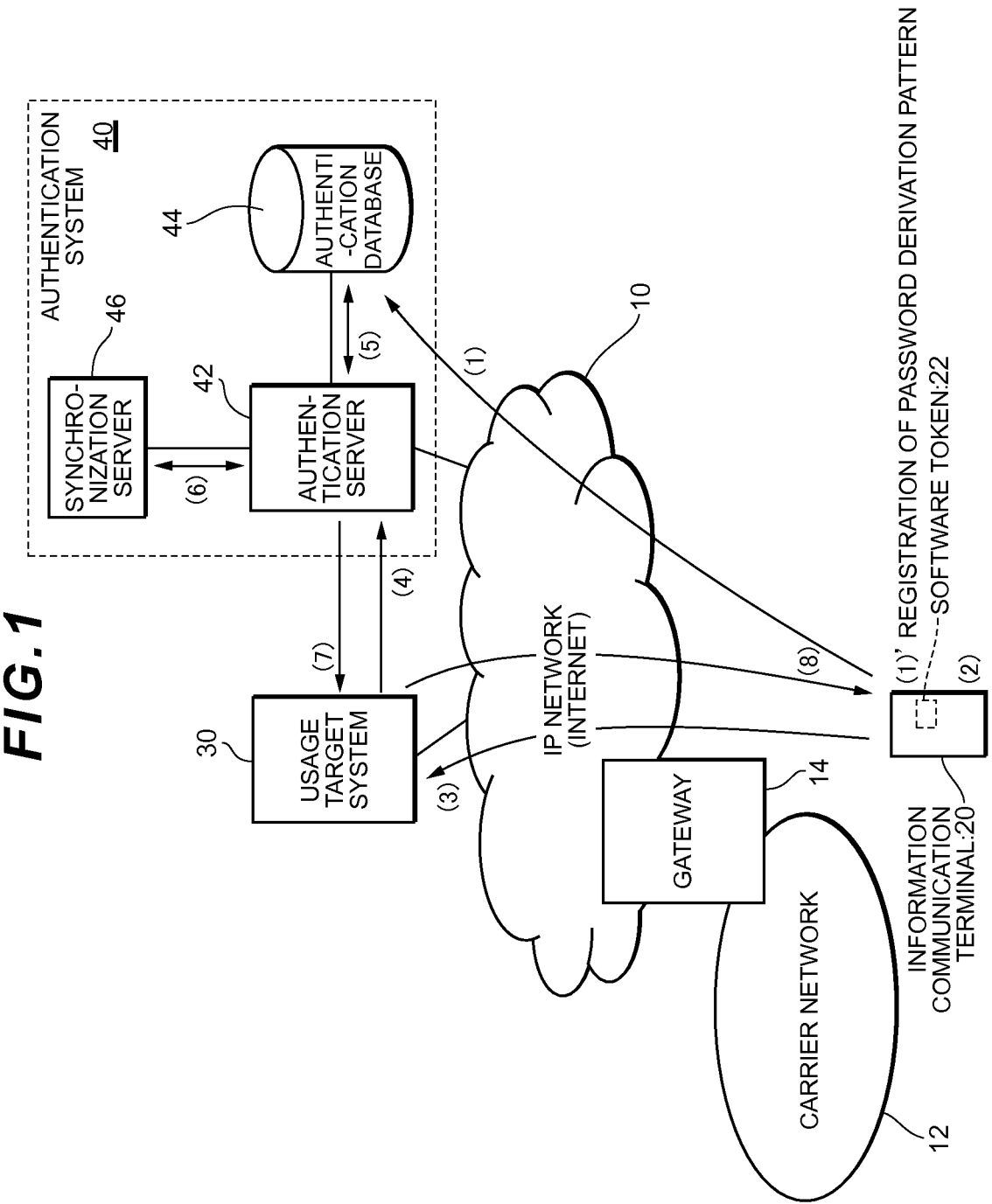
FIG. 1 is a schematic illustration for illustrating a scheme of a user authentication method according to an embodiment of the present invention.

FIG. 1 is a schematic illustration for illustrating a scheme of a user authentication method according to an embodiment of the present invention. As shown in FIG. 1, in this scheme, a user may own an information communication terminal 20 capable of connecting to the Internet 10, and a target system 30 to be used by the user (hereinafter, referred to as the "usage target system 30") and an authentication system 40 may communicatively be connected to the Internet 10. While the present example will be described using the Internet, networks of any protocol that enable internodal communication may be applied in addition to IP networks. For example, the authentication system 40 may be configured to include an authentication server 42, an authentication database 44, and a synchronization server 46.

The information communication terminal 20 may, typically, be a computing device owned by the user. Examples of the information communication terminal 20 may include, but not limited to, a personal computer, a mobile phone, a PDA, a feature phone (smart phone), a tablet computer, and other intelligent devices. In this case, it is assumed that the information communication terminal 20 may be a smart phone provided with a touch panel. The information communication terminal 20 may be capable of communicatively connecting to the Internet 10 constituted by an IP network via, for example, a WiFi network (not shown) or via a gateway 14 from a carrier network 12. Accordingly, the information communication terminal 20 may be capable of accessing various nodes e.g., a web server and a cloud server) on the Internet 10. Since a hardware configuration of the information communication terminal 20 is known, a description thereof will be omitted. Further, as is appreciated from the other embodiments disclosed in the present disclosure, a communication function is not essential to the information communication terminal 20 and the information communication terminal 20 may be replaced with a basic information terminal.

In the present embodiment, the information communication terminal 20 may configured to include, for example, a software token 22a. Specifically, an application program (hereinafter, referred to as a "security token program") that implements a security token function (time synchronous function) may be installed in the information communication terminal 20, and the information communication terminal 20 may be configured to be capable of generating a token code that is in time synchronization with the synchronization server 46 by executing the security token program under control of a processor. As the token code may change at predetermined time intervals, the token code may also be referred to as a one-time password (OPT). More specifically, the information communication terminal 20 and the synchronization server 46 may be provided with a security token program having a same password generation algorithm. Therefore, by using a same seed, the information communication terminal 20 and the synchronization server 46 can generate the same time-synchronous token code. For example, the synchronization server 46 may identify a password generation algorithm in accordance with a token ID assigned to each security token program.

Known password generation algorithms may be used. For example, a token code may be generated from a seed using a mathematical algorithm such as a Hash function. Examples of usable seeds may include a seed using a current time, a seed using a previously generated password, or a combination thereof. Alternatively, a token ID assigned to each software token 22a or a value or the like derived from information on a user (for example, the user's name, birthday, email address, or a combination thereof) may be used. For example, the security token program may generate a seed using a predetermined conversion algorithm with respect to a token ID. The security token program may be configured to generate a token code at a predetermined time interval (e.g., every minute) or to generate a token code upon an event such as a user's login.

In addition, a security token (i.e., hardware token 22b), which is shown as a physical device in other embodiments may be used (see FIG. 16) in place of the software token 22a. The hardware token 22b may operatively be connected to the information communication terminal 20 via, for example, a USB interface. Specifically, when connected to the information communication terminal 20, the hardware token 22b may internally generate a token code and provide the token code to the information communication terminal 20. Alternatively, the user may enter a token code displayed on a display of the hardware token 22b into the information communication terminal 20. Hereinafter, the software token 22a and the hardware token 22b may be simply referred to as a security token 22 without distinguishing between the software token 22a and the hardware token 22b.

Further, as will be described later, the information communication terminal 20 may store information related to a password derivation pattern. Such information may include a password derivation pattern (password extraction pattern) and a derivation rule.

A password derivation pattern may define an arrangement pattern and a selection order of a specific elements selected in an arbitrary order by the user from among elements (cells) forming a given geometrical pattern. In other words, a password derivation pattern may be an arrangement rule indicating which elements in a geometrical pattern have been selected in what order. It should be noted that a password derivation pattern does not refer to a specific value itself that is assigned to specific elements in a geometrical pattern but simply represents information indicating which elements have been selected in what kind or order.

The usage target system 30 may be a system to be used by the user and, typically, configured to request the user to be authenticated for use. For example, the usage target system 30 may be a web server providing a website or a cloud server providing a cloud service. In such a case, the user may typically access such a server via the information communication terminal 20. As another example, the usage target system 30 may be a personal computer of the user. As yet another example, the usage target system 30 may be a key opening and closing system of an automatic locker (coin locker) or a security room, an automatic teller machine (ATM), or the like. As still another example, the usage target system 30 may be a virtual machine that is implemented by having the information communication terminal 20 execute an application program.

Figure 32:
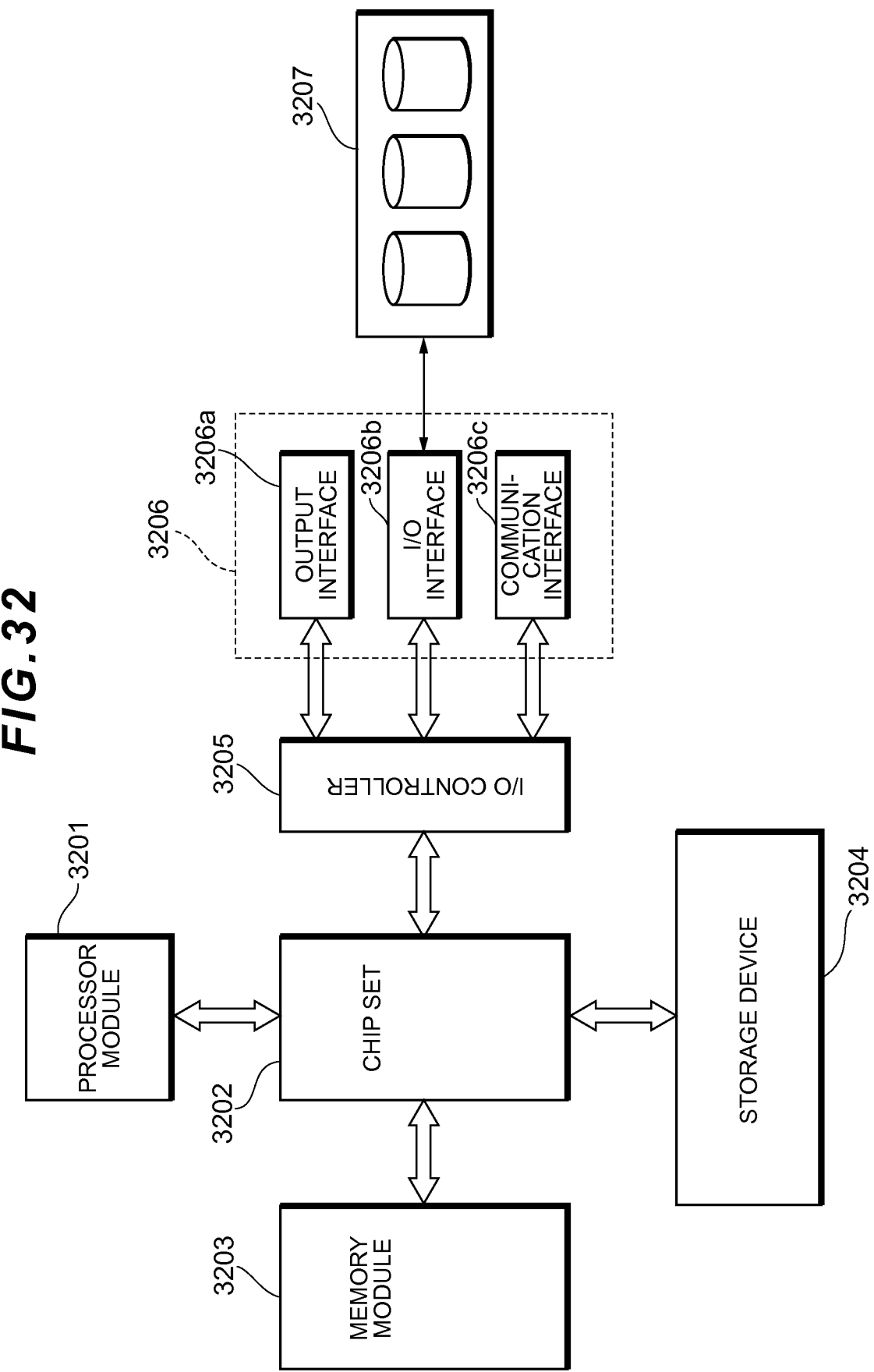
FIG. 32 is a schematic diagram showing a configuration of a computing device in a user authentication method according to an embodiment of the present invention.

The authentication system 40 may be a computer system that performs authentication of a user wishing to use the usage target system 30. For example, the authentication system 40 may be configured to include the authentication server 42, the authentication database 44, the synchronization server 46, and the like. For example, the authentication system 40 can be implemented by one or more general-purpose computing devices. Although well known, a hardware configuration of a computing device is schematically shown in FIG. 32.

The authentication server 42 may be provided with functions of the authentication database 44 and the synchronization server 46 and may be configured by a single computing device. How the authentication system 40 is functionally or logically configured may be arbitrary. The authentication system 40 may operatively be connected to the usage target system 30 via the Internet 10 by using, for example, a secure communication technique such as SSL.

The authentication server 42 may be a server computer in cooperation with the authentication database 44 and the synchronization server 46 so as to comprehensively control a user authentication process. The authentication database 44 may be a database that manages user account information which is necessary for user authentication and which is registered in advance by each individual user. The authentication database 44 manages, for example, information related to a user capable of using the usage target system 30 and information regarding the security token 22 of each user as user account information.

The synchronization server 46 may be a server computer which uses information related to the security token 22 of each user and a seed to generate a token code in time synchronization with the security token 22 of a specific user in accordance with a corresponding password generation algorithm. For example, the seed may be generated from information related to the security token 22 (for example, a token ID) using a prescribed transform algorithm and is managed per user in a database (not shown). As an example, the synchronization server 46 may provide a token code in time synchronization with the security token 22 of a specific user to the authentication server 42 in response to a query from the authentication server 42.

In the present example, while the usage target system 30 and the authentication system 40 are assumed to be computer systems which have respectively different operation subjects and which are physically separated from each other, this configuration may be not restrictive. For example, a same service operator may operate both the usage target system 30 and the authentication system 40, and the usage target system 30 and the authentication system 40 may be configured by one or a plurality of computer systems. Thus, the usage target system 30 may be configured to include functions of the authentication system 40 (and vice versa).

In the configuration described above, a user authentication method according to the present embodiment may be implemented as follows.

Before using the usage target system 30 that requires user authentication, a user may perform user registration for the usage target system, set a software token, and register a password derivation pattern on the information communication terminal 20.((1) and (1)' in FIG. 1)

Specifically, using the information communication terminal 20, the user may register, in advance, the user's own user account information with respect to the usage target system 30 to the authentication database 44 of the authentication system 40. For example, in a case where the user has installed an application program for using the usage target system 30 in the information communication terminal 20 but does not yet have a user account of the usage target system 30, the user may be guided to a user account registration screen via the user interface of the information communication terminal 20 so as to register user account information. Registration of user account information may be performed using, for example, a personal computer instead of the information communication terminal 20. This step may be omitted if the user already has a user account and user account information has already been registered in the authentication database 44.

When a security token program is not installed in the information communication terminal 20, the user may install the security token program and register a token ID assigned to the security token program on the authentication database 44. Registration of the token ID may be performed during the registration process of user account information described above.

Furthermore, the user may register a password derivation pattern on the information communication terminal 20. For example, the user may cause execution of the application program installed in the information communication terminal 20 and registers a password derivation pattern in accordance with a registration process that is implemented by the application program. The registered password derivation pattern may be stored as data to which the application program may refer to in, for example, an encrypted state in the information communication terminal 20. In other words, in the present embodiment, the password derivation pattern may be stored in the information communication terminal 20 instead of the authentication database 44. Registration of the password derivation pattern may similarly be performed during the registration process of user account information described above.

In order to use the usage target system 30, the user may run a corresponding application program on the information communication terminal 20. The information communication terminal 20 may thus display, for example, a login screen (to-be-authenticated information entry screen) on the user interface thereof and prompt the user to enter to-be-authenticated information, such as a user name and a password ((2) in FIG. 1). The to-be-authenticated information may be information to be subject to authentication by the authentication system 40. The user having been guided to the user account registration screen and having registered user account information may be guided as-is to the login screen. Although not illustrated, the application program may be configured so that, when started, the information communication terminal 20 may access the usage target system 30 and acquire necessary resources for execution. As will be described later, the login screen may include a code table in which, at a glance, a random character may be assigned to each of a plurality of elements forming a geometrical pattern. In the present embodiment, in the code table, each of characters constituting a token code generated by the security token program of the information communication terminal 20 may be assigned to each of elements constituting the password derivation pattern of the user, and each of randomly-generated characters may be assigned to each of the remaining elements. Namely, the code table according to the present embodiment may be configured so that a token code in time synchronization with the authentication system 40 may be embedded in the elements corresponding to the password derivation pattern. In other words, characters that are assigned to elements other than the respective elements corresponding to the password derivation pattern of the user may be presented to the user in order to camouflage the numerals that are assigned to the respective elements corresponding to the password derivation pattern. Moreover, while the to-be-authenticated information entry screen may be assumed to be a login screen in the present disclosure, a login screen may be not limited thereto. For example, depending on a service provided by the usage target system 30, a second authentication may be required after login. In this case, a screen for the second authentication may also be a to-be-authenticated information entry screen.

Next, the user sequentially may extract each character assigned to each of elements constituting the user's own password derivation pattern from the displayed code table and may enter the sequence of characters as a password. For example, upon user's selection of a login button after entering the password, a login request including the entered password may be transmitted to the usage target system 30 ((3) in FIG. 1).

Upon receipt of the login request from the information communication terminal 20, the usage target system 30 may transmit a user authentication request based on the login request to the authentication server 42 in order to perform user authentication ((4) in FIG. 1). In this case, the usage target system 30 may include its own system ID in the user authentication request to be transmitted to the authentication server 42. Accordingly, the authentication server 42 can deal with user authentication requests from different usage target systems 30. Moreover, from the perspective of the user, a login request by the information communication terminal 20 may also be assumed to be a certain type of a user authentication request.

Upon receipt of the user authentication request, the authentication server 42 may refer to the authentication database 44 and then identify the token ID of the user ((5) in FIG. 1). Subsequently, based on the token ID, the authentication server 42 may inquire the synchronization server 46 about a token code in time synchronization with the security token of the user and thereby acquire the token code of the user from the synchronization server 46 ((6) in FIG. 1). Upon acquisition of the token code of the user, the authentication server 42 may perform authentication determination by comparing and collating the token code with the password transmitted from the user and transmit a result of the authentication determination to the usage target system 30 ((7) in FIG. 1).

The usage target system 30 may send back a result of the authentication determination by the authentication server 42 to the user and, depending on the result of the authentication determination, proceed to a subsequent process ((8) in FIG. 1). For example, in a case when the result of the authentication determination is an unsuccessful authentication, the user may be notified that login was not successful, whereas in a case of a successful authentication, the login is accepted and the user may be provided with a result of a process or become entitled to a service.

(Explanation of Password Derivation Pattern)

Figure 2:
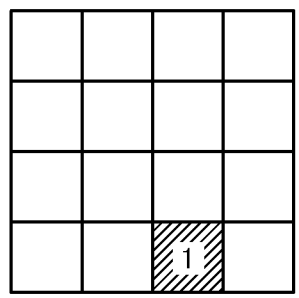
FIG. 2 is an illustration for illustrating a password derivation pattern in a user authentication method according to an embodiment of the present invention.
Figure 2:
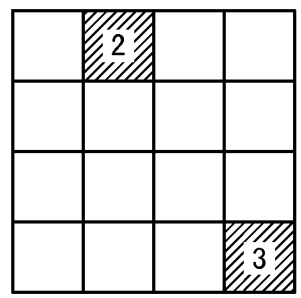
Figure 2:
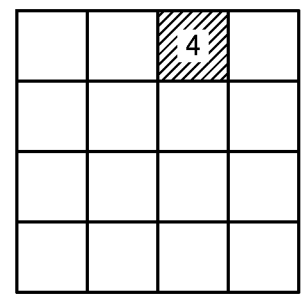
Figure 2:
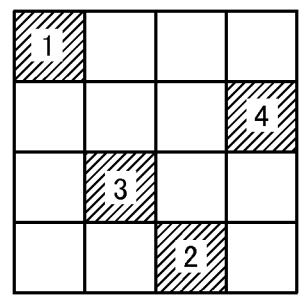

FIG. 2 is an illustration for illustrating a password derivation pattern in a user authentication method according to an embodiment of the present invention.

Specifically, FIG. 2A is an illustration showing an example of a geometrical pattern constituted by a 4 row, 12 column matrix. In the present example, the geometrical pattern is divided into 4 row, 4 column blocks in order to assist visual recognition by the user. In FIG. 2A, elements selected by the user are hatched so as to be visually distinguished and numbers are provided in the elements in the order of their selection. The elements selected by the user from the geometrical pattern may form a password derivation pattern. Each element is identified by, for example, "(row number, column number)." Accordingly, a password derivation pattern according to the present example may be expressed as, for example, "(3, 2), (0, 5), (3, 7), (0, 10)." Alternatively, when sequential numbers are assigned in an order in which a top left element in a leftmost block is assigned number "0," a password derivation pattern may be expressed as "14, 17, 31, 34."

Further, FIG. 2B is an illustration showing an example of a geometrical pattern constituted by a 4 row, 4 column matrix. A password derivation pattern in this case may be expressed as, for example, "(0, 0), (3, 2), (2, 1), (2, 3)." Alternatively, the password derivation pattern may be expressed as "0, 14, 9, 7" in the form of sequential numbers.

A password derivation pattern may be used for performing user authentication and represent an arrangement rule of elements to be memorized by the user. In this sense, the password derivation pattern can be considered a kind of a password. A geometrical pattern, the number of elements (e.g., "6") constituting a password derivation pattern in the geometrical pattern, and an arrangement of the elements may be arbitrary and may be set as appropriate depending on a security level of user authentication. A concept of a password derivation pattern is explained in detail in Patent Document 1.

Figure 3A:
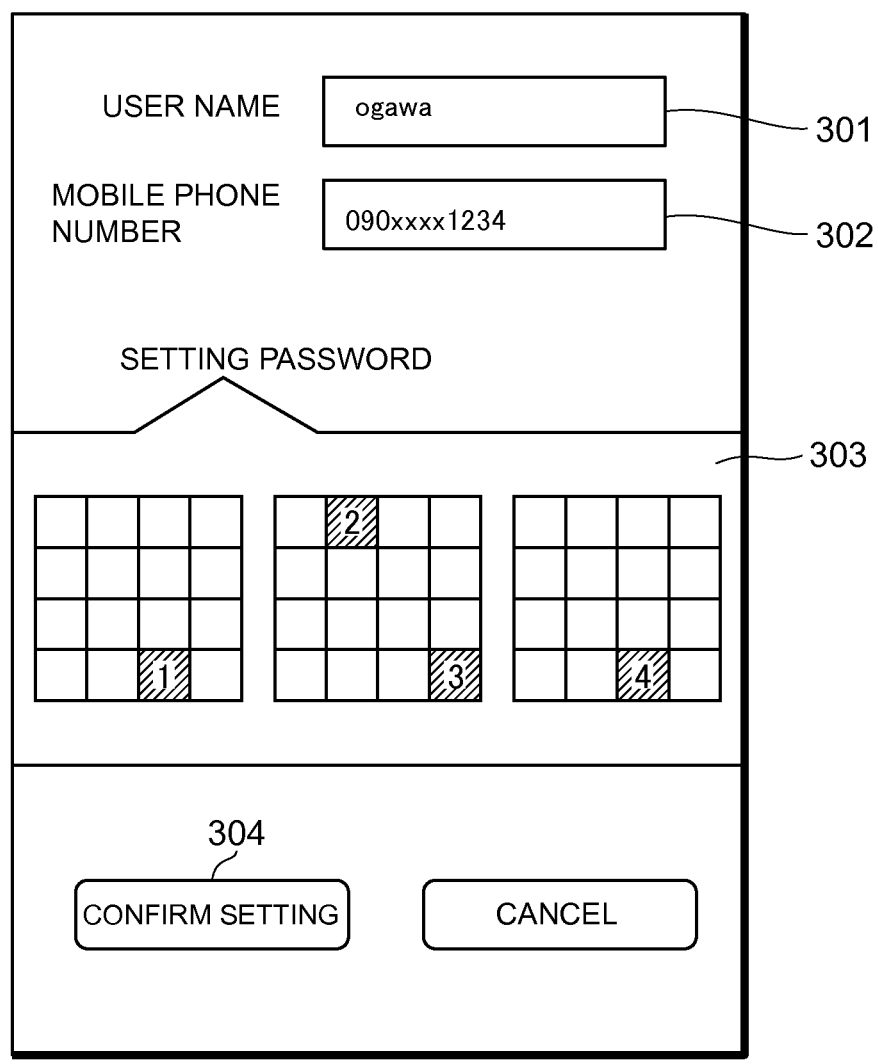
FIG. 3A is an illustration showing an example of a registration screen of a password derivation pattern in a user authentication method according to an embodiment of the present invention.

FIG. 3A is an illustration showing an example of a registration screen of a password derivation pattern in a user authentication method according to an embodiment of the present invention. In the present embodiment, such a registration screen may be implemented by, but not limited to, a function of an application program installed in the information communication terminal 20. In another embodiment, such a registration screen may be configured by a screen configuration program described in a page description language (e.g., HTML5) and provided when accessing a computer system (e.g., the usage target system 30 or the authentication server 42) of an administrator.

Referring to FIG. 3A, the password derivation pattern registration screen may include, for example, a user name entry field 301, a cell phone number entry field 302, and a password derivation pattern entry field 303.

The user name entry field 301 may be a field for entering a name of a user that uses the usage target system 30. The user name may be any character string or the like that is uniquely identified by the usage target system 30 and, for example, an email address of the user may be used. For example, when the user may tap the user name entry field

301, a software keyboard may be displayed and the user may enter a character string or the like using the software keyboard. Tapping may be performed using, for example, a finger of the user or a stylus.

The cell phone number entry field 302 may be a field for entering individual identification information for identifying the information communication terminal 20 used for user authentication when using the usage target system 30. In the present embodiment, while it is assumed that a cell phone number assigned to the information communication terminal 20 owned by the user may be used as-is, the use of a cell phone number is not respective and, for example, a device ID such as a MAC address may be used instead. The cell phone number enter field 302 may be omitted. For example, when the usage target system 30 is a system that is implemented by executing the application program, the cell phone number entry field 302 may be omitted.

The password derivation pattern entry field 303 may be configured to include, for example, a geometrical pattern constituted by 48 elements arranged in a 4 row, 12 column matrix pattern. In the present example, the geometrical pattern may be divided into 4 row, 4 column blocks. The user may sequentially tap and select the predetermined number of elements corresponding to a password derivation pattern to be registered in the geometrical pattern. The tapped and selected elements may be highlighted in, for example, a predetermined color so as to be visually distinguished and numbers indicating an order of selection may be displayed in the elements. FIG. 3A shows that an element expressed as "(3, 2)" has been selected first. A sequence of the elements selected at this point corresponds to a password derivation pattern.

Figure 3B:
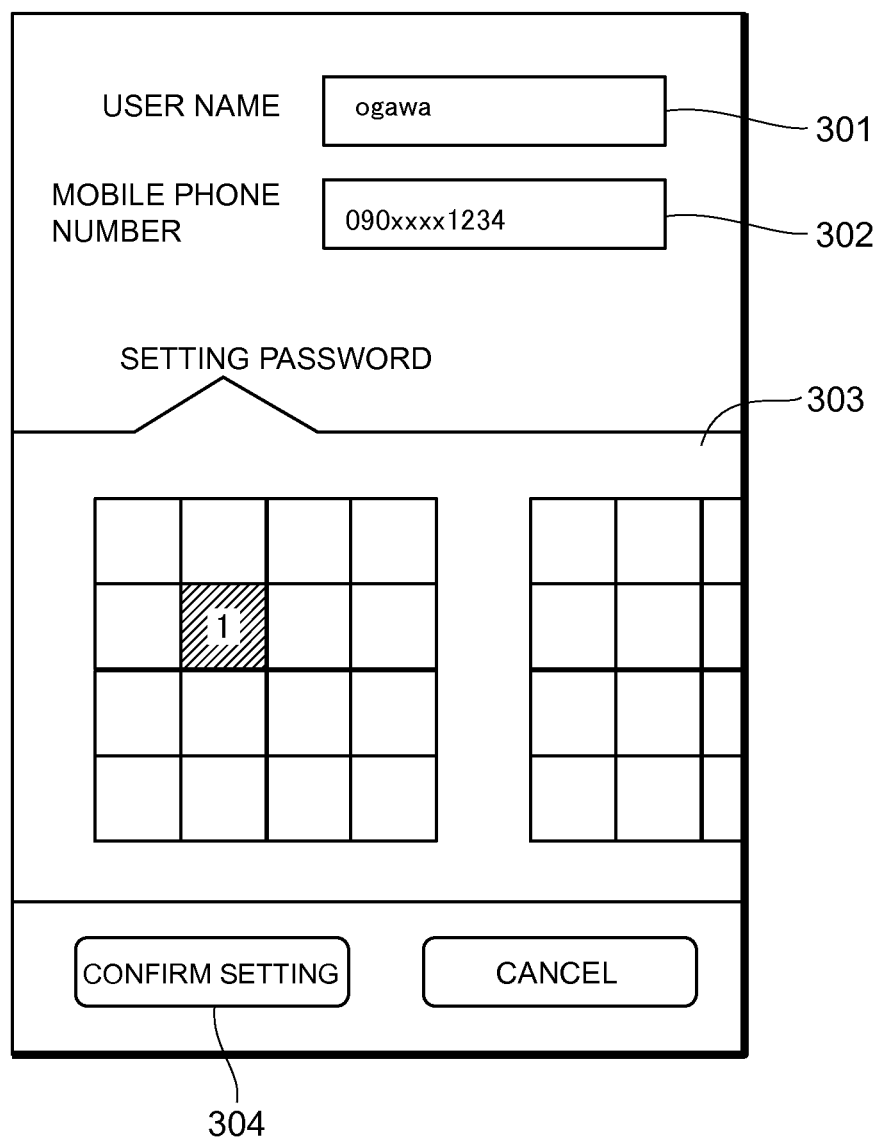
FIG. 3B is an illustration showing another example of a registration screen of a password derivation pattern in a user authentication method according to an embodiment of the present invention.

In consideration of a screen size and display contents of the information communication terminal 20, for example, the password derivation pattern entry field 303 may be configured to virtually display at least a part (e.g., one block) of the geometrical pattern as shown in FIG. 3B. In this case, by swiping or flicking a point inside the password derivation pattern entry field 303 sideways, the user may tap and select individual elements in a displayed portion while scrolling the inside of the password derivation pattern entry field 303 to cause a hidden portion outside of the screen to be displayed inside the screen. Alternatively, when the user holds the information communication terminal 20 laterally, the information communication terminal 20 may detect that it is being held laterally and rotate display contents in the screen by 90 degrees to enable all element groups in the geometrical pattern to be displayed.

When registering the password derivation pattern, for example, the same element may be selected twice or more. For example, an element selected twice may be highlighted in a different color and two numbers may be displayed. In this case, in order to prevent the numbers from overlapping with one another and impeding visual confirmation, for example, each number may be displayed in balloons. In addition, in place of or in addition to such numbers, the order in which the elements had been selected may be indicated by tracks connecting selected elements on the geometrical pattern.

Furthermore, selection of the respective elements may be performed by dragging on the geometrical pattern in a unicursal manner instead of tapping. Specifically, the user may select the respective elements in the number of elements to be registered as the password derivation pattern by way of drawing an approximately straight line while dragging from an origin that is a first selected element and pausing on each element which is to be selected. For example, the information communication terminal 20 may receive entered information by identifying operation actions such as tapping, dragging, and swiping based on a position at which a finger has made contact in the registration screen and on duration of contact by the finger.

When the user taps a setting confirmation button 304 after entering necessary information to the respective entry fields 301 to 303, the information communication terminal 20 may provisionally register a password derivation pattern based on the entered information as registration data and subsequently causes a setting confirmation screen to be displayed on the user interface of the information communication terminal 20.

Figure 4A:
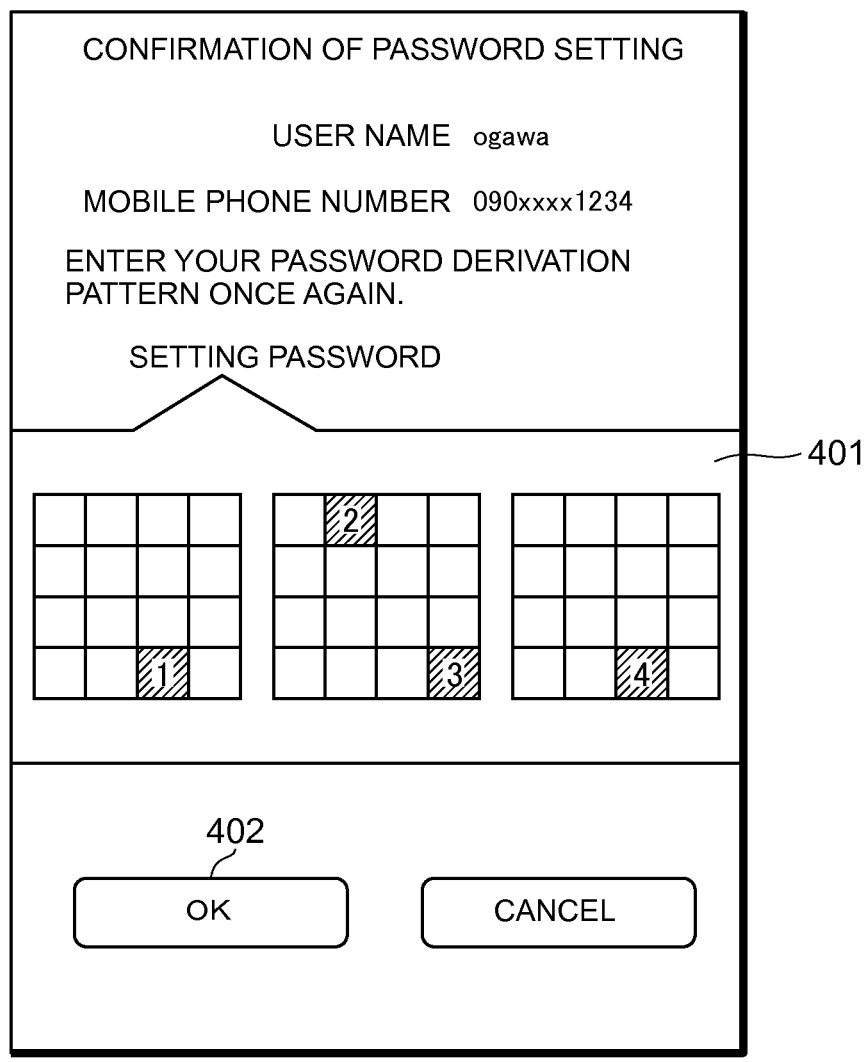
FIG. 4A is an illustration showing an example of a setting confirmation screen of a password derivation pattern in a user authentication method according to an embodiment of the present invention.

The setting confirmation screen may be a screen for confirming a password derivation pattern by causing the user to once again select respective elements of the password derivation pattern. FIG. 4A is an illustration showing an example of a setting confirmation screen displayed on the user interface of the information communication terminal 20. In addition, FIG. 4B is an illustration showing an example of a setting confirmation screen corresponding to the registration screen shown in FIG. 3B.

Figure 4B:
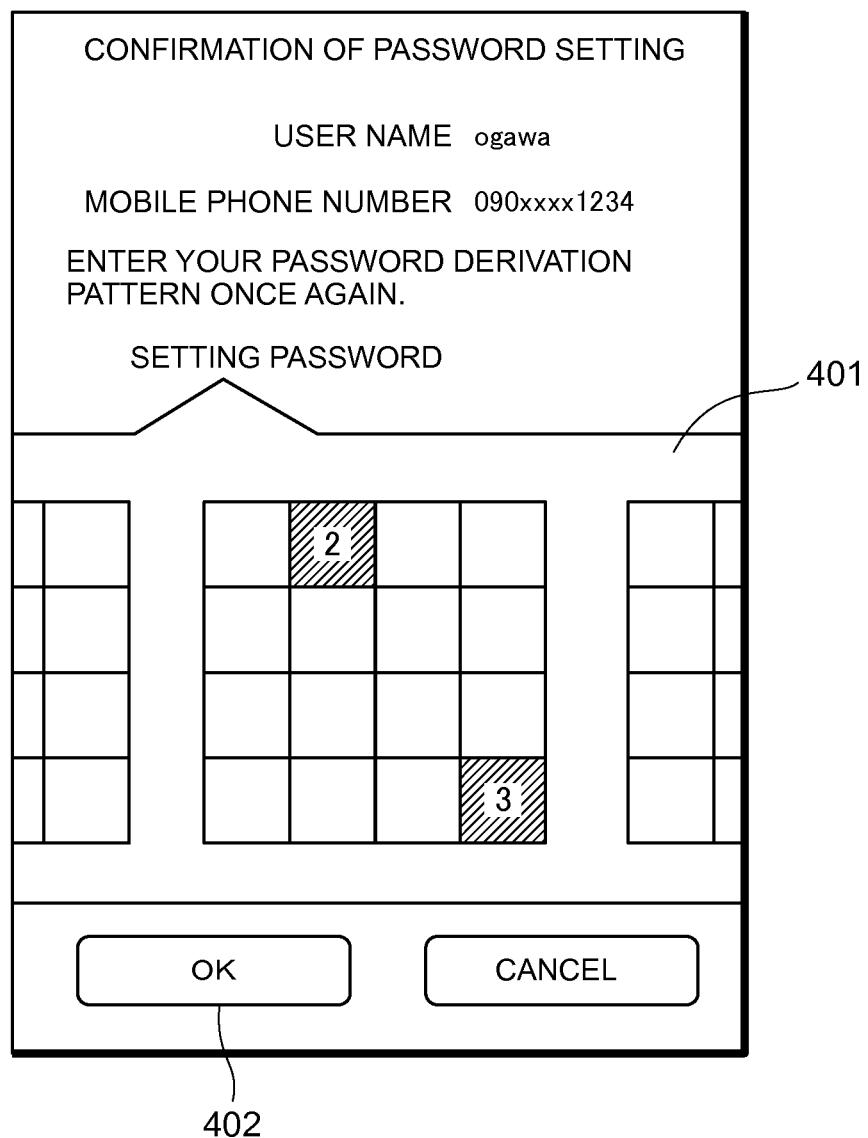
FIG. 4B is an illustration showing another example of a setting confirmation screen of a password derivation pattern in a user authentication method according to an embodiment of the present invention.

Specifically, as shown in FIGS. 4A and 4B, the setting confirmation screen may include a password entry field 401 including a geometrical pattern. The user may select respective elements corresponding to the password derivation pattern provisionally registered earlier in the same order in the geometrical pattern. When the user selects an OK button 402 after selecting elements of the geometrical pattern in the password entry field 401, the information communication terminal 20 may determine whether or not the current password derivation pattern matches the password derivation pattern provisionally registered earlier. When the information communication terminal 20 determines that the password derivation patterns match, the information communication terminal 20 may register the password derivation pattern as data to be referred to by the application program.

While the present example is configured so that the setting confirmation screen is provided only once to the user, such a configuration is not restrictive. The setting confirmation screen may be iteratively provided a plurality of times. For example, the iteration may be performed on the user's volition by having the user select an iteration button (not shown) or may be compulsorily performed depending on a period of time upon entry (e.g., when entry takes time). Due to such iteration, the user can be prompted to commit the user's own password derivation pattern to memory.

The registration of the password derivation pattern may be performed by methods other than those described in the present Description. For example, the password derivation pattern registration method disclosed in Patent Document 1 can also be applied to the present invention.

(Explanation of Authentication Database)

Figure 5:
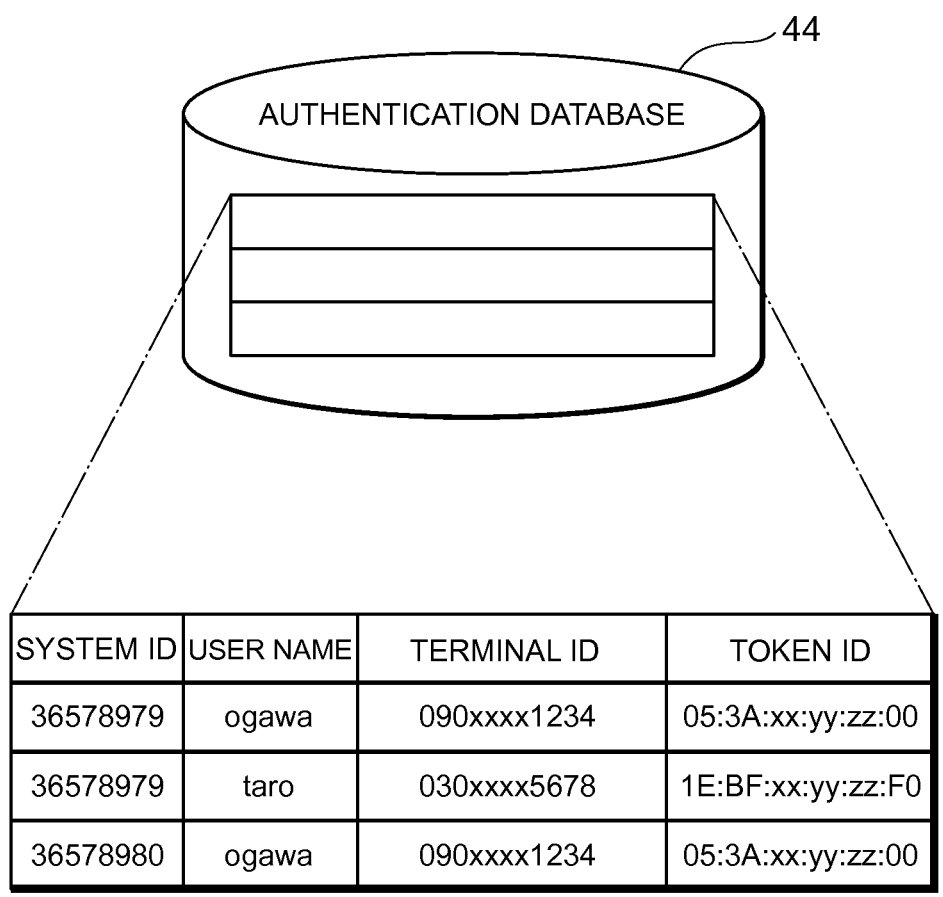
FIG. 5 is an illustration showing an example of a data structure of an authentication database in a user authentication method according to an embodiment of the present invention.

FIG. 5 is an illustration showing an example of a data structure of an authentication database that is used in a user authentication method according to an embodiment of the present invention. For example, the authentication database 44 may manage user account information of each user as one record with respect to each usage target system 30.

Specifically, as shown in FIG. 5, one record in the authentication database 44 may be constituted by respective fields of a system ID, a user name, a terminal ID, and a token ID. In the present embodiment, a password derivation pattern need not be included in user account information in the authentication database 44. The system ID may be an ID for identifying a usage target system 30 that can be used by each user. The user name may be a name of a user in a system which is assigned to each user. The terminal ID may be a unique device ID assigned to the information communication terminal 20 used by each user for user authentication. For example, a MAC address may be used as the terminal ID. The token ID may be a unique ID assigned to a security token program installed in the information communication terminal 20 of each user. A different token ID may be used for each usage target system 30.

In the present example, a user "ogawa" may be registered as a usable user in the respective usage target systems 30 represented by the system IDs "36578979" and "36578980." Further, the information communication terminal 20 represented by a terminal ID "090xxxx1234" may be set as the information communication terminal 20 used by the user "ogawa" for user authentication, and a token ID "05:3A:xx:yy:zz:00" is registered as a software token.

(Explanation of Information Communication Terminal)

Figure 6A:
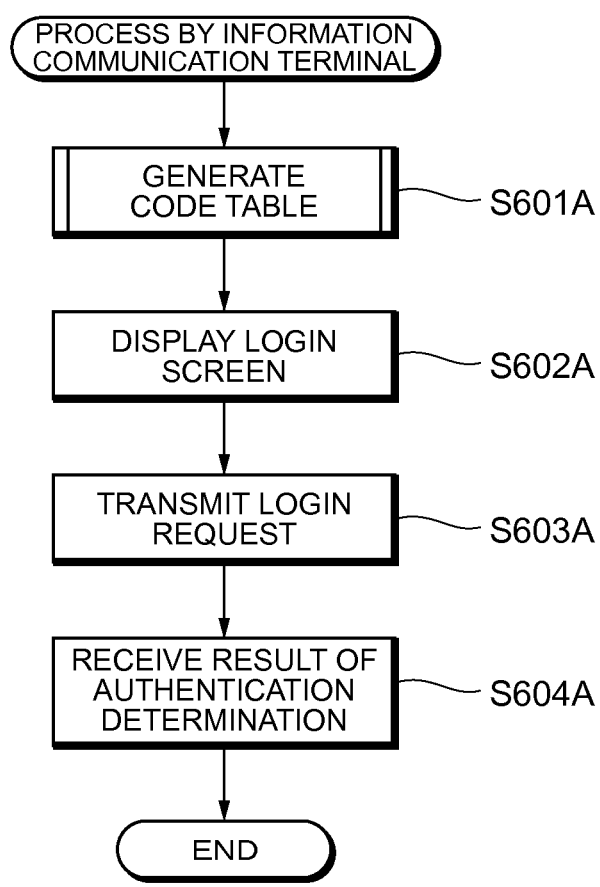
FIG. 6A is a flow chart showing a process performed by an information communication terminal in a user authentication method according to an embodiment of the present invention.
Figure 6B:
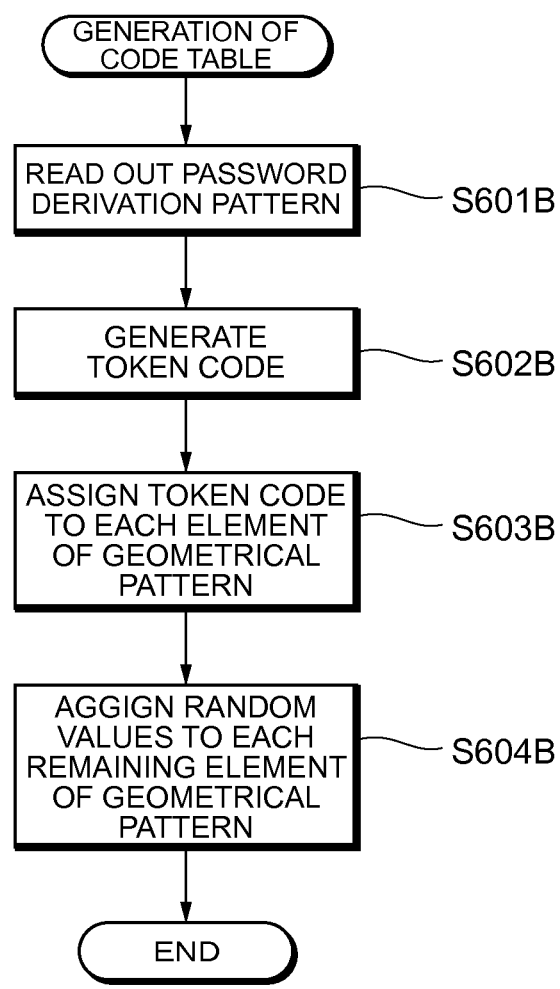
FIG. 6B is a flow chart showing a process performed by an information communication terminal in a user authentication method according to an embodiment of the present invention.

FIGS. 6A and 6B are flow charts for showing a process performed by an information communication terminal in a user authentication method according to an embodiment of the present invention. The process may be implemented by, for example, having the information communication terminal 20 execute a application program under control of a processor. The process may be executed sequentially, or executed in parallel or concurrently, as long as results of the process are not inconsistent.

As shown in FIG. 6A, first, upon start of execution of the application program, the information communication terminal 20 may generate a code table in order to display a login screen for entering login information on the user interface (S601A). Specifically, as shown in FIG. 6B, the information communication terminal 20 may read out a password derivation pattern of the user (S601B) and call the security token program to generate a token code that is in time synchronization with the synchronization server 46 (S602B). Next, the information communication terminal 20 may assign each character constituting the generated token code to each of elements constituting the password derivation pattern in the code table (geometrical pattern) in order from the top (S603B). The information communication terminal 20 may subsequently assign randomly-generated characters to the remaining elements of the code table (S604B) to complete the code table. Once the code table is generated, the information communication terminal 20 may display a login screen including the code table (S602A in FIG. 6A).

Figure 7:
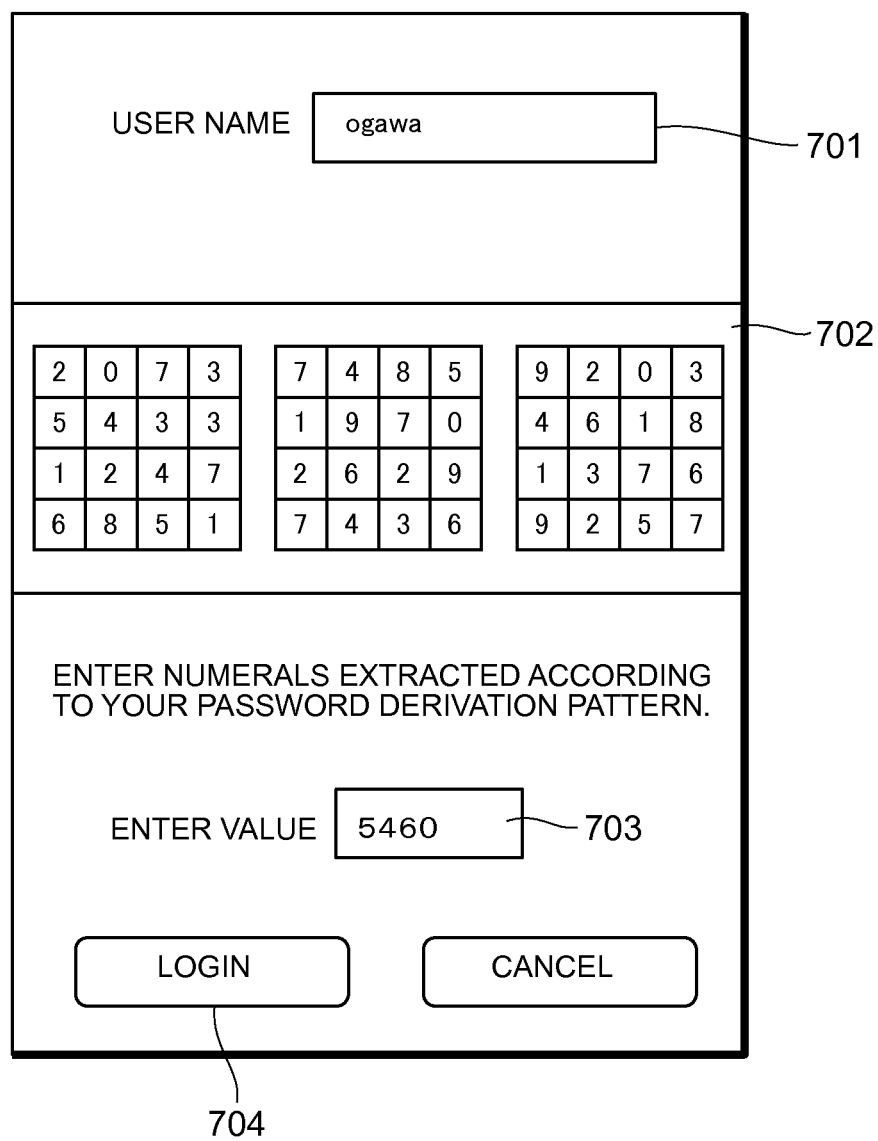
FIG. 7 is an illustration showing an example of a login screen displayed on a user interface of an information communication terminal in a user authentication method according to an embodiment of the present invention.

FIG. 7 is an illustration showing an example of a login screen displayed on the user interface of the information communication terminal 20. As shown in FIG. 7, the login screen may include, for example, a user name entry field 701, a code table 702, and a password entry field 703 for entering a password. The user name entry field 701 may be a field for entering the user name registered by the user as user account information. The code table 702 may be a table in which, at a glance, each of random characters is assigned to each of elements forming a geometrical pattern. The user may extract, by referring to the code table 702, a character assigned to each of the elements corresponding to the user's own password derivation pattern, and enter the extracted sequence of characters to the password entry field 703. FIG. 7 shows a situation where, for example, a numeral "5460" extracted from the code table 702 using the password derivation pattern shown in FIG. 2 is entered to the password entry field 703.

Returning back to FIG. 6A, for example, when the user enters necessary login information (to-be-authenticated information) to the login screen and selects a login button 704, the information communication terminal 20 may transmit a login request including the login information to the usage target system 30 (S603A). Upon receipt of the login request, the usage target system 30 may transmit a user authentication request including the login information to the authentication server 42 and thereby receive authentication determination of the user. The usage target system 30 may receive a result of the authentication determination from the authentication server and then transmit the result of the authentication determination to the information communication terminal 20. Accordingly, the information communication terminal 20 may receive the result of the authentication determination with respect to the login request (S604A).

Instead of transmitting a login request to the usage target system 30, the information communication terminal 20 may be configured to directly transmit a login request to the authentication system 40 (for example, the authentication server 42) and receive a result of the authentication determination.

Further, while a password derivation pattern is constituted by four elements in the present example, a password derivation pattern is not limited thereto. For example, a password derivation pattern may be constituted by six elements. Furthermore, while one numeral (one digit) is assigned to each element, this configuration is not restrictive and one or more numerals may be assigned to each element. Alternatively, one or more characters may be assigned to each element or a combination of such numerals and characters may be assigned to each element. In addition, instead of increasing the number of digits (number of characters) to be assigned to each element, the number of elements constituting a password derivation pattern may be reduced. The information communication terminal 20 may convert an internally-generated numerical value (token code and random numerical value) into one or more numerals or characters according to a character code table and assigns the numerals or characters to an element.

(Explanation of Authentication Server)

Figure 8:
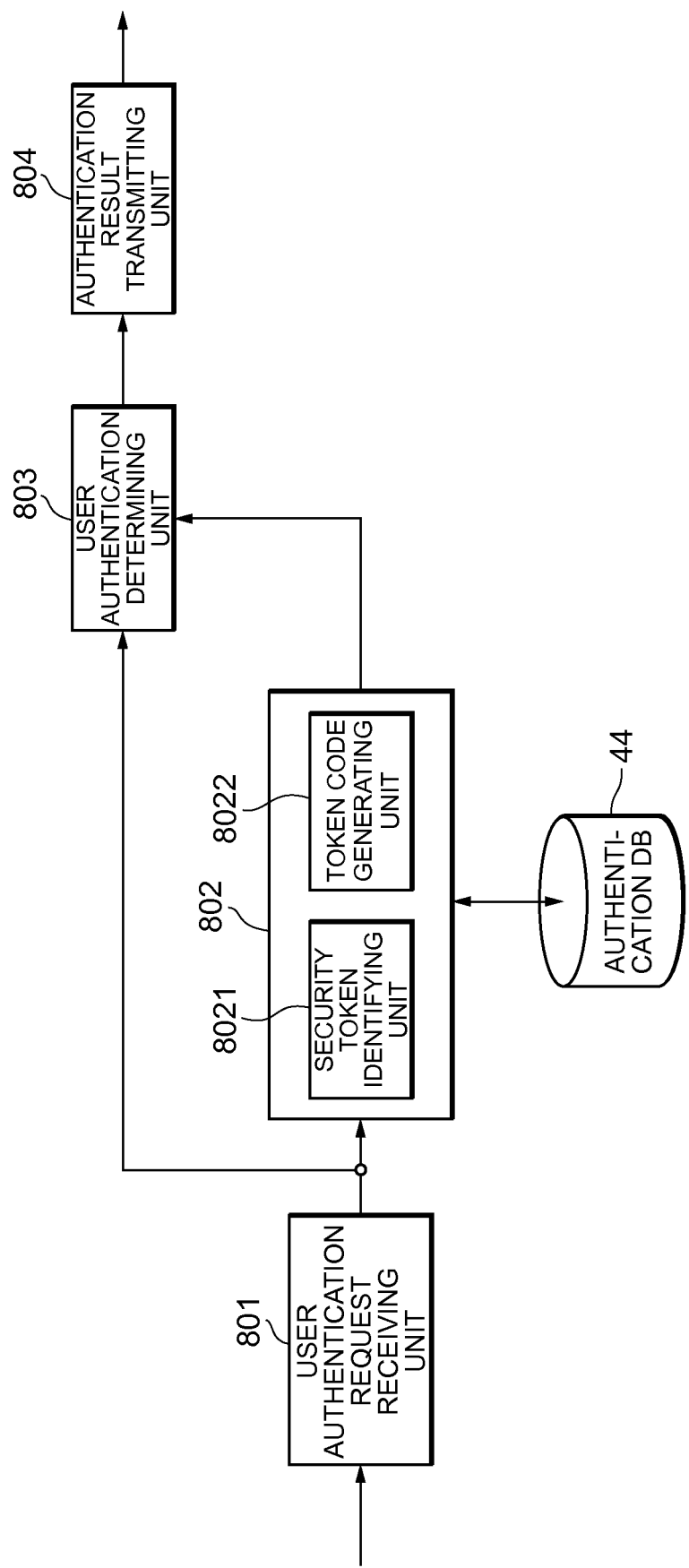
FIG. 8 is a block diagram showing a functional configuration of an authentication system according to an embodiment of the present invention.

Next, a functional configuration of the authentication system 40 according to the present embodiment will be described. FIG. 8 is a block diagram showing a functional configuration of an authentication system according to an embodiment of the present invention.

Referring to FIG. 8, a user authentication request receiving unit 801 may receive a user authentication request including login information from, for example, the usage target system 30. The user authentication request receiving unit 801 may send the login information in the received user authentication request to a security token managing unit 802 and a user authentication determining unit 803, respectively. All of the login information may be distributed to the respective units or parts of the login information necessary for processes performed by the respective units may be sent to the respective units.

The security token managing unit 802 may include, for example, a security token identifying unit 8021 and a token code generating unit 8022. The security token identifying unit 8021 may refer to the authentication database 44 and then send the token ID of the security token program that may be installed in the information communication terminal 20 of the user represented by the login information to the token code generating unit 8022. The token code generating unit 8022 may generate in time synchronous the same token code (one time password) as the security token program identified by the token ID. Specifically, the token code generating unit 8022 may be configured to generate in a time synchronous manner, for each security token program of the user, a same token code as a token code generated by the security token program of the user by using, for example, a same seed and a same mathematical algorithm. A known mathematical algorithm such as a Hash function can be used. The security token managing unit 802 may send the token code generated by the token code generating unit 8022 to the user authentication determining unit 803.

The user authentication determining unit 803 may perform authentication determination of the user based on the login information sent from the user authentication request receiving unit 801 and the token code sent from the token code generating unit 8022 of the security token managing unit 802. Specifically, the user authentication determining unit 803 may compare a password included in the login information with the generated token code. When the password matches the generated token code, the user authentication determining unit 803 may make determination of a successful authentication, whereas when the password does not match the generated token code, the user authentication determining unit 803 may make determination of an unsuccessful authentication. The user authentication determining unit 803 may send a result of the authentication determination to an authentication determination result transmitting unit 804. The authentication determination result transmitting unit 804 may transmit the result of the authentication determination to the usage target system 30 that is a user authentication request source.

Figure 9:
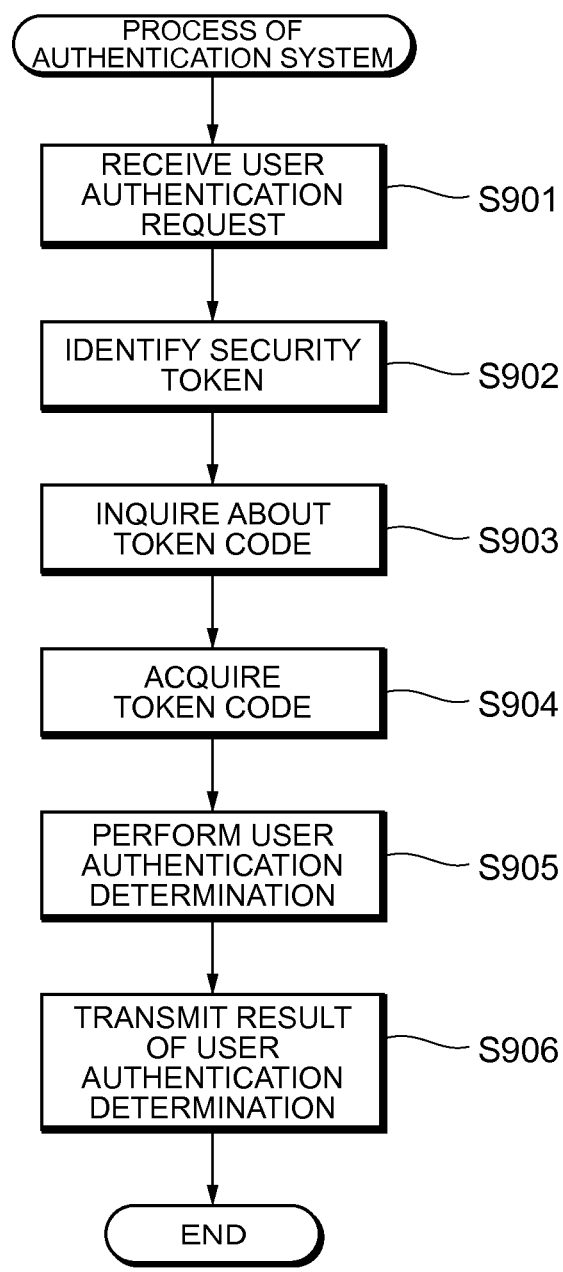
FIG. 9 is a flow chart showing a process performed by an authentication system in a user authentication method according to an embodiment of the present invention.

FIG. 9 is a flow chart showing a process performed by an authentication system in a user authentication method according to an embodiment of the present invention. The process may be achieved when, for example, one or more computing devices serving as the authentication system 40 executes a prescribed program under the control of a processor. The process may be executed, sequentially, or executed in parallel or concurrently, as long as results of the process are not inconsistent.

Specifically, as shown in FIG. 9, upon receipt of a user authentication request including login information from, for example, the usage target system 30 (S901), the authentication server 42 may refer to the authentication database 44 and then identify a security token program (in other words, a token ID) that may be installed in the information communication terminal 20 of the user (S902). In order to acquire the same token code that is in time synchronization with the identified security token program, the authentication server 42 may inquire the synchronization server 46 using the token ID (S903). In response to this, the synchronization server 46 may identify a seed of the user from the token ID, and, in use of a prescribed password generation algorithm, generate the same token code that is in time synchronization with the security token program of the information communication terminal 20, and thus send back the generated token code to the authentication server 42. Accordingly, the authentication server 42 may acquire the same token code as the token code generated by the security token 22 owned by the user (S904).

Next, the authentication server 42 may perform authentication determination of the user based on the password included in the login information sent from the usage target system 30 and the acquired token code (S905). When the authentication server 42 determines that the password included in the login information matches the acquired token code, the authentication server 42 may make determination of a successful authentication, whereas when the password does not match the acquired token code, the authentication server 42 may make determination of an unsuccessful authentication. The authentication server 42 may transmit the result of the authentication determination to the usage target system 30 that is a source of the request for user authentication (S906).

As described above, according to the present embodiment, As the information communication terminal 20 may store a password derivation pattern and have a security token function, user authentication can be performed without receiving a challenge from the authentication system 40.

In addition, while a configuration in which the information communication terminal 20, the usage target system 30, and the authentication system 40 may be communicatively connected via the Internet 10 has been shown in the present embodiment, such a configuration is not restrictive. The information communication terminal 20 and the usage target system 30 may be connected to each other by short-distance communication such as Bluetooth. In addition, for example, when the usage target system 30 is a key opening and closing system of a security room, a password may be entered to a user interface provided in the usage target system 30 according to a code table (refer to FIG. 7) displayed on a login screen on the user interface of the information communication terminal 20. This example may have an advantage that user authentication can be performed even in a situation where a communication function of the information communication terminal 20 is disabled.

Further, the authentication system 40 may be configured so as to receive an advance notice of a user authentication request (to be described in another embodiment) and to only receive a user authentication request corresponding to the advance notice for a certain period of time. According to this configuration, since the authentication system 40 need only receive a user authentication request corresponding to an advance notice when the advance notice is received, a risk of being exposed to an attack by a malicious third party can be reduced and a securer user authentication method and system can be provided.

Second Embodiment (Summary)

The present embodiment discloses a user authentication method and a system for implementing the user authentication method. An information communication terminal may display a code table generated by assigning a token code generated in time synchronization with an authentication system to each of elements of a geometrical pattern on a user interface. A user may extract, by referring to the displayed code table, a character assigned to each of the elements corresponding to the user's own password derivation pattern, and enter the extracted sequence of characters as a password. The authentication system may perform authentication determination with respect to the entered password based on the same code table (i.e., token code) generated in time synchronization with the information communication terminal and the user's password derivation pattern registered in advance.

The present embodiment may differ from the first embodiment described above in that each character in time synchronization with that of an authentication system may be assigned to each of all the elements of a code table and that a password derivation pattern may be registered to the authentication system. In the following description, parts that overlap with the first embodiment will be omitted as appropriate.

Figure 10:
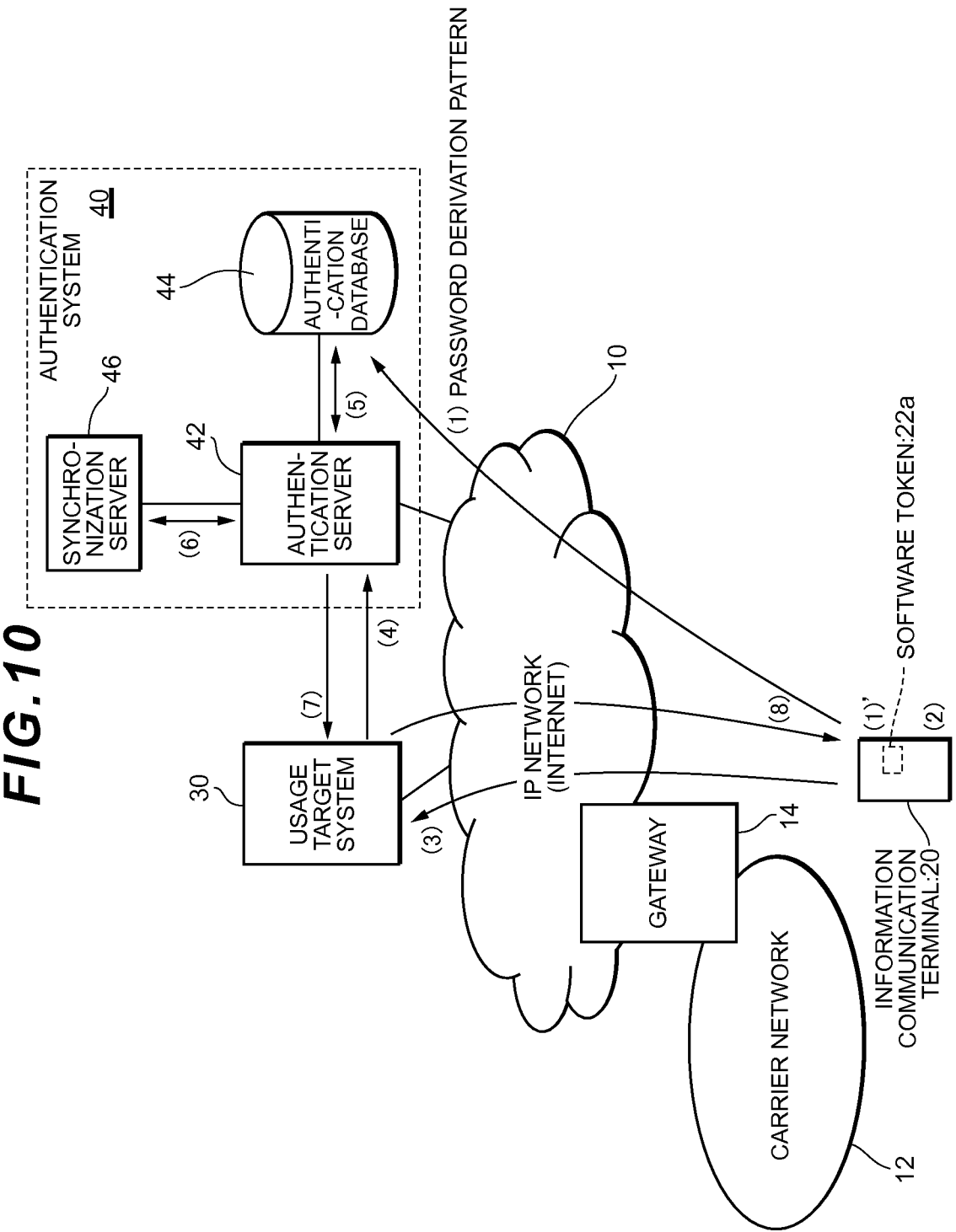
FIG. 10 is a schematic illustration for illustrating a scheme of a user authentication method according to an embodiment of the present invention.

FIG. 10 is a schematic illustration for illustrating a scheme of a user authentication method according to an embodiment of the present invention. As shown in FIG. 10, in this scheme, a user may own an information communication terminal 20 capable of connecting to the Internet 10, and a usage target system 30 and an authentication system 40 may operatively be connected to the Internet 10. For example, the authentication system 40 may be configured to include an authentication server 42, an authentication database 44', and a synchronization server 46. The information communication terminal 20 may configured to include, for example, a software token 22a in a similar manner to the first embodiment described earlier.

The authentication server 42 may be a server computer which cooperates with the authentication database 44' and the synchronization server 46 to comprehensively control a user authentication process. The authentication database 44' according to the present embodiment may be a database that manages user account information which is necessary for user authentication and which is registered in advance by each individual user. For example, the authentication database 44' may manage information related to a user who may access usage target system 30, information regarding a security token of each user, and information regarding a password derivation rule as user account information.

In the present embodiment, prior to using the usage target system 30 that requires user authentication, a user may performs user registration (including registration of a password derivation pattern) with respect to the usage target system 30 first and then sets the software token 22a ((1) and (1)' in FIG. 10).

Specifically, using the information communication terminal 20, the user may register, in advance, the user's own user account information with respect to the usage target system 30 to the authentication database 44' of the authentication system 40. For example, the user may cause an application program for using the usage target system 30 to be executed on the information communication terminal 20, so that such a registration process may be performed, as described earlier. In the present embodiment, the user's password derivation pattern may be registered in the authentication database 44' as a part of user account information.

Further, the user may register a token ID assigned to a security token program in the information communication terminal 20 to the authentication database 44'. Registration of the token ID may be performed during the registration process of user account information as described earlier.

In order to use the usage target system 30, the user may run a corresponding application program on the information communication terminal 20. By this, a login screen may be displayed on a user interface of the information communication terminal 20 and the user may be prompted to enter a user name and a password ((2) in FIG. 10). The login screen may be configured to include a code table in which, at a glance, a random character is assigned to each of a plurality of elements constituting a geometrical pattern. In the present embodiment, a token code generated by the security token program of the information communication terminal 20 may be assigned to all of the elements in the code table.

The user may sequentially extract each character assigned to each of the elements constituting the user's own password derivation pattern from the displayed code table and enter the sequence of numerical symbol as a password. The user may select, for example, a login button after entering the password, a login request including the entered password may be transmitted to the usage target system 30 ((3) in FIG. 10).

Upon receipt of the login request from the information communication terminal 20, the usage target system 30 may transmit a user authentication request based on the login request to the authentication server 42 in order to perform user authentication ((4) in FIG. 10). Upon receipt of the user authentication request, the authentication server 42 may refer to the authentication database 44' and thereby identify the password derivation pattern and the token ID of the user ((5) in FIG. 10). Subsequently, based on the token ID, the authentication server 42 may inquire the synchronization server 46 about the same token code in time synchronization with the security token of the user and acquire a token code for configuring the code table of the user from the synchronization server 46 ((6) in FIG. 10). Next, the authentication server 42 may extract a character from each corresponding element and identify a password in accordance with the password derivation pattern of the user, perform authentication determination by comparing and collating the identified password with a password transmitted from the user, and transmit a result of the authentication determination to the usage target system 30 ((7) in FIG. 10).

The usage target system 30 may send back the result of the authentication determination to the user and proceed to a subsequent process in accordance with the result of the authentication determination ((8) in FIG. 10). For example, in a case when the result of the authentication determination is an unsuccessful authentication, the user may be notified that login was not successful, whereas in a case of a successful authentication, the login is accepted and the user may be provided with a result of a process or become entitled to a service.

(Registration of Password Derivation Pattern)

The user may perform registration using, for example, the registration screen of the password derivation pattern shown in FIG. 3A described earlier. Such a registration screen may be configured by, for example, a screen configuration program described in a page description language. In the present embodiment, a computer system (e.g., the usage target system 30 or the authentication server 42) of an administrator may transmit a screen configuration program that configures such a registration screen to the information communication terminal 20, so that such a registration screen may be displayed on the user interface of the information communication terminal 20 of the user. The user may sequentially tap and select the predetermined number of elements corresponding to a password derivation pattern to be registered in the geometrical pattern.

When the user taps a setting confirmation button 304 after entering necessary information to the respective enter fields, the information communication terminal 20 may transmit a registration request including the entered information to the authentication server 42. Based on the received registration request, the authentication server 42 may provisionally register a password derivation pattern of the user as registration data and cause a setting confirmation screen shown in FIG. 4A as described above on the user interface of the information communication terminal 20.

When the user selects the predetermined elements of a geometrical pattern in a password entry field 401 and subsequently selects an OK button 402, the information communication terminal 20 may transmit a confirmation request including the selected password derivation pattern to the authentication server 42.

The authentication server 42 may determine whether or not the password derivation pattern included in the received confirmation request matches the provisionally-registered password derivation pattern. If the authentication server 42 determines that the password derivation patterns match, the authentication server 42 may formally register user account information including the password derivation pattern to the authentication database 44'.

The information communication terminal 20 may be configured to internally store a provisionally registered password derivation pattern and then transmit a password derivation pattern to be registered to the authentication server 42 after confirming a match with a password derivation pattern entered the second time instead of transmitting the password derivation pattern to be provisionally registered to the authentication server 42.

(Explanation of Information Communication Terminal)

Figure 11:
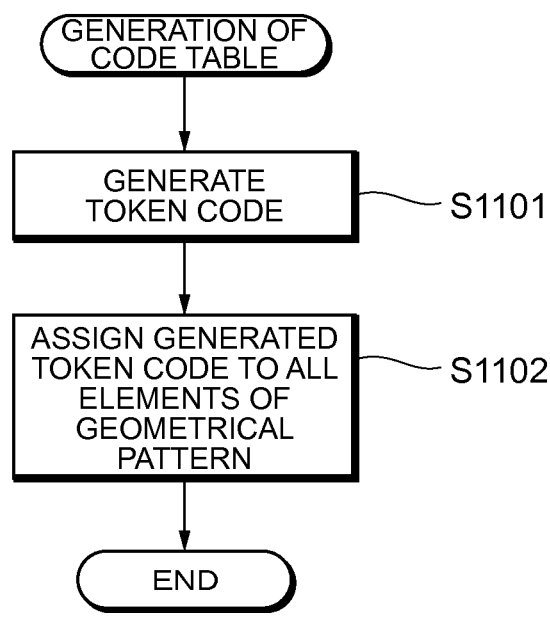
FIG. 11 is a flow chart showing a process performed by an information communication terminal in a user authentication method according to an embodiment of the present invention.

In the present embodiment, a code table generation process by the information communication terminal 20 differs from the first embodiment, and accordingly the process will be described with reference to FIG. 11 which supersedes FIG. 6B.

Specifically, the information communication terminal 20 may call a security token program and generate a token code that is in time synchronization with the synchronization server 46 (S1101). In the present embodiment, the same number of characters constituting a token code as the elements constituting a code table (geometrical pattern) may be generated. In addition, as described earlier, one or more characters may be assigned to each of elements. Next, the information communication terminal 20 may assign such characters constituting the generated token code to the respective elements of the geometrical pattern in order from the top and complete the code table (S1102).

As described above, once the information communication terminal 20 may generate the code table, the information communication terminal 20 may display a login screen (refer to FIG. 7) including the code table and prompt the user to enter a password according to the code table (S602A in FIG. 6). The user may extract, by referring to the code table 702, each character assigned to each of the elements corresponding to the user's own password derivation pattern, and enter the extracted sequence of numerical symbols to the password enter field 703. When the user enters necessary login information (to-be-authenticated information) to the login screen and, for example, selects a login button 704, the information communication terminal 20 may transmit a login request including the login information to the usage target system 30 (S603A). Upon receipt of the login request, the usage target system 30 may transmit a user authentication request including the login information to the authentication server 42 and receive authentication determination of the user. The usage target system 30 may receive a result of the authentication determination from the authentication server and transmit the result of the authentication determination to the information communication terminal 20. By way of this, the information communication terminal 20 may receive the result of the authentication determination with respect to the login request (S604A).

In addition, instead of transmitting a login request to the usage target system 30, the information communication terminal 20 may be configured to directly transmit a login request to the authentication system 40 (e.g., the authentication server 42) and receive a result of the authentication determination.

Further, while the present example adopts a configuration in which to-be-authenticated information includes an entered password, for example, the entered password may be assigned to each of the elements corresponding to a password derivation pattern in a code table so as to be included in to-be-authenticated information as will be described in another embodiment. In this case, the authentication system 40 may extract a password from to-be-authenticated information according to a registered password derivation pattern.

(Explanation of Authentication Database)

Figure 12:
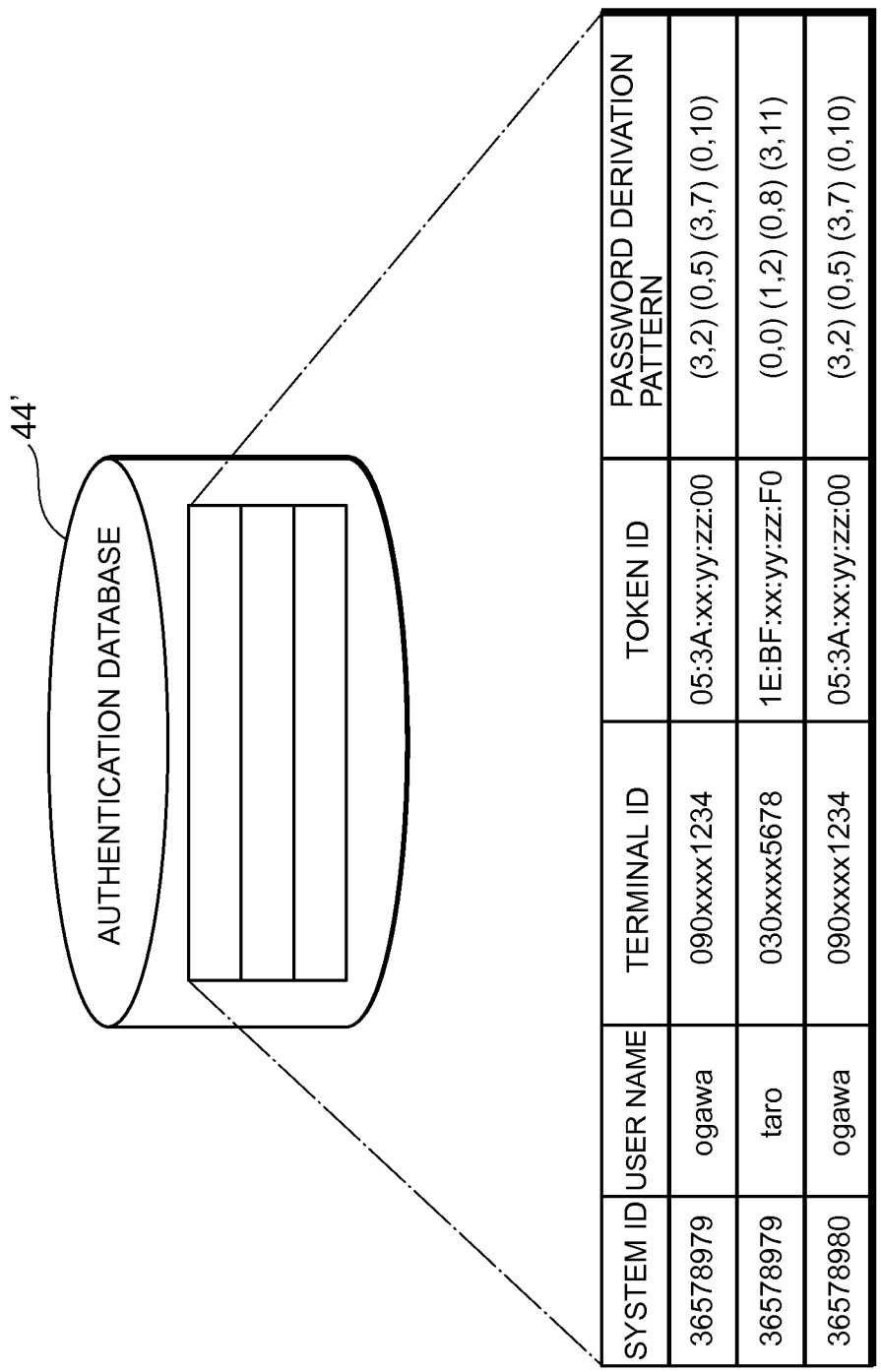
FIG. 12 is an illustration showing an example of a data structure of an authentication database in a user authentication method according to an embodiment of the present invention.

FIG. 12 is an illustration showing an example of a data structure of an authentication database that is used in a user authentication method according to an embodiment of the present invention. For example, the authentication database 44' may manage user account information of each user as one record with respect to each usage target system 30.

Specifically, as shown in FIG. 12, one record in the authentication database 44' may be constituted by respective fields of a system ID, a user name, a terminal ID, a token ID, and a password derivation pattern. In other words, a password derivation pattern may be registered in the authentication database 44' in the present embodiment. The password derivation pattern may be a password derivation pattern registered by each user and represent an arrangement and a selection order of elements selected by the user.

In the present example, a user "ogawa" is registered as a usable user in the respective usage target systems 30 represented by the system IDs "36578979" and "36578980." In addition, an information communication terminal represented by a terminal ID "090xxxx1234" is set as the information communication terminal 20 used by the user "ogawa" for user authentication, and a token ID "05:3A:xx:yy:zz:00" is registered as a software token. Furthermore, "(3, 2), (0, 5), (3, 7), (0, 10)" is registered as the password derivation pattern of the user "ogawa" registered in the usage target system 30 represented by the system ID "36578979."

(Explanation of Authentication Server)

Figure 13:
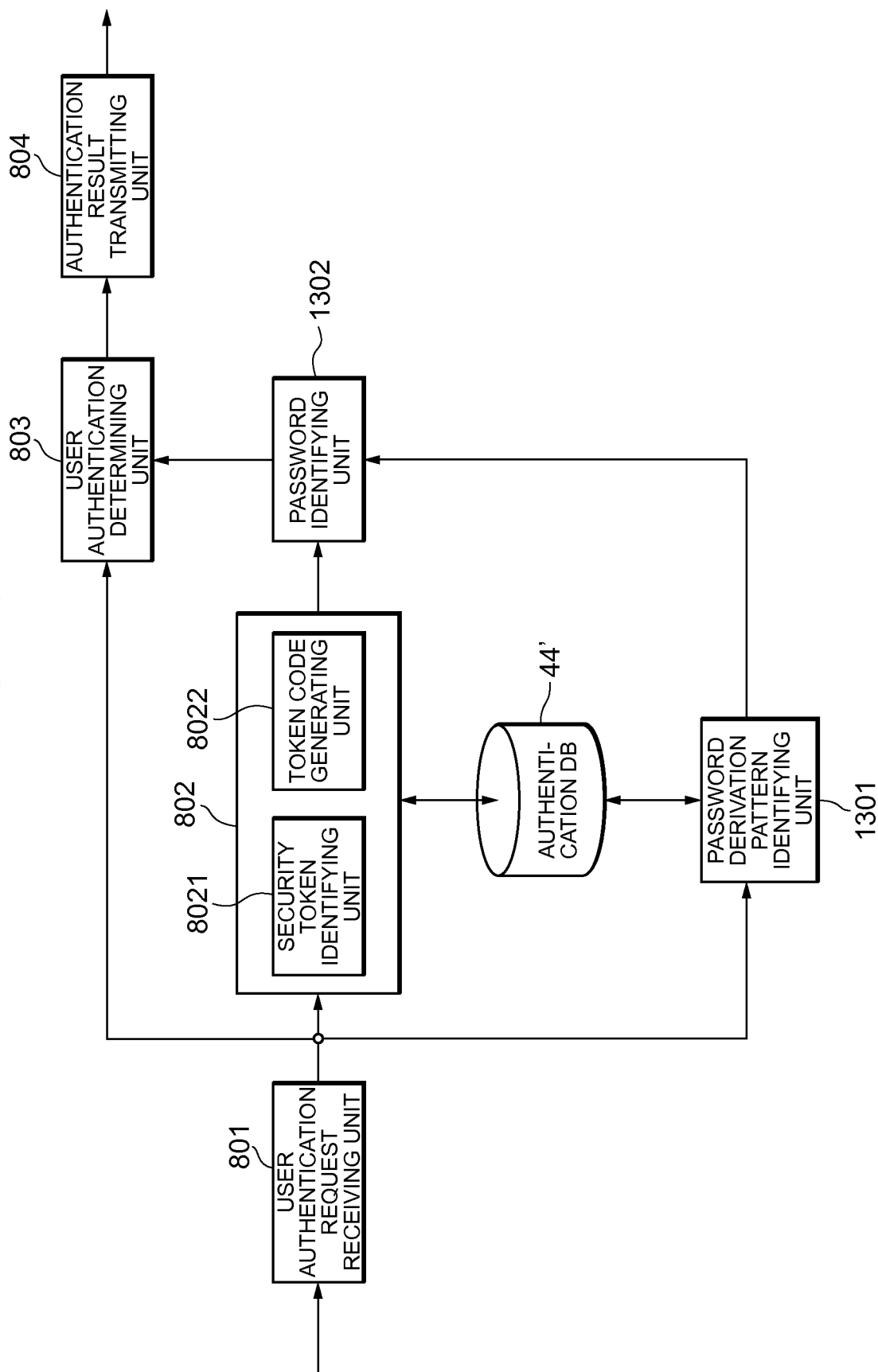
FIG. 13 is a block diagram showing a functional configuration of an authentication system according to an embodiment of the present invention.

Next, a functional configuration of the authentication system 40 according to the present embodiment will be described. FIG. 13 is a block diagram showing a functional configuration of an authentication system according to an embodiment of the present invention. In FIG. 13, the same components as those shown in FIG. 8 may be assigned the same references.

Referring to FIG. 13, a user authentication request receiving unit 801 may receive a user authentication request including login information from, for example, the usage target system 30. The user authentication request receiving unit 801 may respectively send the login information in the received user authentication request to a security token managing unit 802, a password derivation pattern identifying unit 1301, and a user authentication determining unit 803. All of the login information may be distributed to the respective units or parts of the login information necessary for processes performed by the respective units may be sent to the respective units.

The security token managing unit 802 may include, for example, a security token identifying unit 8021 and a token code generating unit 8022. The security token identifying unit 8021 may refer to the authentication database 44' and send the token ID of the security token program that may be installed in the information communication terminal 20 of the user represented by the login information to the token code generating unit 8022. The token code generating unit 8022 may generate the same token code that is in time synchronization with the security token program identified by the token ID. The token code may be constituted by characters corresponding to the number of elements constituting a code table (geometrical pattern). The security token managing unit 802 may send the token code generated by the token code generating unit 8022 to the password identifying unit 1302.

Meanwhile, the password derivation pattern identifying unit 1301 having received the login information sent from the user authentication request receiving unit 801 may refer to the authentication database 44' and identify a password derivation pattern of the user represented by the login information. Specifically, the password derivation pattern identifying unit 1301 may identify a password derivation pattern representing an arrangement and a selection order of elements selected by the user in the elements of a predetermined geometrical pattern. The password derivation pattern identifying unit 1301 may send the identified password derivation pattern to the password identifying unit 1302.

The password identifying unit 1302 may identify a password necessary for authentication determination of the user based on the token code generated by the token code generating unit 8022 and the password derivation pattern identified by the password derivation pattern identifying unit 1301. Specifically, the password identifying unit 1302 may identify a password by sequentially extracting each character corresponding to each of the elements constituting a password derivation pattern in a token code. The password identifying unit 1302 may send the identified password to the user authentication determining unit 803.

Figure 14:
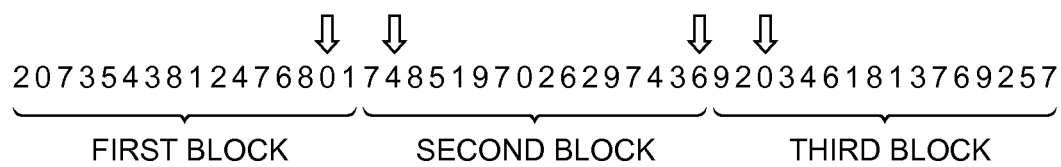
FIG. 14 is an illustration for illustrating identifying a password from a token code in a user authentication method according to an embodiment of the present invention.

For example, it is assumed that the token code generating unit 8022 has generated a token code constituted by a string of 48 numerals as shown in FIG. 14. In the present example, a series of 16 numerical symbols in the token code corresponds to one block. In addition, the registered user's password derivation pattern is assumed to be the pattern shown in FIG. 2A. Therefore, in this case, the password identifying unit 1302 may extract "0460" as the password of the user.

The user authentication determining unit 803 may perform authentication determination of the user based on the login information sent from the user authentication request receiving unit 801 and the password identified by the password identifying unit 1302. Specifically, the user authentication determining unit 803 may compare a password included in the login information with the password identified from the generated token code and the password derivation pattern. In a case when the passwords match, the user authentication determining unit 803 may make determination of a successful authentication, whereas in a case when the passwords do not match, the user authentication determining unit 803 may make determination of an unsuccessful authentication. The user authentication determining unit 803 may send a result of the authentication determination to an authentication determination result transmitting unit 804. The authentication determination result transmitting unit 804 may transmit the result of the authentication determination to the usage target system 30 that is a user authentication request source.

Figure 15:
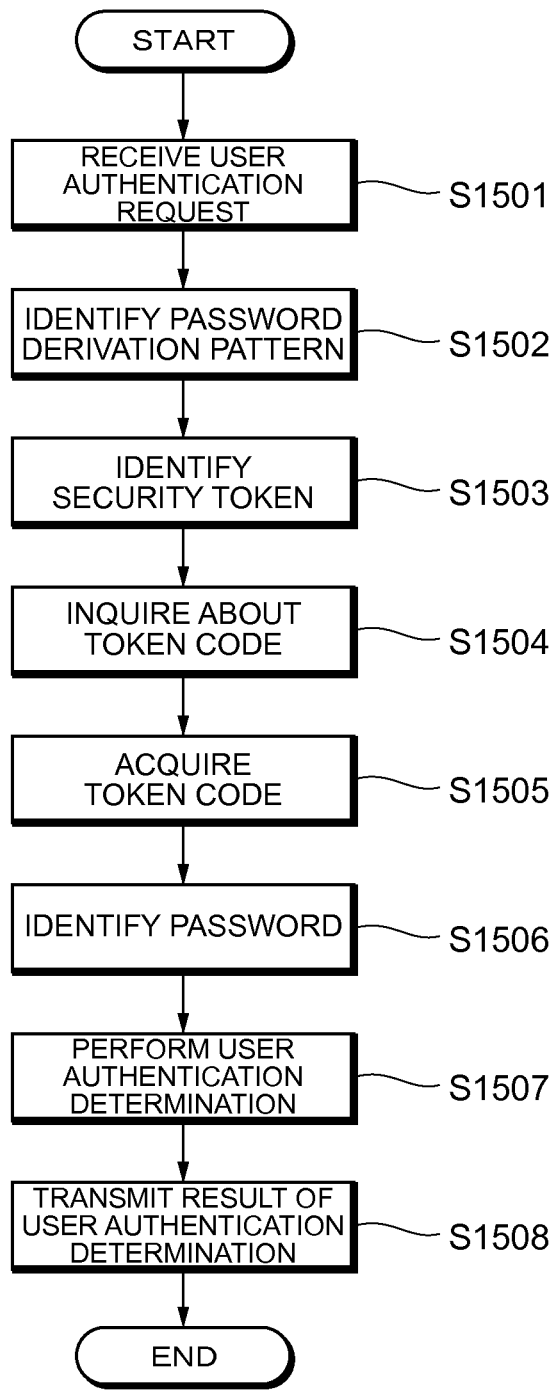
FIG. 15 is a flow chart showing a process performed by an authentication system in a user authentication method according to an embodiment of the present invention.

FIG. 15 is a flow chart showing a process performed by an authentication system in a user authentication method according to an embodiment of the present invention. The process may be achieved when, for example, one or more computing devices serving as the authentication system 40 executes a prescribed program under the control of a processor. The process may be executed sequentially, or executed in parallel or concurrently as long as results of the process are not inconsistent.

Specifically, as shown in FIG. 15, upon receipt of a user authentication request including login information from, for example, the usage target system 30 (S1501), the authentication server 42 may refer to the authentication database 44' and then identify a password derivation pattern of the user (S1502).

Further, the authentication server 42 may refer to the authentication database 44' and then identify a security token program (i.e., a token ID) installed in the information communication terminal 20 of the user (S1503). In order to acquire a token code that is in time synchronization with the identified security token program, the authentication server 42 may inquire the synchronization server 46 using the token ID about a token code (S1504). In response to this, the synchronization server 46 may identify a seed of the user from the token ID, generate the same token code that is in time synchronization with the security token program of the information communication terminal 20 using a prescribed password generation algorithm, and send back the generated token code to the authentication server 42. By way of this, the authentication server 42 may acquire the same token code that is in time synchronization with the token code generated by the security token owned by the user (S1505).

The authentication server 42 having identified the password derivation pattern and the token code of the user may identify a password of the user using the password derivation pattern and the token code (S1506). Specifically, as described above, the authentication server 42 may identify the password of the user by sequentially assigning characters constituting the identified token code to the respective elements of the password derivation pattern.

Next, the authentication server 42 may perform authentication determination of the user based on the password included in the login information sent from the usage target system 30 and the acquired token code (S1507). In a case when the authentication server 42 determines that the password included in the login information matches the acquired token code, the authentication server 42 may make determination of a successful authentication, whereas in a case when the password does not match the acquired token code, the authentication server 42 may make determination of an unsuccessful authentication. The authentication server 42 may transmit the result of the authentication determination to the usage target system 30 that is a user authentication request source (S1508).

By way of the above, the present embodiment may have similar advantages to the first embodiment described earlier. Among others, in the present embodiment, as the authentication system may manage a password derivation pattern and a security token, the information communication terminal can perform user authentication using a password derivation pattern without storing the password derivation pattern.

In addition, the authentication system 40 may be configured to receive an advance notice of a user authentication request and to only accept only a user authentication request corresponding to the advance notice as will be described in another embodiment. By way of this configuration, the authentication system 40 may receive a user authentication request corresponding to an advance notice only when the advance notice is received, a risk of being exposed to an attack by a malicious third party can be reduced and thus a securer user authentication method and system can be provided.

Third Embodiment (Summary)

The present embodiment discloses a user authentication method and a system for implementing the user authentication method. Specifically, a user may enter password information by sequentially assigning each character constituting a token code generated in time synchronization with the authentication system with respect to a geometrical pattern displayed on a user interface of an information communication terminal to each of the elements corresponding to the user's own password derivation pattern; and the authentication system may perform authentication determination with respect to the entered password information based on a token code generated in time synchronization with the information communication terminal Password information according to the present embodiment may include a password derivation pattern in which a token code may be assigned to each of the elements. In the following description, parts that overlap with the first embodiment will be omitted as appropriate.

Figure 16:
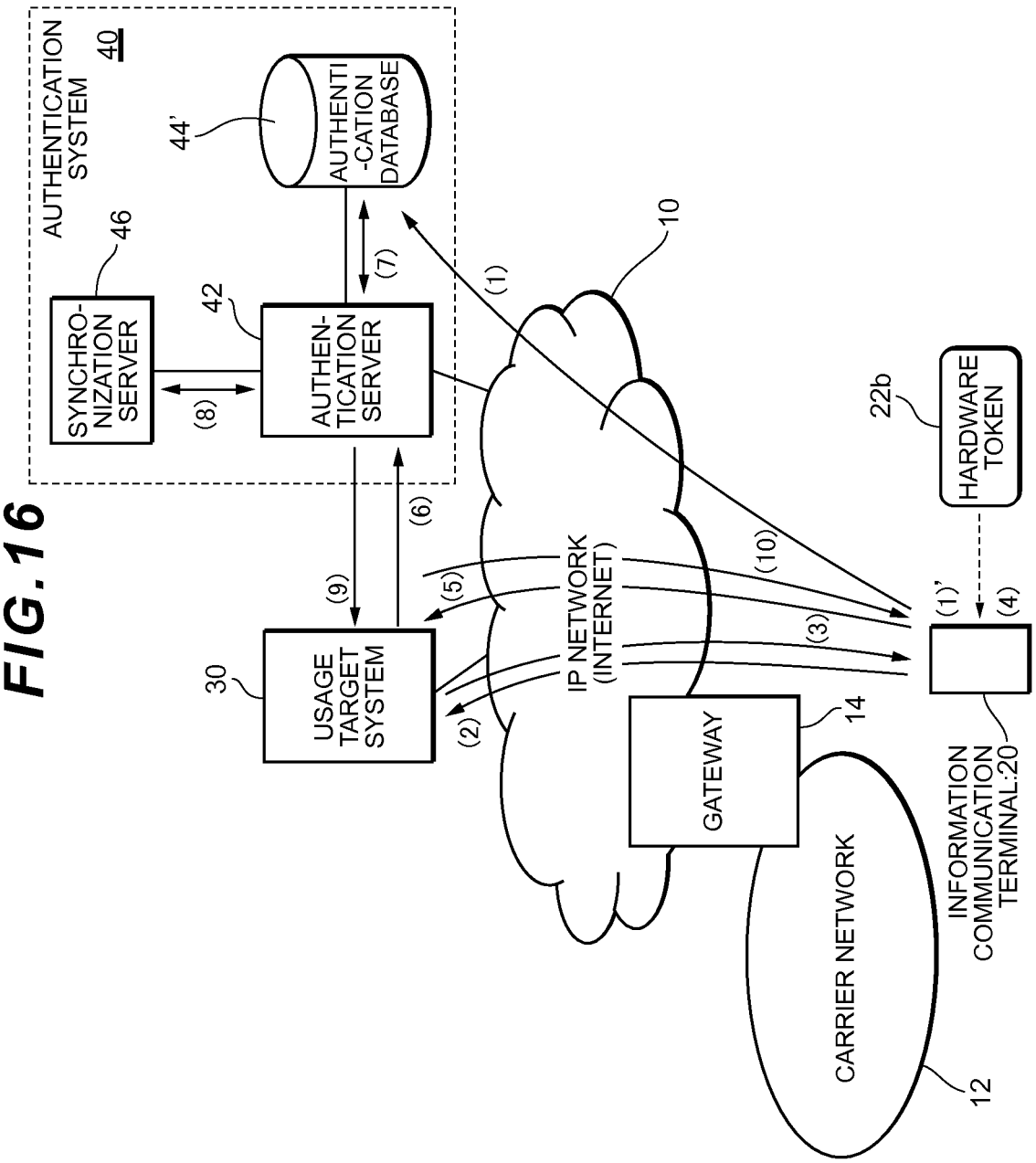
FIG. 16 is a schematic illustration for illustrating a scheme of a user authentication method according to an embodiment of the present invention.

FIG. 16 is a schematic illustration for illustrating a scheme of a user authentication method according to an embodiment of the present invention. As shown in FIG. 16, in this scheme, a user may own an information communication terminal 20 capable of operatively connecting to the Internet 10 and a security token 22 (a hardware token 22b), and a usage target system 30 to be used by the user and an authentication system 40 may be operatively connected to the Internet 10. For example, the authentication system 40 may be configured to include an authentication server 42, an authentication database 44', and a synchronization server 46. The authentication database 44' according to the present embodiment may manage information related to a user who accesses the usage target system 30, information regarding a security token of each user, and information regarding a password derivation rule as user account information in a similar manner to the second embodiment described above. A software token 22a may be used in place of the hardware token 22b as shown in the embodiment described earlier.

In the present embodiment, prior to using the usage target system 30 that requires user authentication, a user may performs user registration (including registration of a password derivation pattern) with respect to the usage target system 30 first and then sets the hardware token 22b ((1) and (1)' in FIG. 16).

Specifically, using the information communication terminal 20, the user registers, in advance, the user's own user account information with respect to the usage target system 30 to the authentication database 44' of the authentication system 40. For example, the user may cause an application program for using the usage target system 30 to be executed on the information communication terminal 20, so that such a registration process may be performed. In the present embodiment, the user's password derivation pattern may be registered in the authentication database 44' as a part of the user account information.

Further, the user may register a token ID assigned to the hardware token 22b to the authentication database 44'. The token ID may be registered during the registration process of user account information described earlier.

When the user accesses the usage target system 30 using the information communication terminal 20 ((2) in FIG. 16), for example, a login screen (entry screen for to-be-authenticated information) may be displayed on the user interface of the information communication terminal 20 and the user may be prompted to enter a user account and a password ((3) in FIG. 16). Such a screen displayed on the user interface of the information communication terminal 20 may be, for example, described and configured by a screen configuration program and/or data (hereinafter, simply referred to as a "screen configuration program") in accordance with a page description language (for example, HTML5). The screen configuration program that configures the login screen may be, for example, directly transmitted from the usage target system 30 or transmitted from the authentication server 42. In the case of the latter, for example, the usage target system 30 may redirect an access request from the user to the authentication server 42, and the authentication server 42 may receive entry of a password in place of the usage target system 30. As will be described later, a password entry screen may include a geometrical pattern and be configured so that an arbitrary character can be entered to each of the elements of the geometrical pattern.

Next, the user may operate the hardware token 22b owned by the user to display a token code and enter the displayed token code to a login entry screen on the information communication terminal 20 ((4) in FIG. 16). In this case, the user may enter the displayed token code to corresponding elements of the geometrical pattern in order from the top according to the user's own password derivation pattern. The user may enter the token code to the login screen and subsequently selects, for example, a login button, and thereby the entered login information (to-be-authenticated information) may be transmitted to the usage target system 30 ((5) in FIG. 16).

Upon receipt of the login information to the login screen from the information communication terminal 20, the usage target system 30 may transmit a user authentication request including the login information to the authentication server 42 in order to perform user authentication ((6) in FIG. 16). In this case, the usage target system 30 may include its own system ID in the user authentication request to be transmitted to the authentication server 42. Accordingly, the authentication server 42 can receive user authentication requests from individual usage target systems 30.

Upon receipt of the user authentication request including the login information, the authentication server 42 may refer to the authentication database 44' and then identify the password derivation pattern of the user ((7) in FIG. 16), inquire the synchronization server 46 about a token code corresponding to the hardware token 22b of the user, and acquire the token code of the user from the synchronization server 46 ((8) in FIG. 16). When the authentication server 42 identifies the password derivation pattern of the user and acquires the token code of the user, the authentication server 42 may perform authentication determination by comparing and collating the password derivation pattern and the token code with the login information transmitted from the user and transmit a result of the authentication determination to the usage target system 30 ((9) in FIG. 16). The usage target system 30 may send back the result of the authentication determination to the user and proceeds to a subsequent process in accordance with the result of the authentication determination ((9) in FIG. 16). For example, in a case when the result of the authentication determination is an unsuccessful authentication, the user may be notified that login was not successful, and in the case of a successful authentication, the login may be accepted and the user become entitled to a service intended for member users.

(Registration of Security Token)

Prior to using the usage target system 30, the user may need to register information related to the hardware token 22 owned by the user to the authentication database 44'. For example, the user may provide the administrator of the usage target system 30 with user account information (for example, a user name and/or a terminal ID) when applying for use of the hardware token 22, the administrator may transfer or lend the hardware token 22 to the user and associates the token ID of the hardware token 22 with the user name and/or the terminal ID to update the user account information in the authentication database 44'. As a result of this, the synchronization server can generate, by recognizing the token ID, the same token code as the token code generated by the hardware token 22 that may be identified by the token ID.

Alternatively, the user may register the token ID of the hardware token 22 together with a password derivation pattern by way of using the password derivation pattern registration screen described above. For example, the registration screen may include a token ID entry field and the user may enter the token ID of the user's hardware token 22 to the token ID entry field.

(Registration of Password Derivation Pattern)

The user may perform registration using, for example, the password derivation pattern registration screen shown in FIG. 3A or 3B as discussed. Such a registration screen may be configured by a screen configuration program described in a page description language (for example, HTML5) and be provided by a computer system (e.g., the usage target system 30 or the authentication server 42) of an administrator. Typically, for example, the authentication server 42 may transmit the screen configuration program to the information communication terminal 20 of the user, and thereby cause a registration screen based on the screen configuration program to be displayed on the user interface of the information communication terminal 20. For example, when the user wishes to register a user account with respect to the usage target system 30, such a registration screen may be provided to the user by a method involving having the usage target system 30 transmit an email including a URL of the registration screen to an email address of the user and the user having received the email selecting the URL in the email. Alternatively, in place of the authentication server 42, the usage target system 30 may provide the registration screen to the information communication terminal 20 of the user and transmit a registration request transmitted from the information communication terminal 20 to the authentication server 42.

When the user taps a setting confirmation button after entering necessary information to the respective entry fields, the information communication terminal 20 may transmit a registration request including the entered information to the authentication server 42. The authentication server 42 may provisionally register the password derivation pattern of the user based on the received registration request and cause a setting confirmation screen to be displayed on the user interface of the information communication terminal 20.

Figure 17:
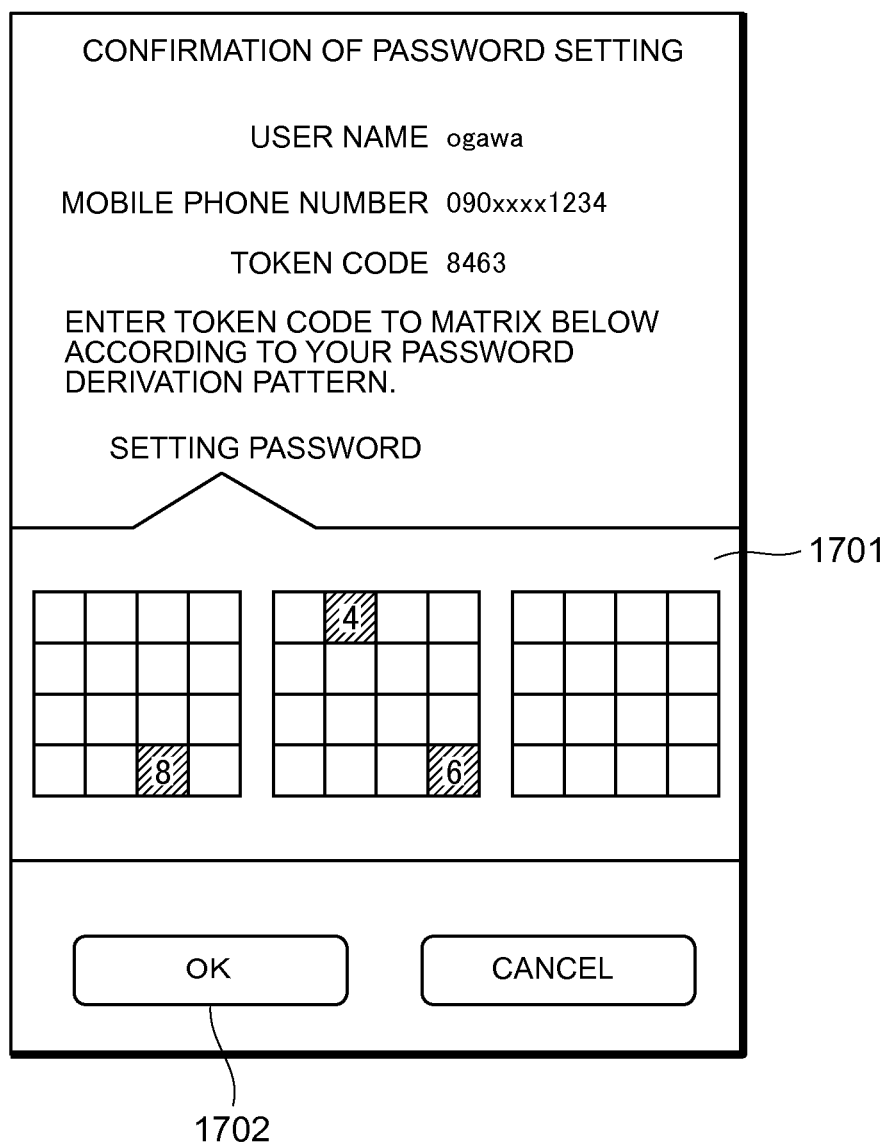
FIG. 17 is an illustration showing an example of a setting confirmation screen displayed on a user interface of an information communication terminal in a user authentication method according to an embodiment of the present invention.

The setting confirmation screen may be a screen for confirming a password derivation pattern by having the user actually enter a token code (one time password) in accordance with the password derivation pattern set by the user. FIG. 17 is an illustration showing an example of a setting confirmation screen displayed on the user interface of the information communication terminal 20.

Specifically, as shown in FIG. 17, the setting confirmation screen may include a password entry field 1701 including a confirmation token code and a geometrical pattern. The user may select an element corresponding to the password derivation pattern entered earlier in the geometrical pattern and, subsequently, enter a character string of the confirmation token code in order from the top. For example, it is assumed that the password derivation pattern may be the pattern shown in FIG. 2A and the confirmation token code is "8463." In this case, the user may sequentially enter a token code to all of the registered elements by selecting an element corresponding to an element represented by number "1" shown in FIG. 2A and entering "8," selecting an element corresponding to an element represented by number "2" and entering "4," and so on.

Instead of a confirmation token code being displayed on a setting confirmation screen, a token code may be displayed on a screen of the hardware token 22b to be used.

When the user enters the token code in the predetermined elements of a geometrical pattern in the password entry field 1701 and subsequently select an OK button 1702, the information communication terminal 20 may transmit a confirmation request including password information constituted by the selected elements and the entered token code to the authentication server 42.

The authentication server 42 may determine whether or not the password information included in the received confirmation request matches the password information derived from the password derivation pattern provisionally registered earlier and the confirmation token code. When the authentication server 42 determines that the password information matches, the authentication server 42 may formally register user account information including the password derivation pattern to the authentication database 44'.

(Explanation of Authentication Database)

Since a same authentication database as that in the second embodiment described earlier can be used as the authentication database 44' according to the present embodiment, a description thereof will be omitted.

(Explanation of Usage Target System)

Figure 18:
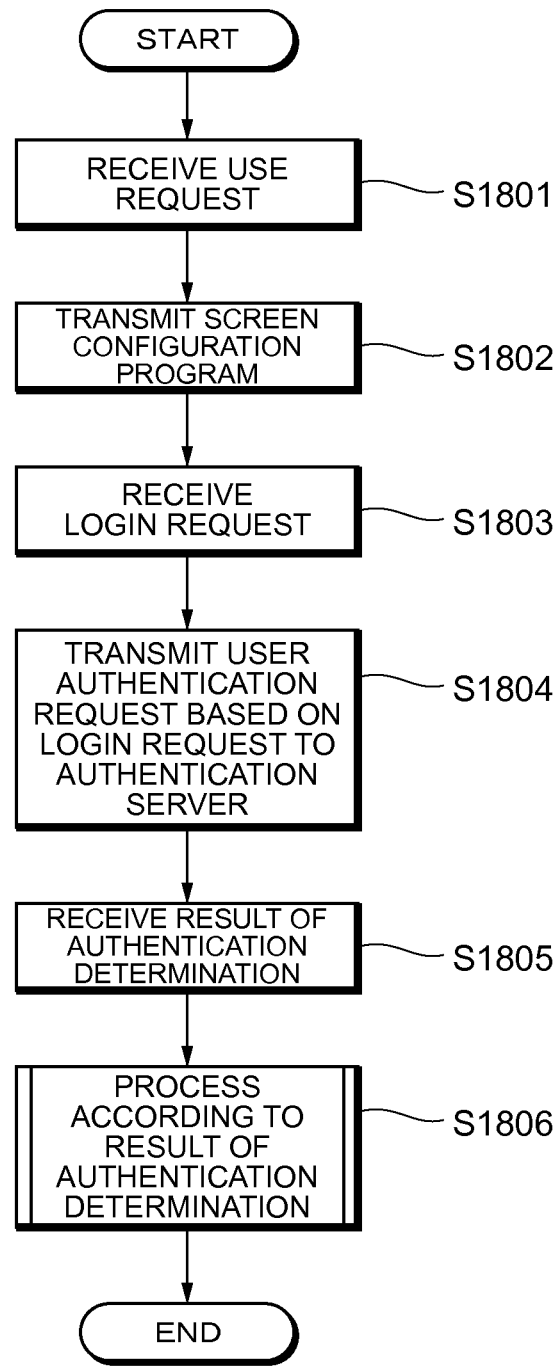
FIG. 18 is a flow chart showing a process performed by a usage target system in a user authentication method according to an embodiment of the present invention.

FIG. 18 is a flow chart showing a process performed by a usage target system in a user authentication method according to an embodiment of the present invention. The process may be achieved when, for example, one or more computing devices serving as the usage target system 30 executes a prescribed program under the control of a processor. The process may be executed sequentially, or executed in parallel or concurrently, as long as results of the process are not inconsistent.

As shown in FIG. 18, first, upon receipt of a use request from the information communication terminal 20 (S1801), the usage target system 30 may transmit a screen configuration program for configuring a login screen (entry screen for to-be-authenticated information) to the information communication terminal 20 in order to cause the login screen to be displayed on the user interface of the information communication terminal 20 (S1802). In response to this, the information communication terminal 20 may display the login screen on the user interface.

Figure 19:
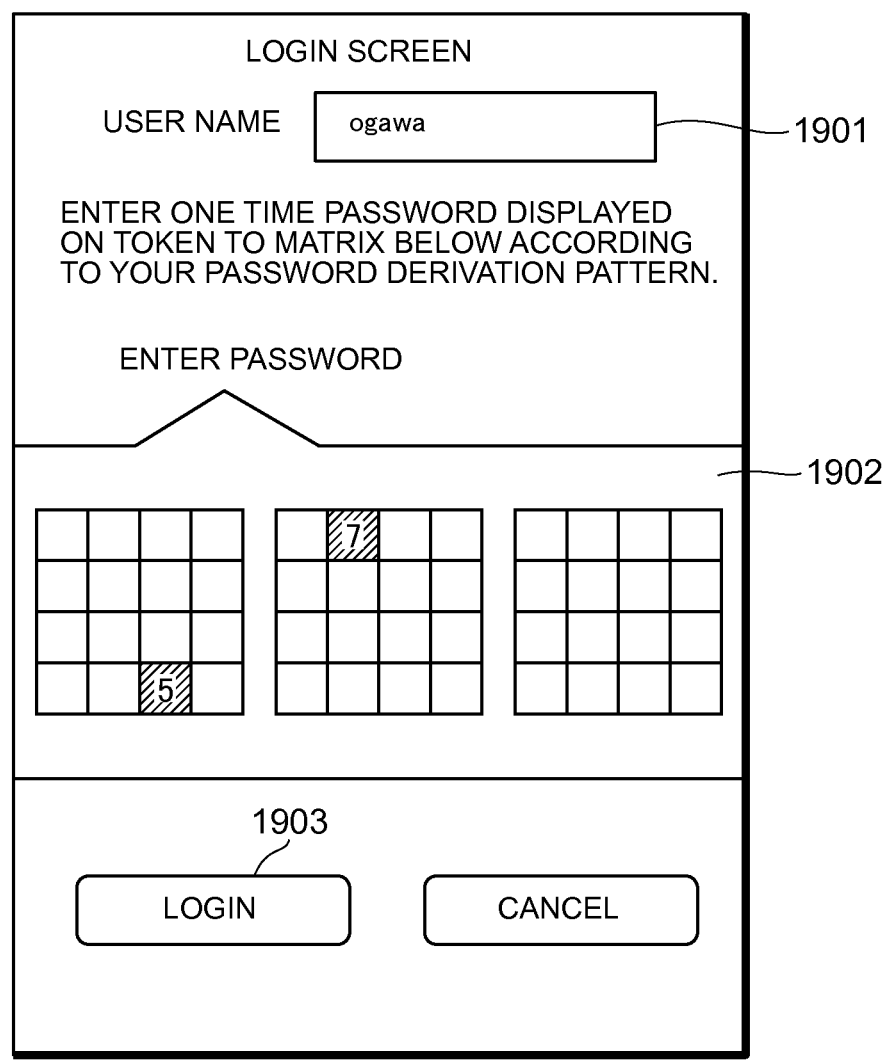
FIG. 19 is an illustration showing an example of a login screen displayed on a user interface of an information communication terminal in a user authentication method according to an embodiment of the present invention.

FIG. 19 is an illustration showing an example of a login screen displayed on the user interface of the information communication terminal 20. As shown in FIG. 19, the login screen may include, for example, a user name entry field 1901 for entering a user account and a password entry field 1902 for entering password information in accordance with a password derivation pattern. The password entry field 1902 may include a geometrical pattern constituted by a plurality of elements and be configured so that the user can enter an arbitrary character to an arbitrary element. The arbitrary character may be entered using, for example, a software keyboard that may be displayed on top of the user interface of the information communication terminal 20 so as to overlap with the user interface. The user may sequentially enter the token code displayed by the hardware token 22 as a result of performing a separate operation to the respective elements corresponding to the user's own password derivation pattern. In other words, the password information entered to the password entry field 1902 of the login screen may be information constituted by a combination of position information in a geometrical pattern and a token code.

Figure 20:
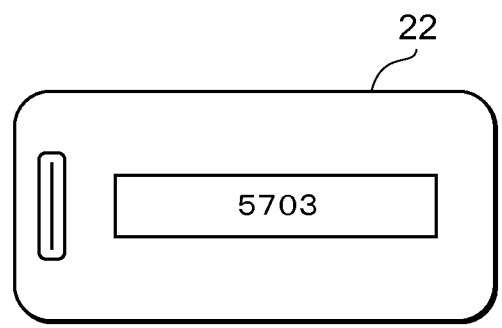
FIG. 20 is an illustration showing an example of a display screen of a hardware token in a user authentication method according to an embodiment of the present invention.

FIG. 20 is an illustration showing an example of a display screen of the hardware token 22. For example, when the user operates a switch (not shown) of the hardware token 22, the hardware token 22 displays a token code on the display screen. In the present example, "5703" is displayed as the token code. The user may put and enter the displayed token code in order from left to respective cells corresponding to the user's own password derivation pattern. Namely, FIG. 19 as discussed shows a situation where the user has entered the token code to the password entry 1902 up to a second digit.

Figure 21A:
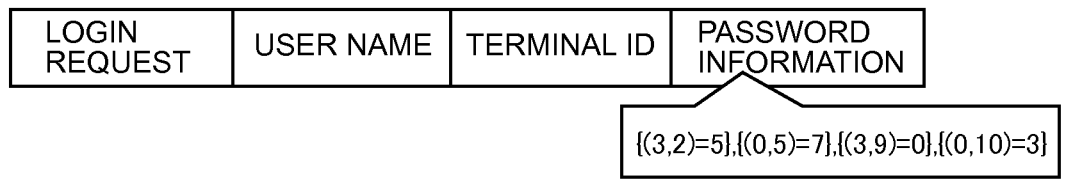
FIG. 21A is an illustration showing an example of a user authentication request in a user authentication method according to an embodiment of the present invention.

When the user enters login information (to-be-authenticated information) necessary for login to the login screen and, for example, selects a login button 1903, the information communication terminal 20 may transmit a login request including the login information to the usage target system 30. FIG. 21 shows an example of a login request. In password information in the login request, as shown in FIG. 21A, a token code may be associated with positional information in a password derivation pattern.

Instead of being constituted by position information in a password derivation pattern and a token code as is the case of the present example, password information may use a code table as shown in FIG. 21B. Specifically, the information communication terminal 20 may generate password information by assigning a token code entered by the user to each element corresponding to the password derivation pattern in the code table. In order to facilitate understanding, a token code entered by the user may be indicated by an arrow in FIG. 21B. Accordingly, even if communication contents are tapped, since the password derivation pattern and the entered token code are not recognized by a third party, leakage of the password derivation pattern and the entered token code can be effectively prevented.

Returning back to FIG. 18, upon receipt of the login request transmitted from the information communication terminal 20 (S1803), the usage target system 30 may transmit a user authentication request based on the login request to the authentication server 42 (S1804). For example, the usage target system 30 may add its own system ID to the login request.

Upon receipt of the user authentication request, the authentication server 42 may perform a user authentication determination process (to be described later) and transmit a result of the authentication determination to the usage target system 30. In response to this, the usage target system 30 may receive the result of the authentication determination (S1805) and perform a subsequent process in accordance with the authentication result (S1806).

As described above, the login screen may be provided by the authentication system 40 (for example, the authentication server 42) instead of by the usage target system 30. In this case, for example, upon receipt of a use request from the user, the usage target system 30 may redirect the use request to the authentication server 42 and await transmission of an authentication result from the authentication server 42.

(Explanation of Authentication Server)

Figure 22B:
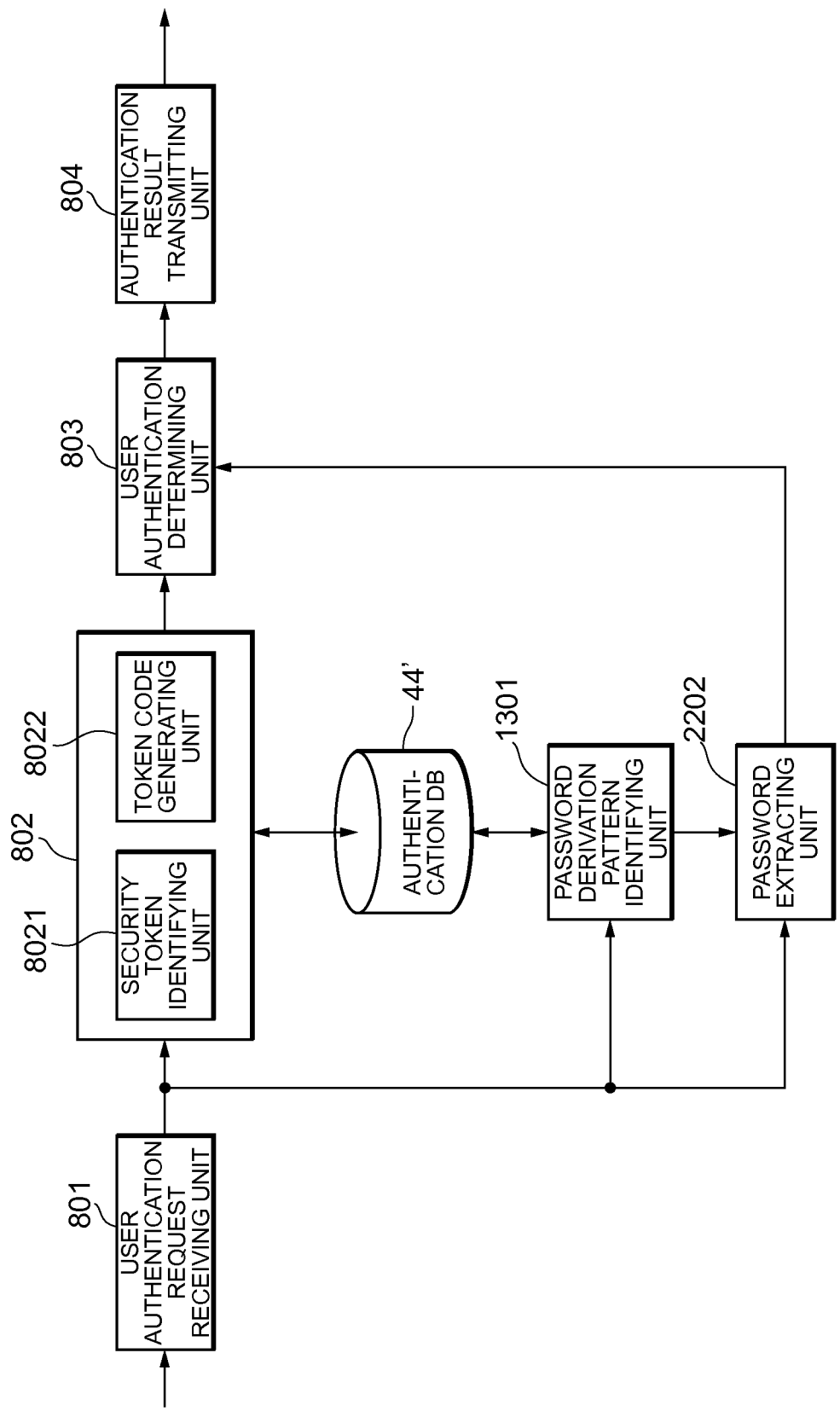
FIG. 22B is a block diagram showing another example of a functional configuration of an authentication system according to an embodiment of the present invention.

Next, a functional configuration of the authentication system 40 according to the present embodiment will be described. FIG. 22A is a block diagram showing a functional configuration of an authentication system according to an embodiment of the present invention. In FIG. 22A, the same components as those shown in FIGS. 8 and 13 may be assigned the same references. In addition, in a case where the authentication system 40 receives a request for user authentication shown in FIG. 21B based on a login request, a description may be given in accordance with a functional configuration shown in FIG. 22B.

Referring now to FIG. 22A, a user authentication request receiving unit 801 may receive a user authentication request including login information from, for example, the usage target system 30. The user authentication request receiving unit 801 may send the login information in the received user authentication request to a security token managing unit 802, a password derivation pattern identifying unit 1301, and a user authentication determining unit 803, respectively. All of the login information may be delivered to the respective units or parts of the login information necessary for processes performed by the respective units may be sent to the respective units.

The security token managing unit 802 may include, for example, a security token identifying unit 8021 and a token code generating unit 8022. The security token identifying unit 8021 may refer to the authentication database 44' and then send the token ID of the security token program that may be installed in the information communication terminal 20 of the user represented by the login information to the token code generating unit 8022. The token code generating unit 8022 may generate the same token code that is in time synchronization with the security token program identified by the token ID. The token code may include characters in the number of characters constituting a code table (geometrical pattern). The security token managing unit 802 may send the token code generated by the token code generating unit 8022 to a password information identifying unit 2201.

Meanwhile, the password derivation pattern identifying unit 1301 having received the login information sent from the user authentication request receiving unit 801 may refer to the authentication database 44' and then identify a password derivation pattern of the user represented by the login information. Specifically, the password derivation pattern identifying unit 1301 may identify a password derivation pattern representing an arrangement pattern and a selection order of elements selected by the user in elements of a predetermined geometrical pattern. The password derivation pattern identifying unit 1301 may send the identified password derivation pattern to the password information identifying unit 2201.

The password information identifying unit 2201 may identify password information necessary for authentication determination of the user based on the token code generated by the token code generating unit 8022 and the password derivation pattern identified by the password derivation pattern identifying unit 1301. Namely, the password information as used herein may include positional information in a geometrical pattern and a token code. The password information identifying unit 2201 may send the identified password information to the user authentication determining unit 803.

The user authentication determining unit 803 may perform authentication determination of the user based on the login information sent from the user authentication request receiving unit 801 and the password information sent from the password information identifying unit 2201. Specifically, the user authentication determining unit 803 may compare password information included in the login information with the password information sent from the password information identifying unit 2201. In a case when the pieces of password information match each other, the user authentication determining unit 803 may make determination of a successful authentication, whereas in a case when the pieces of password information do not match each other, the user authentication determining unit 803 may make determination of an unsuccessful authentication. The user authentication determining unit 803 may send a result of the authentication determination to an authentication determination result transmitting unit 804. The authentication determination result transmitting unit 804 may then transmit the result of the authentication determination to the usage target system 30 that is a user authentication request source.

Figure 23:
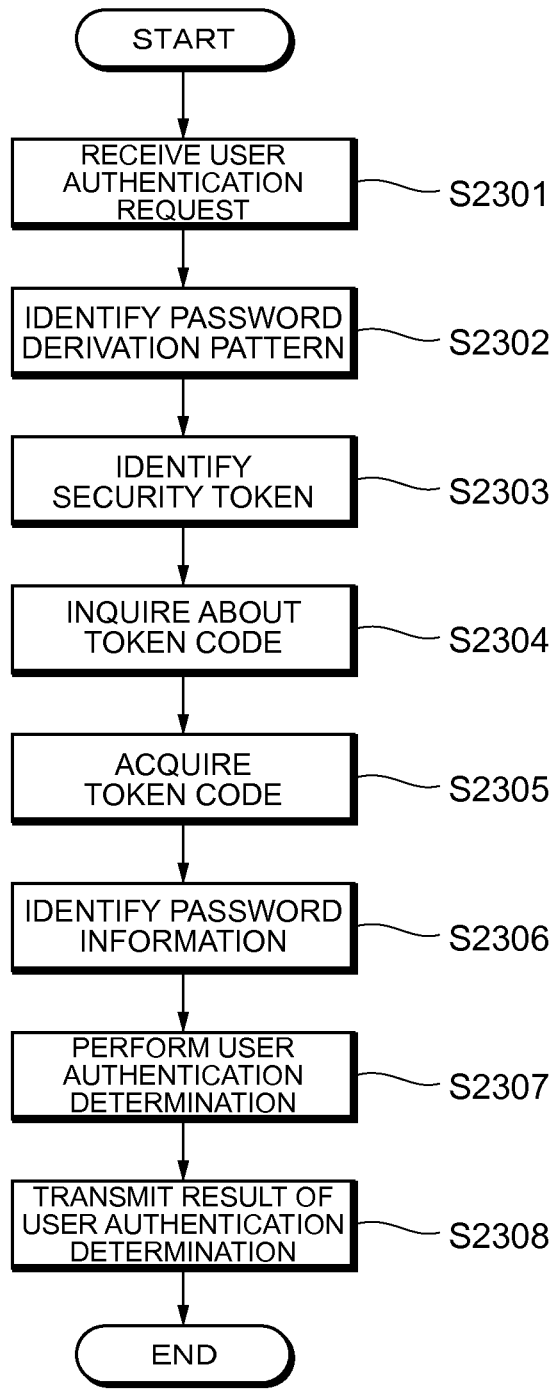
FIG. 23 is a flow chart showing a process performed by an authentication system in a user authentication method according to an embodiment of the present invention.

FIG. 23 is a flow chart showing a process performed by an authentication system in a user authentication method according to an embodiment of the present invention. The process may be achieved when, for example, one or more computing devices serving as the authentication system 40 may execute a prescribed program under control of a processor. The process may be executed sequentially, or executed in parallel or concurrently, as long as results of the process are not inconsistent.

Specifically, as shown in FIG. 23, upon receipt of a user authentication request including login information from, for example, the usage target system 30 (S2301), the authentication server 42 may refer to the authentication database 44' and then identify a password derivation pattern of the user (S2302).

Further, the authentication server 42 may refer to the authentication database 44' and then identify a security token program (token ID) installed in the information communication terminal 20 of the user (S2303). In order to acquire a token code that is in time synchronization with the identified security token program, the authentication server 42 may inquire the synchronization server 46 using the token ID about a token code (S2304). In response to this, the synchronization server 46 may identify a seed of the user from the token ID, generate a same token code that is in time synchronization with the security token program of the information communication terminal 20, and send back the generated token code to the authentication server 42. By way of this, the authentication server 42 may acquire the same token code that is in time synchronization with the token code generated by the security token owned by the user (S2305).

The authentication server 42 having identified the token code and the password derivation pattern of the user may identify password information of the user using the token code and the password derivation pattern (S2306). Specifically, the authentication server 42 may identify password information of the user by assigning a character string or the like constituting the identified token code to respective elements in order from the top according to a selection order of elements of the password derivation pattern.

The authentication server 42 may next perform authentication determination of the user based on the login information sent from the usage target system 30 and the identified password information (S2307). In a case when the authentication server 42 determines that the password information included in the login information matches the identified password information, the authentication server 42 may make determination of a successful authentication, whereas in a case when the pieces of password information do not match each other, the authentication server 42 may make determination of an unsuccessful authentication. The authentication server 42 may then transmit a result of the authentication determination to the usage target system 30 that is a user authentication request source (S2308).

FIG. 22B is a block diagram showing another example of a functional configuration of an authentication system according to an embodiment of the present invention. Specifically, FIG. 22B shows a functional configuration of the authentication system 40 corresponding to the user authentication request shown in FIG. 21B. In FIG. 22B, the same components as those shown in the drawings described earlier may be assigned the same references.

Referring now to FIG. 22B, a user authentication request receiving unit 801 may receive a user authentication request including login information from, for example, the usage target system 30. The user authentication request receiving unit 801 may send the login information in the received user authentication request to a security token managing unit 802, a password derivation pattern identifying unit 1301, and a password extracting unit 2202, respectively. All of the login information may be delivered to the respective units or parts of the login information necessary for processes performed by the respective units may be sent to the respective units.

As described above, the password derivation pattern identifying unit 1301 having received the login information sent from the user authentication request receiving unit 801 may refer to the authentication database 44' and then identify a password derivation pattern of the user represented by the login information. The password derivation pattern identifying unit 1301 may send the identified password derivation pattern to the password extracting unit 2202.

Further, as described above, the security token managing unit 802 may refer to the authentication database 44' and then generate the same token code that is in time synchronization with a security token program installed in the information communication terminal 20 of the user represented by the login information based on a token ID of the security token program. In the present embodiment, the token code generated here may be regarded as a password. The security token managing unit 802 may then send the generated token code to the user authentication determining unit 803.

Meanwhile, the password extracting unit 2202 having received the login information sent from the user authentication request receiving unit 801 may extract a password necessary for authentication determination of the user from password information in the user authentication request based on the password derivation pattern identified by the password derivation pattern identifying unit 1301.

The user authentication determining unit 803 may perform authentication determination of the user based on the token code sent from the security token managing unit 802 and the password sent from the password extracting unit 2202. Specifically, the user authentication determining unit 803 may compare the token code sent from the security token managing unit 802 with the password extracted from the login information. In a case when the token code matches the password, the user authentication determining unit 803 may make determination of a successful authentication, whereas in a case when the token code does not match the password, the user authentication determining unit 803 may make determination of an unsuccessful authentication. The user authentication determining unit 803 may then send a result of the authentication determination to an authentication determination result transmitting unit 804. The authentication determination result transmitting unit 804 may transmit the result of the authentication determination to the usage target system 30 that is a user authentication request source.

The present embodiment may have similar advantages to the embodiments described above. Among others, according to the present embodiment, a user authentication determination can be performed using password information in which a password derivation pattern and a token code are interrelated with each other.

Further, the authentication system 40 may be configured to receive an advance notice of a user authentication request as described in other embodiments and to accept only user authentication request corresponding to the advance notice. By way of this configuration, the authentication system 40 may receive a user authentication request corresponding to an advance notice only when the advance notice is received, a risk of being exposed to an attack by a malicious third party can be reduced and thus a securer user authentication method and system can be provided.

Fourth Embodiment (Summary)

The present embodiment discloses a user authentication method configured to switch any of the user authentication methods shown in the embodiments described above in accordance with a prescribed environment or condition of a user. Hereinafter, an example will be described in which switching is performed to any of the user authentication method shown in the first embodiment (hereinafter, referred to as the "first user authentication method") and the user authentication method shown in the second embodiment (hereinafter, referred to as the "second user authentication method").

In the present example, it is assumed that the usage target system 30 may be a key opening and closing system of an automatic locker or a security room, an automatic teller machine (ATM), or the like. Typically, such a usage target system 30 may be configured to receive a password, a PIN, or the like directly from a user. In addition, the usage target system 30 may be configured to include functions of the authentication system 40 therein in order to achieve the first user authentication method. Specifically, the usage target system 30 may be configured to be capable of performing authentication determination with respect to a password entered by a user using a time-synchronous token code without communicating with the authentication system 40 from which the usage target system 30 may physically be separated. However, this does not mean to exclude a configuration in which the usage target system 30 may communicatively be connected to the authentication system 40. In order to achieve the second user authentication method, the authentication system 40 may include an authentication database 44' storing password derivation patterns.

Figure 24A:
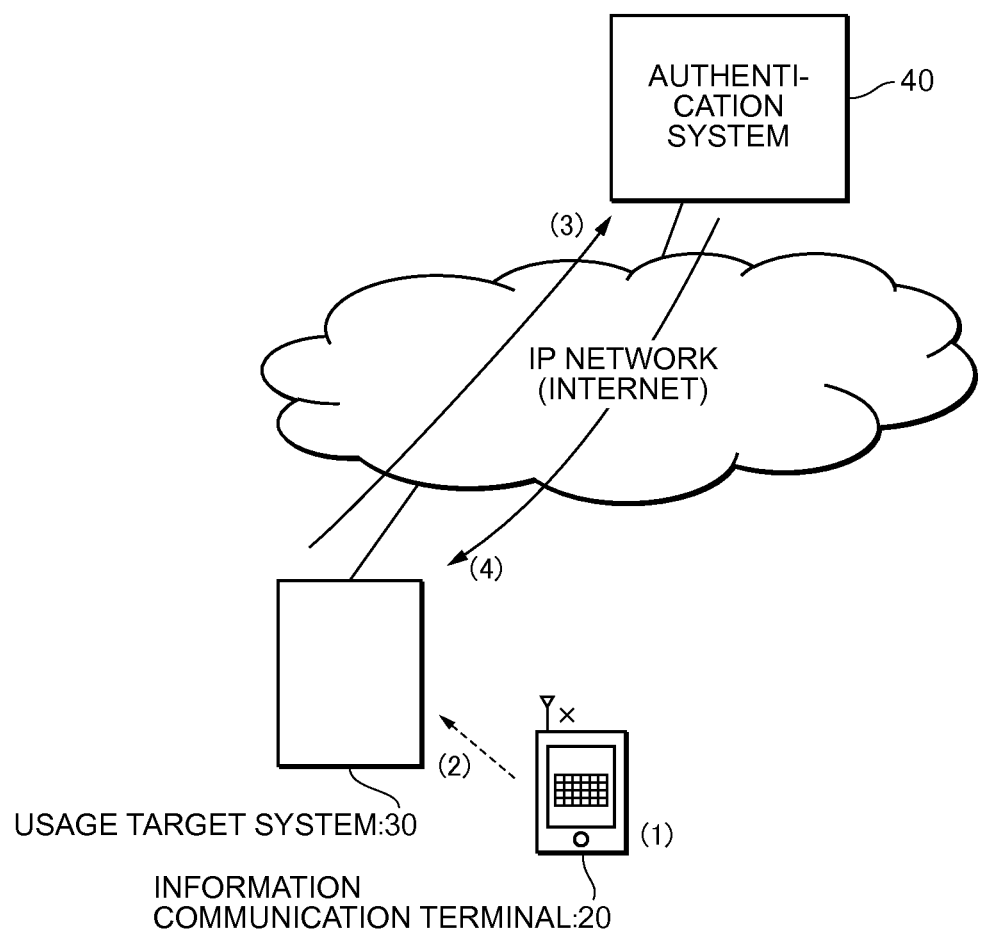
FIG. 24A is a schematic illustration for illustrating a scheme of a user authentication method according to an embodiment of the present invention.
Figure 24B:
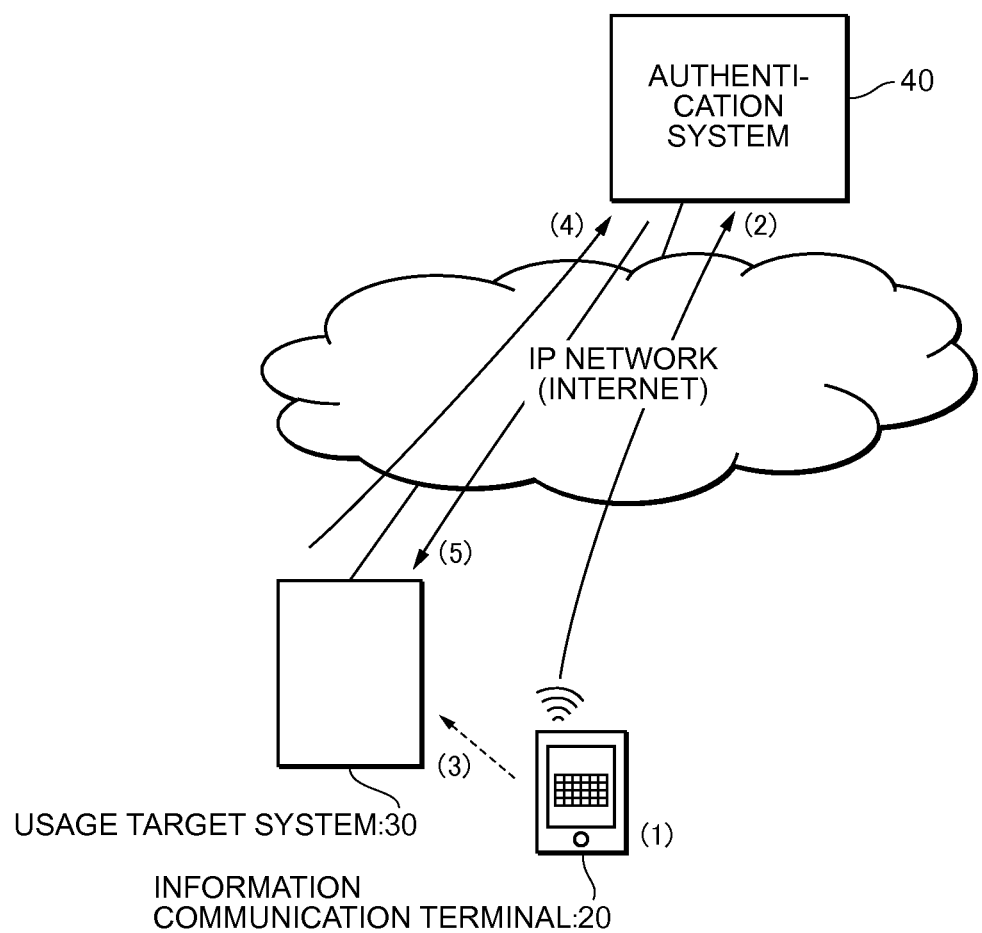
FIG. 24B is a schematic illustration for illustrating a scheme of a user authentication method according to an embodiment of the present invention

FIGS. 24A and 24B are schematic illustrations for illustrating a scheme of a user authentication method according to an embodiment of the present invention. Specifically, FIG. 24A shows an example of a scheme when the first user authentication method is used and FIG. 24B shows an example of a scheme when the second user authentication method is used.

As shown in FIGS. 24A and 24B, the user may own an information communication terminal 20 capable of connecting to the Internet 10 and be in an environment where the user can directly operate the usage target system 30. In addition, the usage target system 30 and the authentication system 40 may be connected to the Internet 10. Further, preliminary steps such as user registration are omitted in FIGS. 24A and 24B.

First, a case where the information communication terminal 20 of the user is unable to connect to a wireless LAN, a carrier network, or the like and is therefore in an environment or situation where the information communication terminal 20 cannot connect to the Internet 10 will be described with reference to FIG. 24A.

The user may run an application program for using the usage target system 30 by operation of the information communication terminal 20. As the information communication terminal 20 is unable to perform network communication, the information communication terminal 20 may generate a token code in time synchronization with the authentication system 40 by using the software token 22a, generate a code table by assigning the token code to elements constituting an internally-registered password derivation pattern and assigning randomly-generated characters to the remaining elements, and thereafter displays the code table on the user interface ((1) in FIG. 24A). The user may extract, by referring to the displayed code table, the character assigned to each of the elements constituting the password derivation pattern, and enter the extracted sequence of characters as a password to the user interface of the usage target system 30 ((2) in FIG. 24A).

Upon receipt of the entered password, the usage target system 30 may transmit a user authentication request including the entered password to the authentication system 40 ((3) in FIG. 24A). Upon receipt of the user authentication request, the authentication system 40 may perform authentication determination with respect to the entered password in accordance with the first user authentication method described above. Specifically, the authentication system 40 may compare and collate the token code generated in time synchronization with the information communication terminal 20 with the entered password, perform authentication determination, and transmit a result of the authentication determination to the usage target system 30 ((4) in FIG. 24A). In addition, the authentication system 40 may be configured to inform the usage target system 30 of a result of the authentication determination incorporating information regarding the presence or lack of an advance notice of a user authentication request (to be described later) therein.

Upon receipt of the result of the authentication determination, the usage target system 30 may executes a predetermined process. Specifically, in a case of an unsuccessful authentication, the usage target system 30 may display a screen indicating that login could not be performed on the user interface, or in a case of a successful authentication, the usage target system 30 may accept login and provides a predetermined service.

Next, a case where the information communication terminal 20 of the user is in an environment or situation where the information communication terminal 20 is able to connect to the Internet 10 will be described with reference to FIG. 24B. In such an environment, from the perspective of security, the authentication system 40 may be configured to receive an advance notice of a user authentication request as described below and to receive only a user authentication request that corresponds to the advance notice.

The user may run an application program for using the usage target system 30 by operation of the information communication terminal 20. As the information communication terminal 20 is in an environment where the information communication terminal 20 is able to perform network communication, the information communication terminal 20 may display a code table, which is configured by assigning a token code in time synchronization with the authentication system by using a software token to each of elements of a geometrical pattern, on the user interface ((1) in FIG. 24B).

At this time, the information communication terminal 20 transmits to the authentication system 40 an advance notice of a user authentication request indicating that the application program may be executed on the information communication terminal 20 and thus a user authentication procedure may take place ((2) in FIG. 24B). The advance notice of a user authentication request may be transmitted to the authentication system 40 via the usage target system 30 or may be directly transmitted to the authentication system 40. When the authentication system 40 receives the advance notice, the authentication system 40 may perform control so that the second user authentication method may be used for the user authentication determination process. Further, upon receipt of the advance notice, for example, the authentication system 40 may perform control so that a user authentication request with respect to the user can be received for a predetermined period of time. Furthermore, the authentication system 40 may inform the usage target system 30 that the advance notice has been received at this timing (i.e., before sending a result of the authentication determination).

The user may extract, by referring to the displayed code table, the character assigned to each of the elements constituting the password derivation pattern, and enter the sequence of characters as a password to the user interface of the usage target system 30 ((3) in FIG. 24B).

Upon receipt of the entered password, the usage target system 30 may transmit a user authentication request including the entered password to the authentication system 40 ((4) in FIG. 24B). For example, the authentication system 40 may be configured to allow, only when a user authentication request arrives within a predetermined period of time after receiving the advance notice of the user authentication request, such reception of the request. Upon receipt of the user authentication request, the authentication system 40 may perform authentication determination with respect to the entered password in accordance with the second user authentication method described above. Specifically, the authentication system 40 may extract a character of each of the elements constituting a password derivation pattern in the token code generated in time synchronization with the information communication terminal 20, compare and collate the extracted numerical string with the entered password, perform authentication determination, and transmit a result of the authentication determination to the usage target system 30 ((5) in FIG. 24B). The authentication system 40 may be configured to incorporate information regarding the presence or lack of an advance notice of a user authentication request in a result of the authentication determination, instead of sending such information in advance.

Upon receipt of the result of the authentication determination, the usage target system 30 may executes a predetermined process in a similar manner. The usage target system 30 may perform control so as to change a type or level of service to be provided to the user based on information regarding the presence or lack of an advance notice which is provided by the authentication system 40.

(Explanation of Process by Information Communication Terminal)

Figure 25:
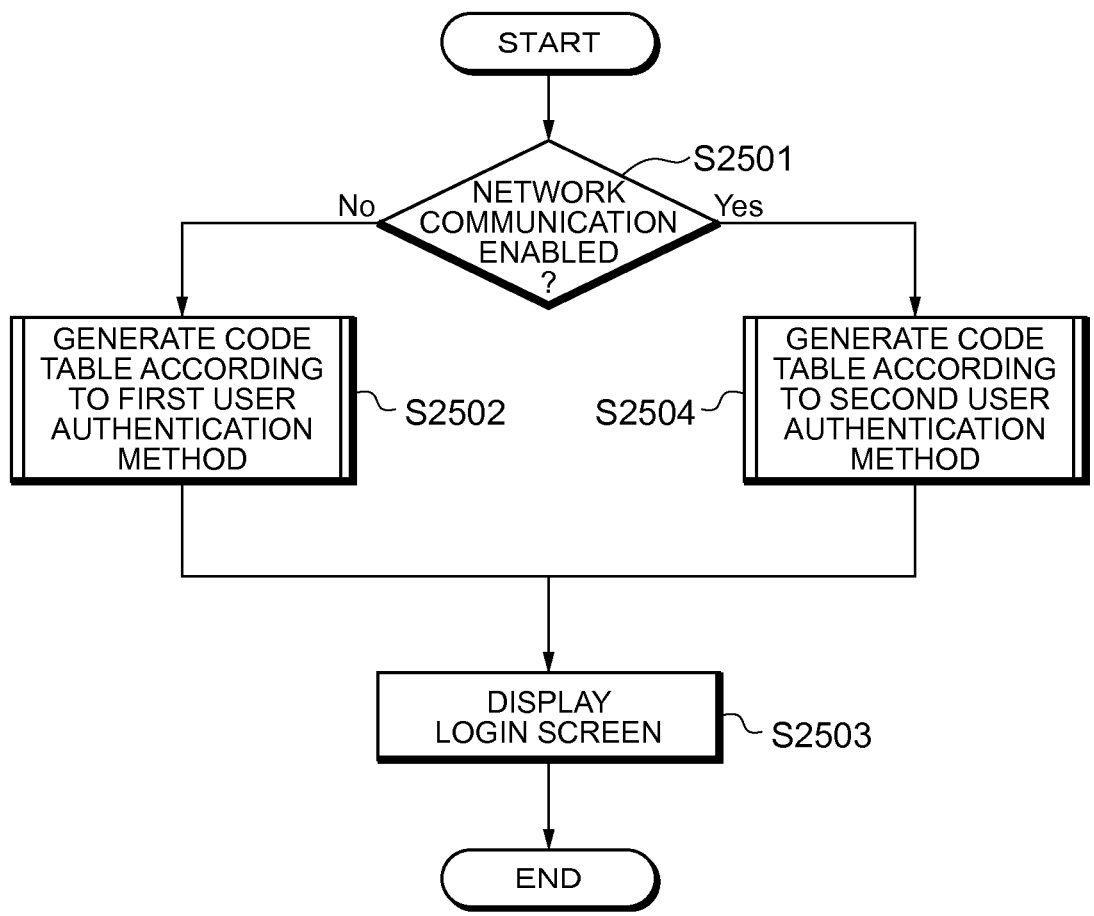
FIG. 25 is a flow chart showing a process performed by an information communication terminal in a user authentication method according to an embodiment of the present invention.

FIG. 25 is a flow chart showing a process performed by an information communication terminal in a user authentication method according to an embodiment of the present invention.

As shown in FIG. 25, upon launch of execution of an application program, the information communication terminal 20 may determine whether or not network communication is enabled (S2501). When the information communication terminal 20 determines that network communication is disabled (No in S2501), the information communication terminal 20 may generate a code table in accordance with the first user authentication method (S2502) and display the code table on the user interface (S2503). Specifically, a code table in accordance with the first user authentication method may be generated by the method as shown in FIG. 6B.

On the other hand, when the information communication terminal 20 determines that network communication is enabled (Yes in S2501), the information communication terminal 20 may generate a code table in accordance with the second user authentication method (S2504) and display the code table on the user interface (S2503). Specifically, a code table in accordance with to the second user authentication method may be generated by the method as shown in FIG. 11.

The user may extract, by referring to the displayed code table, the character assigned to each element constituting the password derivation pattern, and enter the sequence of characters as a password to the user interface of the usage target system 30. As is apparent from the above, as the code tables displayed on the user interface of the information communication terminal 20 only differ from each other in generation methods thereof, the user may not need to be conscious of changing methods of extracting a character according to which generation method has been used.

(Description of Authentication Server)

Figure 26:
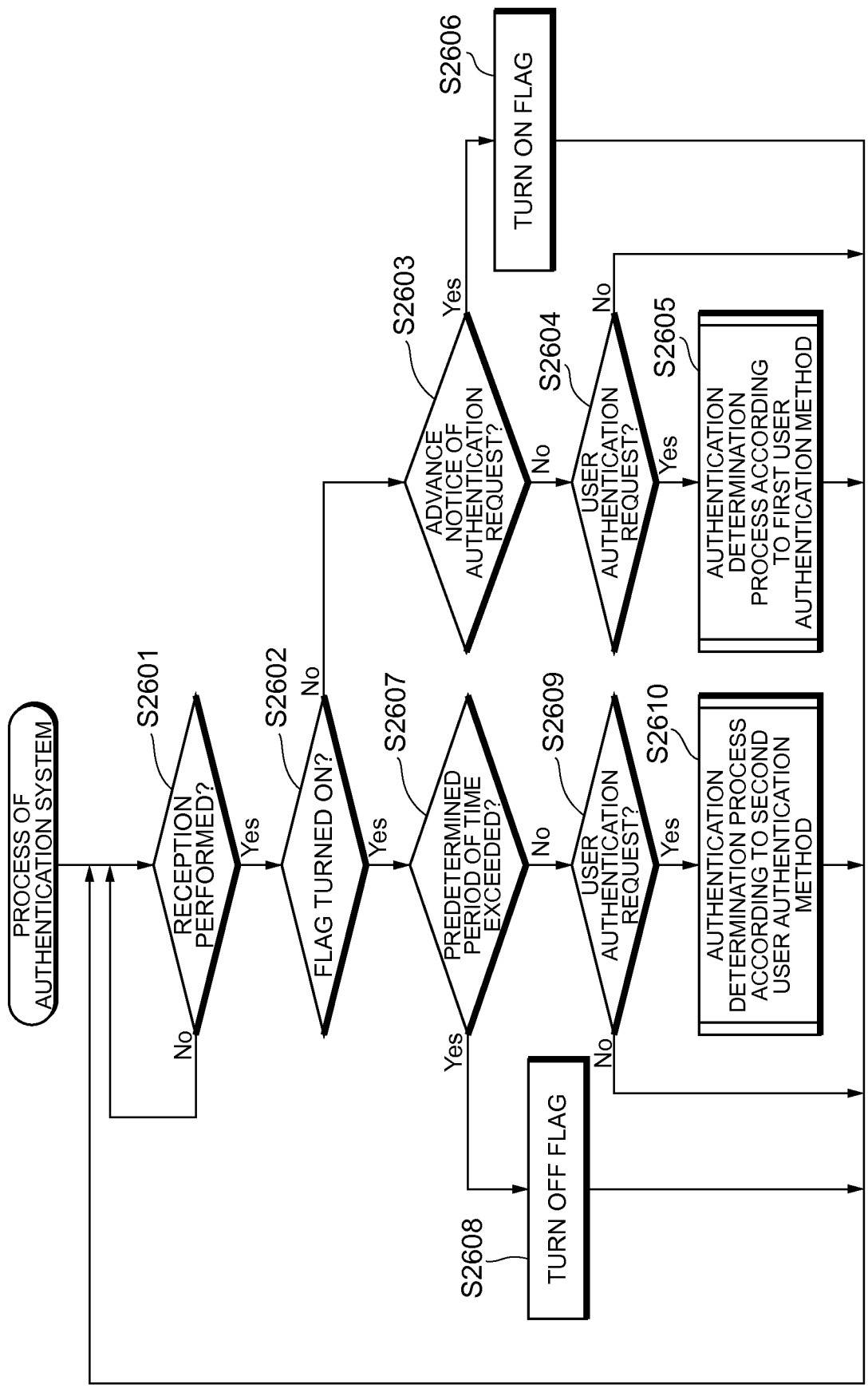
FIG. 26 is a flow chart showing a process performed by an authentication system in a user authentication method according to an embodiment of the present invention.

FIG. 26 is a flow chart showing a process performed by an authentication system in a user authentication method according to an embodiment of the present invention. While a process by the authentication system 40 will be described below, the process can be considered to be performed by the authentication server 42 by cooperating with the authentication database 44' and the synchronization server 46 in a similar manner to the embodiments described above.

Specifically, as shown in FIG. 26, the authentication system 40 may stand by until a predetermined message is received from the usage target system 30 (S2601). When the prescribed message is received (Yes in S2601), the authentication system 40 may determine whether or not a flag related to an advance notice of a user authentication request is turned on (S2602).

When the authentication system 40 determines that the flag related to an advance notice of a user authentication request is not turned on (No in S2602), the authentication system 40 may then determine whether or not the predetermined message is an advance notice of a user authentication request (S2603). When the authentication system 40 determines that the predetermined message is not an advance notice of a user authentication request (No in S2603), the authentication system 40 may subsequently determine whether or not the predetermined message is a user authentication request (S2604).

When the authentication system 40 determines that the predetermined message received from the usage target system 30 is neither an advance notice of a user authentication request nor a user authentication request itself (No in S2604), the authentication system 40 may return control to the determination process of S2601 and enter a standby state. In contrast, when the authentication system 40 may determine that the predetermined message received from the usage target system 30 is not an advance notice but is a user authentication request (Yes in S2604), the authentication system 40 may perform authentication determination in accordance with the first user authentication method (S2605). Specifically, the authentication system 40 may compare and collate the token code generated in time synchronization with the information communication terminal 20 with the password included in the user authentication request, perform authentication determination, and transmit a result of the authentication determination to the usage target system 30.

On the other hand, when the authentication system 40 determines that the predetermined message received from the usage target system 30 is an advance notice of a user authentication request (Yes in S2603), the authentication system 40 may turns on the flag related to an advance notice of a user authentication request, start time measurement by a timer (S2606), and returns control to the determination process of S2601.

When the authentication system 40 determines in the determination process of S2602 that the flag related to an advance notice of a user authentication request is turned on (Yes in S2602), the authentication system 40 may subsequently determine whether or not the time measurement by the timer has exceeded a predetermined period of time (S2607). When the authentication system 40 determines that the time measurement by the timer has exceeded a predetermined period of time (Yes in S2607), the authentication system 40 may turns off the flag related to an advance notice of a user authentication request and reset the timer (S2608).

When the authentication system 40 determines that the time measurement by the timer has not exceeded a prescribed period of time (No in S2607), the authentication system 40 may subsequently determine whether or not the prescribed message is a user authentication request (S2609). When the authentication system 40 determines that the prescribed message is a request for user authentication (Yes in S2609), the authentication system 40 may perform authentication determination in accordance with the second user authentication method (S2605). Specifically, the authentication system 40 may extract a character of each of the elements constituting a password derivation pattern in the token code generated in time synchronization with the information communication terminal 20, compare and collate the extracted sequence of characters with an entered password, perform authentication determination, and transmit a result of the authentication determination to the usage target system 30.

Figure 27A:
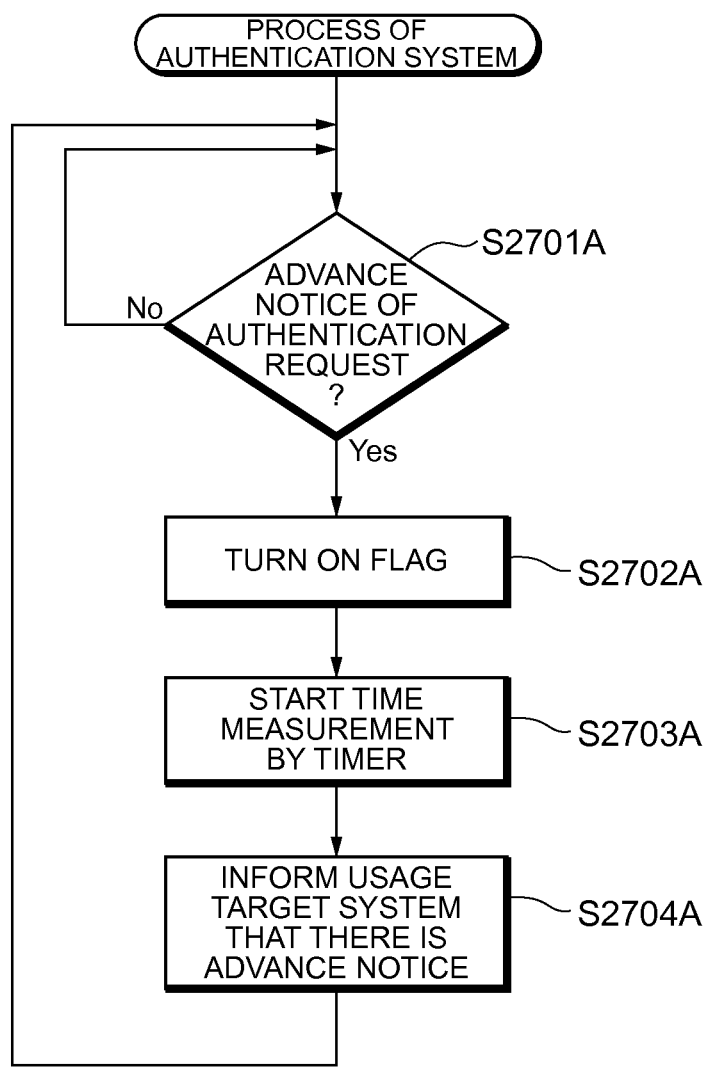
FIG. 27A is a flow chart showing another example of a process performed by an authentication system in a user authentication method according to an embodiment of the present invention.
Figure 27B:
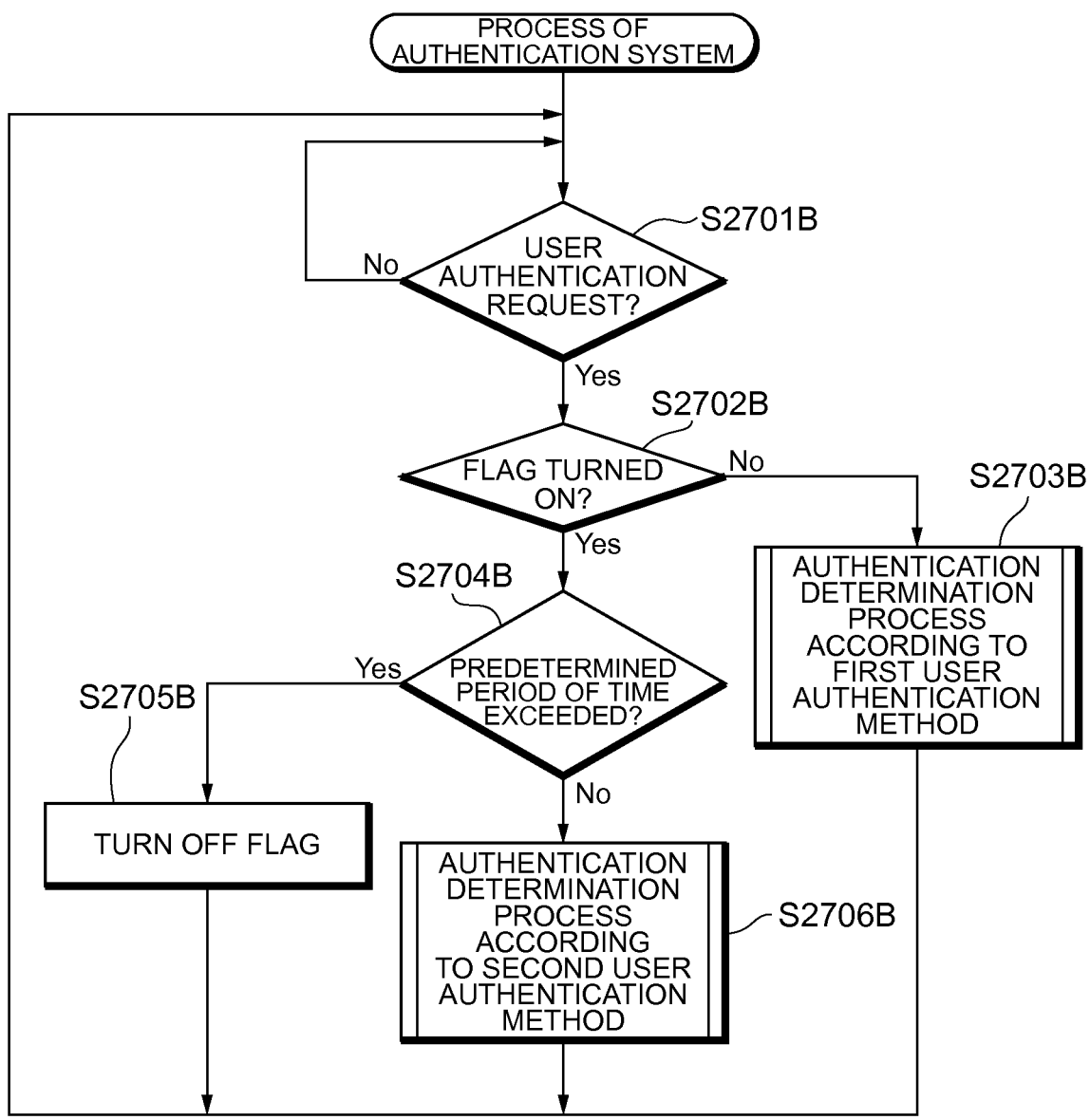
FIG. 27B is a flow chart showing another example of a process performed by an authentication system in a user authentication method according to an embodiment of the present invention.

FIGS. 27A and 27B are flow charts showing another example of a process by an authentication system. Specifically, this example shows a process in a case where the information communication terminal 20 transmits an advance notice of a user authentication request directly to the authentication system 40.

More specifically, as shown in FIG. 27A, the authentication system 40 may stand by until an advance notice of a user authentication request is received from the information communication terminal 20 (S2701A). When the authentication system 40 receives an advance notice of a user authentication request from the information communication terminal 20 (Yes in S2701A), the authentication system 40 may turn on the flag related to an advance notice of a user authentication request (S2702A) and start time measurement by a timer (S2703A). Subsequently, the authentication system 40 may transmit a notification indicating that an advance notice of a user authentication request has been received to the usage target system 30 (S2704A). Alternatively, the step of S2704A may be omitted and such notification may be included in a result of the authentication determination as described above.

On the other hand, the authentication system 40 may stand by until a user authentication request from the usage target system 30 is received (S2701B). When the authentication system 40 receives a user authentication request (Yes in S2701B), the authentication system 40 may subsequently determine whether or not the flag related to an advance notice of a user authentication request is turned on (S2702B).

When the authentication system 40 determines that the flag related to an advance notice of a user authentication request is not turned on (No in S2702B), the authentication system 40 may perform authentication determination in accordance with the first user authentication method (S2703B). Specifically, the authentication system 40 may compare and collate the token code generated in time synchronization with the information communication terminal 20 with the password included in the user authentication request, perform authentication determination, and transmit a result of the authentication determination to the usage target system 30.

In contrast, when the authentication system 40 determines that the flag related to an advance notice of a user authentication request is turned on (Yes in S2702B), the authentication system 40 may subsequently determine whether or not the time measurement by the timer has exceeded a predetermined period of time (S2704B). When the authentication system 40 determines that the time measurement by the timer has exceeded a prescribed period of time (Yes in S2704B), the authentication system 40 may turn off the flag related to an advance notice of a user authentication request and reset the timer (S2705B).

When the authentication system 40 determines in the step of S2704B that the time measurement by the timer has not exceeded a predetermined period of time (No in S2704B), the authentication system 40 may perform authentication determination in accordance with the second user authentication method (S2706B). Specifically, the authentication system 40 may extract a character of each of the elements constituting a password derivation pattern in the token code generated in time synchronization with the information communication terminal 20, compare and collate the extracted sequence of characters with an entered password, perform authentication determination, and transmit a result of the authentication determination to the usage target system 30.

The present embodiment may allow, in addition to having similar advantages to the embodiments described above, an appropriate user authentication method to be switched depending on whether or not the information communication terminal 20 of the user is in a network communication environment.

Further, while an example combining the first user authentication method with the second user authentication method has been described in the present embodiment, such a configuration is not restrictive and the user authentication method described in the third embodiment may be used instead.

Other Embodiments

While the information communication terminal 20 may be configured to generate a code table and to display an entry screen for to-be-authenticated information based on the code table on a user interface of the information communication terminal 20 in the embodiments described above, for example, the usage target system 30 may be configured to display an entry screen for to-be-authenticated information and to receive entry of a password by the user. Specifically, while the information communication terminal 20 may generate a code table and then display the code table on the user interface of the information communication terminal 20, for example, the usage target system 30 may display an entry screen to-be-authenticated information when a predetermined operation is triggered by the user. The user may enter, referring to the user interface of the information communication terminal 20, a password to the entry screen. Upon receipt of the password, the usage target system 30 may transmit a user authentication request to the authentication system 40. Even when adopting such a configuration, advantages similar to the embodiments described above can be achieved.

In addition, methods of entering a token code to a cell (element) corresponding to a password derivation pattern using the user interface of the information communication terminal 20 will be demonstrated below.

Figure 28:
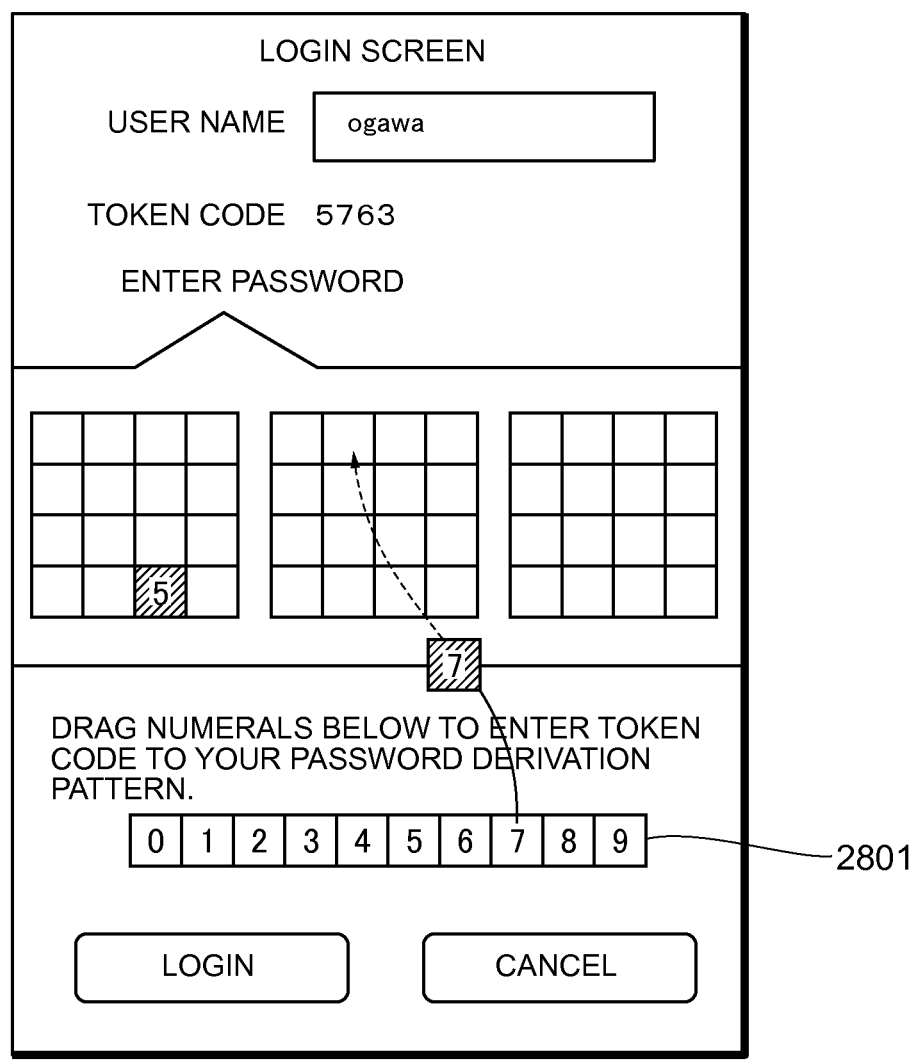
FIG. 28 is an illustration showing an example of a user interface for registering a password derivation pattern in a user authentication method according to an embodiment of the present invention.

The example shown in FIG. 28 represents a method in which a user may enter a numeral by tapping a desired numeral icon in numeral tiles 2801 displayed on a screen and dragging the numeral icon to one of elements corresponding to a password derivation pattern in a geometrical pattern. The user may drop the numeral icon on a specific element, thereby allowing the numeral to be entered to the element.

Figure 29:
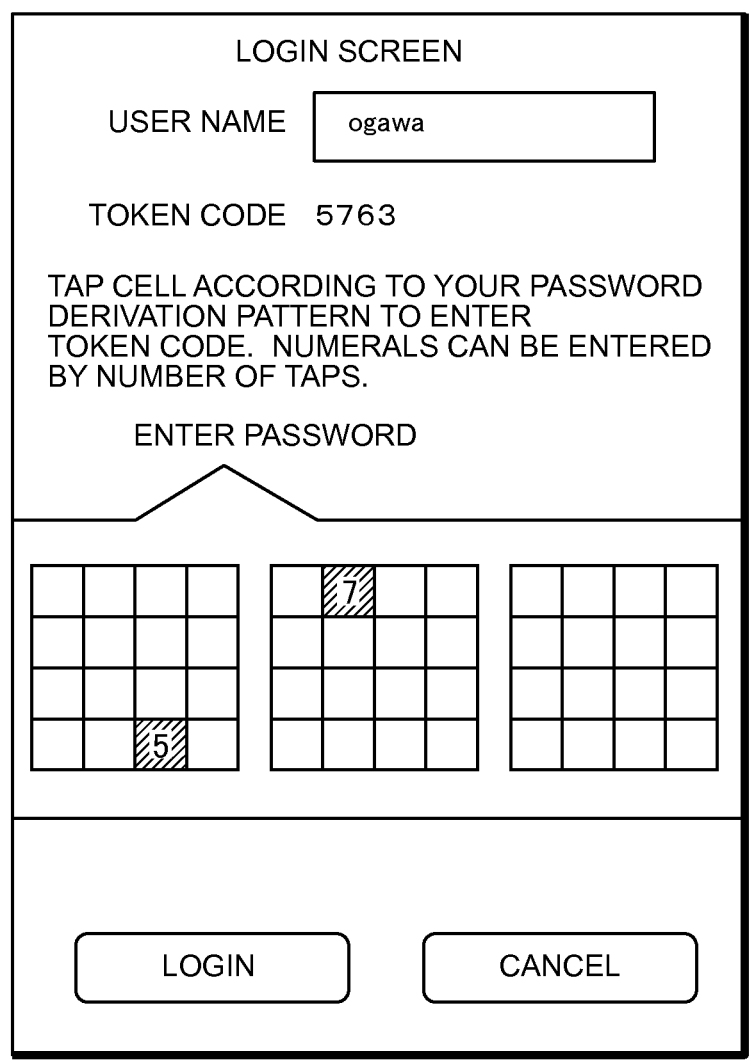
FIG. 29 is an illustration showing an example of a user interface for registering a password derivation pattern in a user authentication method according to an embodiment of the present invention.

The example shown in FIG. 29 represents a method in which a user may enter a numeral by tapping an element corresponding to a password derivation pattern in a geometrical pattern displayed on a screen the number of times corresponding to a numeral. For example, a first tap on an element may cause "0" to be entered to the element. For example, when entering "7" to the element at 3rd row and 5th column, the user may tap the element 8 times at a predetermined tapping speed. The information communication terminal 20 may determine that entry by tapping is finished if no tapping is performed for a predetermined period of time.

Figure 30A:
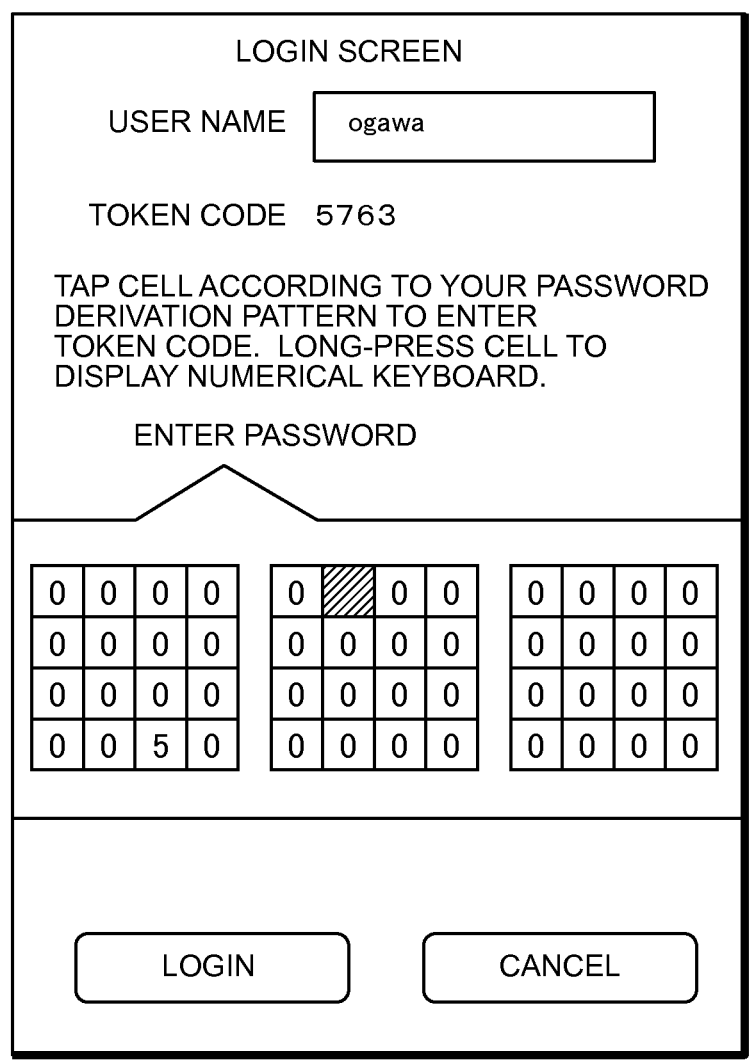
FIG. 30A is an illustration showing an example of a user interface for registering a password derivation pattern in a user authentication method according to an embodiment of the present invention.
Figure 30B:
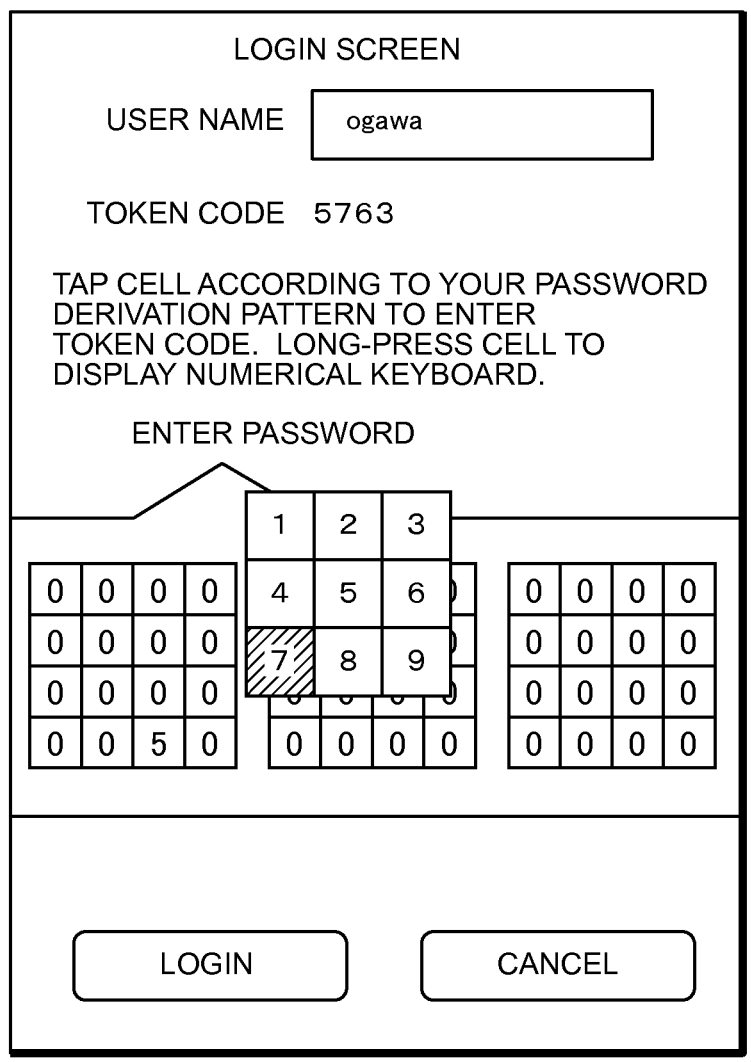
FIG. 30B is an illustration showing an example of a user interface for registering a password derivation pattern in a user authentication method according to an embodiment of the present invention.

FIGS. 30A and 30B show an example in which a numerical keyboard is displayed on a tapped element. In this example, "0" may be assigned in advance to all of elements of a geometrical pattern. As shown in FIG. 30A, the user may tap one of the elements corresponding to a password derivation pattern in the geometrical pattern displayed on a screen. By this, in order to visually distinguish the tapped element, the element may be highlighted and a numerical keyboard such as that shown in FIG. 30B may be displayed directly above the element so as to overlap with the element. When the user further taps a desired numeral on the numerical keyboard, the numeral may be entered to the element. When the user does not perform entry for a predetermined period of time on the displayed numerical keyboard, "0" that is assigned in advance is entered to the selected element.

Figure 31A:
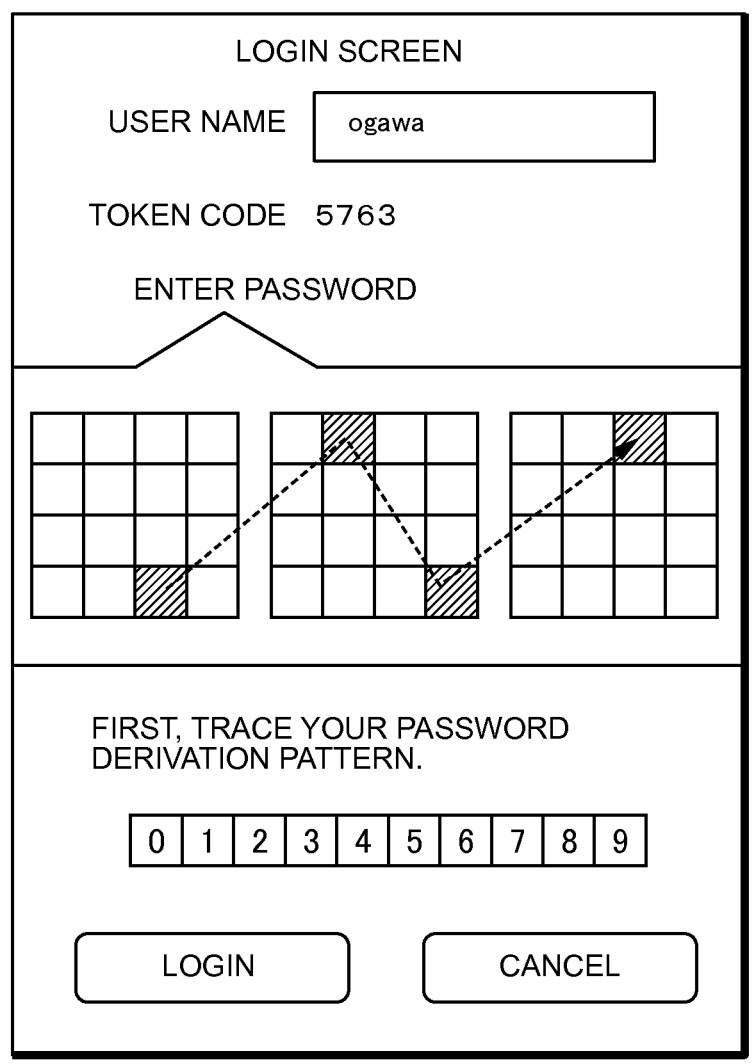
FIG. 31A is an illustration showing an example of a user interface for registering a password derivation pattern in a user authentication method according to an embodiment of the present invention.
Figure 31B:
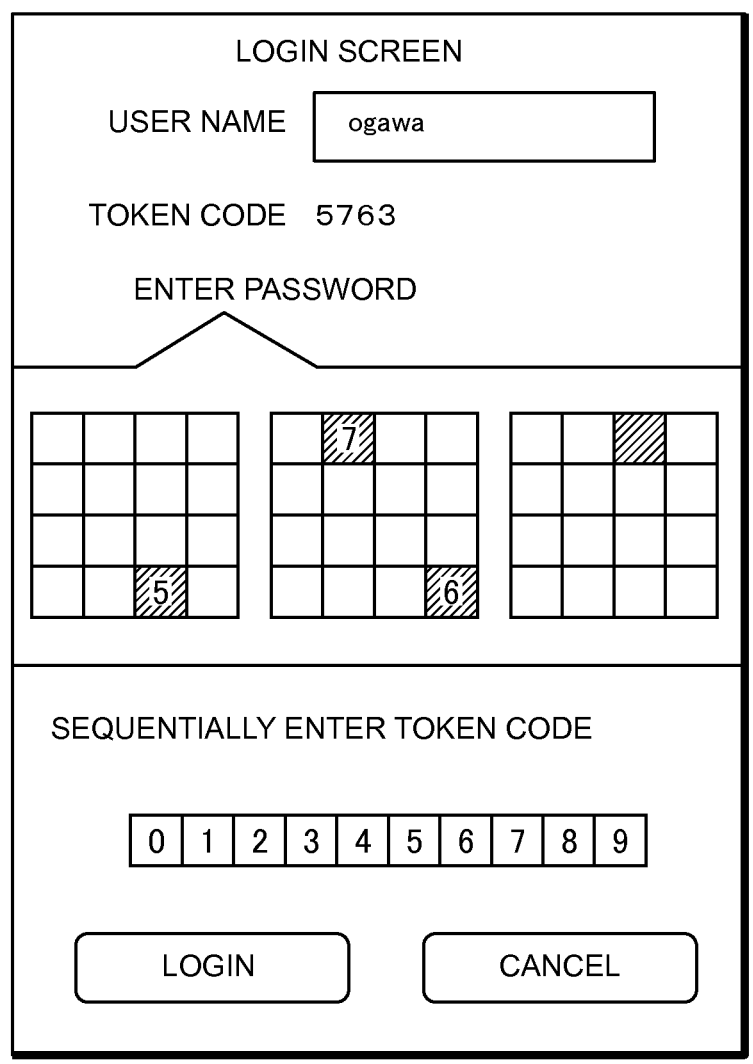
FIG. 31B is an illustration showing an example of a user interface for registering a password derivation pattern in a user authentication method according to an embodiment of the present invention.

FIGS. 31A and 31B show an example in which desired elements are selected by tracing on a geometrical pattern as though drawing a unicursal line. As shown in FIG. 31A, after tapping and selecting a first element, a user may select respective elements with the predetermined number of elements to be registered in a manner of drawing an approximately straight line while dragging from the first element as an origin and pausing on elements to be selected. Selection of the elements may be completed when the user lifts the dragged finger up. Thus, the selected elements may be visually distinguished by being highlighted. Subsequently, the user may sequentially select numerals in numeral tiles with respect to the selected elements in order to enter a token code.

FIG. 32 is a schematic block diagram showing a hardware configuration of a computing device according to an embodiment of the present invention. As shown in FIG. 32, the computing device may typically include, but not limited to, one or more processor modules 3201, a chip set 3202, a memory module 3203, a storage device 3204, an I/O controller 3205, and various peripheral interfaces 3206.

For example, the processor module 3201 may include, but not limited to, a processor core, a microcontroller, a digital signal processor, and/or a combination thereof. In this case, the term "processor core" may be used synonymously with the terms processor, CPU, MPU, and the like which may signify a main processor. The processor module may include a cache mechanism at primary or higher levels.

The chip set 3202 may include a bridge to a bus connecting the processor module 3201, the memory module 3203, the storage device 3204, the I/O controller 3205, and the like, and a circuit integrating other components necessary for configuring the computing device. For example, the chip set 3202 may be controlled by the processor module 3201.

The memory module 3203 may, typically, be a primary storage device constituted by a volatile memory (for example, a RAM), a nonvolatile memory (for example, a ROM or a flash memory), and/or a combination thereof. The memory module 3203 may typically store all of or a part of device drivers, an operating system (OS) program, one or more application programs, program data, and the like and is provided to be used by the processor core.

The storage device 3204 may typically be constituted by a hard disk drive (HDD), an optical disk drive, a solid state device (SSD), or the like. The storage device may function as a secondary storage device of the processor module and stores an OS, application programs, program data, and various databases. All of or a part of these programs and data may be stored in an external storage device 3207.

Moreover, a computing device as the information communication terminal 20 may be configured to include, for example, various components for realizing wireless communication (for example, an antenna, a wireless communication chip, a microphone, and a speaker) and components for realizing a user interface (for example, a touch panel).

The embodiments described above may merely be examples for describing the present invention and are not intended to limit the present invention to the embodiments. The present invention may be implemented in various modes unless the modes depart from the spirit and the scope of the invention.

For example, the methods disclosed in the present disclosure may be implemented by rearranging an order of steps, operations, or functions as long as results of such implementation are not inconsistent. The described steps, operations, and functions are simply provided as examples. As such, a part of the steps, operations, and functions may be omitted unless the spirit and the scope of the invention are departed, or may be combined and integrated. Further, other steps, operations, or functions may be added.

Furthermore, while various embodiments are disclosed in the present disclosure, a specific feature (technical matter) according to one embodiment can be modified, as appropriate, to be added to another embodiment or to be replaced with a specific feature of the other embodiment. It is to be understood that all such modifications also fall within the spirit and scope of the present invention.

INDUSTRIAL APPLICABILITY

The present invention can be utilized in the field of user authentication required by any systems including, for example, key opening and closing systems not only when logging into computer systems but also when logging into websites providing online banking, online shopping, and the like as well as various cloud services.

The invention claimed is:

1. An authentication system for performing authentication for a user who uses a usage target system, by way of using an information communication terminal that is provided for the user on a client side, comprising:
an authentication database configured to manage, for each user, user account information including a token ID for identifying a security token of the user; and
a synchronization server configured to generate a first token code in accordance with the token ID included in the user account information,
wherein the information communication terminal performs to:
store a password derivation pattern constituted by specific elements selected from among elements forming a geometrical pattern in a memory;
acquire a second token code directly from a security token arranged at the user without receiving the first token code from the synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;
generate a code table by assigning the second token code to the specific elements constituting the password derivation pattern in the geometrical pattern and assigning an arbitrary code to the remaining elements in the geometrical pattern;
display an entry screen for to-be-authenticated information on a user interface, the entry screen including the generated code table; and
transmit to the authentication system a user authentication request including a password entered to the entry screen, and
the authentication system performs to:
receive the user authentication request transmitted by the information communication terminal;
identify a token ID corresponding to the user authentication request by referring to the authentication database and perform authentication determination by comparing the first token code generated by the synchronization server in accordance with the identified token ID with a password included in the received user authentication request; and
transmit a result of the authentication determination to the usage target system.

2. An information communication terminal that is provided for a user on a client side and is used for authentication by an authentication system for the user who uses a usage target system, comprising:
a processor; and
a memory, operatively connected to the processor, that stores a password derivation pattern constituted by specific elements selected from among elements forming a geometrical pattern;
wherein the processor performs to:
store, in the memory, the password derivation pattern constituted by specific elements selected from among elements forming the geometrical pattern;
acquire a second token code directly from a security token arranged at the user without receiving a first token code from a synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;
generate a code table by assigning the second token code to the specific elements constituting the password derivation pattern in the geometrical pattern and assigning an arbitrary code to the remaining elements in the geometrical pattern; and
display an entry screen for to-be-authenticated information on a user interface, the entry screen including the generated code table.

3. A product comprising a non-transitory computer-readable medium storing a program for achieving authentication by an authentication system for a user who uses a usage target system, by way of using an information communication terminal that is provided for the user on a client side,
wherein the program causes, by execution under control of the information communication terminal, the information communication terminal to perform to:
store a password derivation pattern constituted by specific elements selected from among elements forming a geometrical pattern;
acquire a second token code directly from a security token of the user without receiving a first token code from the synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;
generate a code table by assigning the second token code to the specific elements constituting the password derivation pattern in the geometrical pattern and assigning an arbitrary code to the remaining elements in the geometrical pattern; and
display an entry screen for to-be-authenticated information on a user interface, the entry screen including the generated code table.

4. An authentication system for performing authentication for a user who uses a usage target system, by way of using an information communication terminal that is provided for the user on a client side, comprising:
an authentication database configured to manage, for each user, user account information including a password derivation pattern constituted by specific elements selected from among elements forming a geometrical pattern and a token ID for identifying a security token of the user;
a synchronization server configured to generate a first token code based on the token ID included in the user account information;
wherein the information communication terminal performs to:
store, in a memory, the password derivation pattern constituted by specific elements selected from among elements forming the geometrical pattern;
acquire a second token code directly from the security token of the user without receiving the first token code from the synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;

generate a code table by assigning the second token code to elements in the geometrical pattern;

display an entry screen for to-be-authenticated information on a user interface, the entry screen including the generated code table; and transmit to the authentication system a user authentication request including a password entered to the entry screen, and wherein the authentication system performs to:

receive the user authentication request transmitted by the information communication terminal;

identify a token ID corresponding to the user authentication request by referring to the authentication database;

identify a password of the user from the first token code generated by the synchronization server in accordance with the identified token ID and a password derivation pattern of the user corresponding to the user authentication request;

execute authentication determination by comparing the identified password with the password included in the received user authenticated request; and transmit a result of the authentication determination to the usage target system.

5. An information communication terminal that is provided for a user on the client side for achieving authentication by an authentication system for the user who uses a usage target system, comprising:

a processor; and a user interface operatively connected to the processor, wherein the processor performs to:

store, in a memory, a password derivation pattern constituted by specific elements selected from among elements forming a geometrical pattern;

acquire a second token code directly from a security token arranged at a user end without receiving a first token code from a synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;

generate a code table by assigning the second token code to elements in the geometrical pattern; and display an entry screen for to-be-authenticated information on the user interface, the entry screen including the generated code table.

6. A product comprising a non-transitory computer-readable medium storing a program for achieving authentication by an authentication system for a user who uses a usage target system, wherein the program causes, by execution under control of an information communication terminal that is provided for the user on a client side, the information communication terminal to perform to:

store, in a memory, a password derivation pattern constituted by specific elements selected from among elements forming a geometrical pattern;

acquire a second token code directly from a security token arranged at the user without receiving a first token code from the synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;

generate a code table by assigning the second token code to elements in the geometrical pattern; and display an entry screen for to-be-authenticated information on a user interface, the entry screen including the generated code table.

7. An authentication system for performing authentication for a user who uses a usage target system, by way of using an information communication terminal that is provided for the user on a client side, comprising:

an authentication server configured to receive a user authentication request, to perform authentication determination based on the received user authentication request, and to transmit a result of the authentication determination to the usage target system;

an authentication database configured to manage, for each user, user account information including a password derivation pattern constituted by specific elements selected from among elements forming a geometrical pattern and a token ID for identifying a security token of the user, wherein the security token is at least one of a software token installed in the information communication terminal that is an application program implementing a security function and a hardware token that is a physical device; and a synchronization server configured to generate a first token code based on the token ID included in the user account information, wherein the authentication system is configured to select one from among a plurality of processes of authentication determination depending on whether an advance notice based on a start of use of the usage target system sent by the information communication terminal is received prior to receiving the user authentication request, and the information communication terminal stores, in a memory, the password derivation pattern constituted by specific elements selected from among elements forming the geometrical pattern and acquires a second token code directly from the security token without receiving the first token code from the synchronization server at the time when authentication determination is performed, the second token code being in synchronization with the first token code generated by the synchronization server.

8. The authentication system according to claim 7, wherein, if the authentication system has not received the advance notice based on the star of use of the usage target system, the authentication system identifies a token ID corresponding to the received user authentication request referring to the authentication database, and performs authentication determination by comparing the first token code generated by the synchronization server in accordance with the identified token ID with a password included in the received user authentication request.

9. The authentication system according to claim 8, wherein, if the authentication system has received the advance notice based on the star of use of the usage target system, the authentication system identifies a token ID corresponding to the received user authentication request referring to the authentication database, identifies a password of the user based on the first token code generated by the synchronization server in accordance with the identified token ID and a password derivation pattern of the user corresponding the user authentication request, and perform authentication determination by comparing the identified password with a password included in the received user authentication request.

10. The authentication system according to claim 7, wherein the authentication system receives the user authentication request if the user authentication request arrives within a predetermined period of time after receiving the advance notice.

11. The authentication system according to claim 10, wherein the authentication system informs the usage target system of receipt of the advance notice.

12. An information communication terminal that is provided for a user on a client side and is used for authentication by an authentication system for the user who uses a target system, comprising:
a processor; and
a memory, operatively connected to the processor, that stores a password derivation pattern constituted by specific elements selected from among elements forming a geometrical pattern,
wherein the processor:
acquires a second token code directly from a security token arranged at a user without receiving a first token code from a synchronization server at the time when authentication determination is performed, the second token code being in synchronization with the first token code generated by the synchronization server, wherein the security token is at least one of a software token installed in the information communication terminal that is an application program implementing a security function and a hardware token that is a physical device;
generates one of code tables, wherein the code tables include a first code table by assigning the acquired token code to the specific elements constituting the password derivation pattern in the geometrical pattern and assigning an arbitrary code to the remaining elements in the geometrical pattern, or generates a second code table by assigning the second token code to the elements in the geometrical pattern; and
displays a screen on a user interface, the screen including the code table generated by either the first generation process or the second generation process, wherein
the processor selectively generates the first code table or the second code table depending on a situation of a network communication.

13. An authentication system for performing authentication for a user who uses a usage target system, comprising:
an authentication server configured to receive a user authentication request, to perform authentication determination based on the received user authentication request, and to transmit a result of the authentication determination to the usage target system;
an authentication database configured to store user account information associating a password derivation pattern of the user with a token ID for identifying a security token of the user, the password derivation pattern constituted by specific elements selected from among elements forming a geometrical pattern, wherein the security token is at least one of a software token installed in an information communication terminal that is an application program implementing a security function and a hardware token that is a physical device; and
a synchronization server configured to generate, in synchronization with a security token identified by the token ID, a first token code corresponding to the identified security token, wherein
the authentication server performs to:
provide, based on an authentication start request to the usage target system from the information communication terminal of the user, an entry screen for to-be-authenticated information on a user interface of the information communication terminal in order to allow the user to entry to-be-authenticated information including password information formed in accordance with a second token code generated by the security token and the password derivation pattern stored in the authentication database;
acquire the first token code corresponding to the security token of the user from the synchronization server, by referring to the user account information in the authentication database, based on the to-be-authenticated information transmitted from the information communication terminal;
execute authentication determination of the to-be-authenticated information, by referring to the corresponding user account information in the authentication database, by comparing the first token code with the password derivation pattern of the user; and
transmit a result of the authentication determination to the usage target system, and
the information communication terminal stores, in a memory, the password derivation pattern constituted by specific elements selected from among elements forming the geometrical pattern and acquires the second token code directly from the security token without receiving the first token code from the synchronization server at the time when authentication determination is performed, the second token code being in synchronization with the first token code generated by the synchronization server.

14. A user authentication method for performing authentication for a user who uses a usage target system, comprising:
registering, in an authentication database, user account information associating a password derivation pattern of the user with a token ID for identifying a security token of the user, the password derivation pattern constituted by specific elements selected from among elements forming a geometrical pattern, wherein the security token is at least one of a software token installed in an information communication terminal that is an application program implementing a security function and a hardware token that is a physical device;
providing, based on an authentication start request to the usage target system from the information communication terminal of the user, an entry screen for to-be-authenticated information on a user interface of the information communication terminal and allowing the user to entry to-be-authenticated information including password information formed in accordance with a second token code generated by the security token and the registered password derivation pattern;

receiving the to-be-authenticated information transmitted from the information communication terminal, and generating a first token code corresponding to the security token of the user, by referring to the corresponding user account information in the authentication database, based on the received to-be-authenticated information;

referring to the corresponding user account information in the authentication database, and performing authentication determination of the to-be-authenticated information by comparing the generated token code with the password derivation pattern of the user; and transmitting a result of the authentication determination to the usage target system, wherein the information communication terminal stores, in a memory, the password derivation pattern constituted by specific elements selected from among elements forming the geometrical pattern and acquires the second token code directly from the security token without receiving the first token code from the synchronization server at the time when authentication determination is performed, the second token code being in synchronization with the first token code generated by the synchronization server.

15. The information communication terminal according to claim 12, wherein the information communication terminal generates a code table by assigning the acquired token code to the specific elements constituting the password derivation pattern in the geometrical pattern and assigning an arbitrary code to the remaining elements in the geometrical pattern if the network communication is unavailable, and generates a code table by assigning the second token code to the elements in the geometrical pattern depending on a situation of a network communication if the network communication is available.

16. The information communication terminal according to claim 12, wherein the processor performs to transmit an advance notice based on a start of use of the usage target system to the authentication system.

* * * * *